(12) United States Patent
Gaddam et al.

(10) Patent No.: US 11,757,644 B2
(45) Date of Patent: Sep. 12, 2023

(54) METHOD, SYSTEM, AND COMPUTER PROGRAM PRODUCT FOR NETWORK BOUND PROXY RE-ENCRYPTION AND PIN TRANSLATION

(71) Applicant: Visa International Service Association, San Francisco, CA (US)

(72) Inventors: Sivanarayana Gaddam, Santa Clara, CA (US); Gaven James Watson, Palo Alto, CA (US); Rohit Sinha, Bokaro Steel (IN); Atul Luykx, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/732,989

(22) Filed: Apr. 29, 2022

(65) Prior Publication Data

US 2022/0270088 A1    Aug. 25, 2022

Related U.S. Application Data

(63) Continuation of application No. 17/421,587, filed as application No. PCT/US2020/012896 on Jan. 9, 2020, now Pat. No. 11,488,152.
(Continued)

(51) Int. Cl.
*H04L 9/32* (2006.01)
*G06Q 20/02* (2012.01)
(Continued)

(52) U.S. Cl.
CPC ......... *H04L 9/3226* (2013.01); *G06Q 20/027* (2013.01); *G06Q 20/108* (2013.01);
(Continued)

(58) Field of Classification Search
None
See application file for complete search history.

(56) References Cited

U.S. PATENT DOCUMENTS 5,781,632 A * 7/1998 Odom ............... G06Q 30/0601
713/153
6,760,711 B1 * 7/2004 Gillett ............... G06Q 20/3823
705/64
(Continued)

FOREIGN PATENT DOCUMENTS

CN   108830587 A   11/2018
CN   104094302 B   12/2018
(Continued)

OTHER PUBLICATIONS

"A Guide to EMV Chip Technology", EMVCo, 2014, 36 pages, retrieved from https://www.emvco.com/wp-content/uploads/2017/05/A_Guide_to_EMV_Chip_Technology_v2.0_20141120122132753.pdf.
(Continued)

*Primary Examiner* — Neha Patel
*Assistant Examiner* — Jahed Ali
(74) *Attorney, Agent, or Firm* — THE WEBB LAW FIRM

(57) ABSTRACT

A method, system, and computer program product generate, with a payment network, a first value (a) and a second value ($g^a$), the second value ($g^a$) generated based on the first value (a) and a generator value (g); generate, with the payment network, a plurality of random merchant numbers ($m_i$) for a respective plurality of merchant banks; determine, with the payment network, a merchant product (M) based on a product of the plurality of random merchant numbers ($m_i$); generate, with the payment network, a public key ($pk_i$) based on the second value ($g^a$), the merchant product (M), and the random merchant number ($m_i$) and a random key ($rk_i$) based
(Continued)

on the merchant product (M) and the random merchant number ($m_i$) for each respective merchant bank; and communicate, with the payment network, the public key ($pk_i$) and the random key ($rk_i$) to at least one respective merchant bank.

15 Claims, 21 Drawing Sheets

Related U.S. Application Data

(60) Provisional application No. 62/929,344, filed on Nov. 1, 2019, provisional application No. 62/790,163, filed on Jan. 9, 2019.

(51) Int. Cl.

| | | |
|---|---|---|
| G06Q 20/10 | (2012.01) | |
| G06Q 20/20 | (2012.01) | |
| G06Q 20/38 | (2012.01) | |
| G06Q 20/40 | (2012.01) | |
| H04L 9/08 | (2006.01) | |
| H04L 9/30 | (2006.01) | |
| H04L 9/40 | (2022.01) | |

(52) U.S. Cl.
CPC ......... *G06Q 20/202* (2013.01); *G06Q 20/206* (2013.01); *G06Q 20/385* (2013.01); *G06Q 20/3823* (2013.01); *G06Q 20/3829* (2013.01); *G06Q 20/4012* (2013.01); *H04L 9/0819* (2013.01); *H04L 9/0869* (2013.01); *H04L 9/30* (2013.01); *H04L 63/0471* (2013.01); *H04L 2209/56* (2013.01)

(56) References Cited

U.S. PATENT DOCUMENTS

| | | | | |
|---|---|---|---|---|
| 10,134,038 | B2* | 11/2018 | Baig | H04L 9/0825 |
| 11,195,173 | B2* | 12/2021 | Enright | G06Q 20/4018 |
| 2010/0161494 | A1 | 6/2010 | Slater | |
| 2014/0050318 | A1 | 2/2014 | Hayashi et al. | |
| 2015/0019443 | A1* | 1/2015 | Sheets | G06Q 20/322 |
| | | | | 705/71 |
| 2015/0200917 | A1* | 7/2015 | Fujii | H04L 63/061 |
| | | | | 713/171 |
| 2015/0271153 | A1* | 9/2015 | Rohloff | H04L 63/0471 |
| | | | | 713/153 |
| 2015/0302397 | A1 | 10/2015 | Kalgi | |
| 2017/0061403 | A1* | 3/2017 | Reisgies | G06Q 20/401 |
| 2017/0286958 | A1* | 10/2017 | Herman | G06Q 20/4015 |
| 2018/0254892 | A1* | 9/2018 | Egorov | H04L 9/0891 |
| 2018/0254901 | A1* | 9/2018 | Egorov | H04L 9/0822 |
| 2018/0270048 | A1* | 9/2018 | Bar-El | G06F 21/6281 |

FOREIGN PATENT DOCUMENTS

| | | | | |
|---|---|---|---|---|
| GB | 2549118 | A | | 10/2017 |
| GB | 2551775 | A * | 1/2018 | ........... G06Q 20/322 |
| GB | 2551775 | A | | 1/2018 |
| WO | 9829983 | A1 | | 7/1998 |
| WO | 2012147869 | A1 | | 11/2012 |
| WO | WO-2012147869 | A1 * | 11/2012 | ........... H04L 9/0861 |
| WO | 2013056104 | A1 | | 4/2013 |
| WO | 2017078626 | A1 | | 5/2017 |
| WO | 2018096559 | A1 | | 5/2018 |
| WO | WO-2018208787 | A1 * | 11/2018 | ......... H04L 63/0442 |
| WO | 2018222811 | A1 | | 12/2018 |

OTHER PUBLICATIONS

"ANSI X9.24-1-2017 Retail Financial Services Symmetric Key Management Part 1: Using Symmetric Techniques", Approved American National Standard (ANSI), 2017, 48 pages, retrieved from https://webstore.ansi.org/standards/ascx9/ansix9242017.

Ateniese et al., "Improved Proxy Re-encryption Schemes with Applications to Secure Distributed Storage", ACM Transactions on Information and System Security, 2006, 25 pages, vol. 9, No. 1, retrieved from https://spqrlab1.github.io/papers/ateniese-proxy-reenc-tissec.pdf.

"bc-java: Bouncy Castle Java Distribution (Mirror)", GitHub, 2019, 4 pages, retrieved from https://github.com/begit/bc-java/tree/cfe16b873f5e41b64e4c3c1a79f64d6795aeff8b.

Bellare et al., "Authenticated Encryption: Relations among Notions and Analysis of the Generic Composition Paradigm", Journal of Cryptology, 2008, 23 pages, retrieved from https://link.springer.com/content/pdf/10.1007/s00145-008-9026-x.pdf.

Bellare et al., "Encode-Then-Encipher Encryption: How to Exploit Nonces or Redundancy in Plaintexts for Efficient Cryptography", ASIACRYPT, 2000, 14 pages, retrieved from https://link.springer.com/content/pdf/10.1007%2F3-540-44448-3_24.pdf.

Berkman et al., "The Unbearable Lightness of PIN Cracking", 2007, 15 pages, retrieved from http://citeseerx.ist.psu.edu/viewdoc/download?doi=10.1.1.216.4564&rep=rep1&type=pdf.

Blaze et al., "Divertible Protocols and Atomic Proxy Cryptography", 18 pages, retrieved from https://link.springer.com/content/pdf/10.1007%2FBFb0054122.pdf.

Brown, "Standards for Efficient Cryptography, SEC 2: Recommended Elliptic Curve Domain Parameters", Certicom Corp., 2010, 37 pages, retrieved from https://www.secg.org/sec2-v2.pdf.

Canetti et al., "Chosen-Ciphertext Secure Proxy Re-Encryption", ACM Digital Library, 2007, 22 pages, retrieved from https://eprint.iacr.org/2007/171.pdf.

Centenaro et al., "Type-based Analysis of PIN Processing APIs", In Proceedings of 14th European Symposium on Research in Computer Security, ResearchGate, 2009, 17 pages, https://www.researchgate.net/publication/221632084_Type-based_Analysis_of_PIN_Processing_APIs/link/02e7e5184dca83ee51000000/download.

Chandran et al., "Re-encryption, Functional Re-encryption, and Multi-hop Re-encryption: A Framework for Achieving Obfuscation-Based Security and Instantiations from Lattices", 2014, 18 pages, retrieved from https://link.springer.com/content/pdf/10.1007%2F978-3-642-54631-0_6.pdf.

"Chip technology helps reduce counterfeit fraud by 76 percent", Visa, 2019, 8 pages, retrieved from https://usa.visa.com/visa-everywhere/blog/bdp/2019/05/28/chip-technology-helps-1559068467332.html.

Cohen, "What about Bob? The Inadequacy of CPA Security for Proxy Reencryption", MIT, 2018, 37 pages, https://eprint.iacr.org/2017/785.pdf.

Cramer et al., "A Practical Public Key Cryptosystem Provably Secure against Adaptive Chosen Ciphertext Attack", 13 pages, retrieved from https://link.springer.com/content/pdf/10.1007%2FBFb0055717.pdf.

Debit Card Interchange Fees and Routing; Proposed Rule, 75 Fed. Reg. 81722 (Dec. 28, 2010).

"dropwizard: A damn simple library for building production-ready RESTful web services", GitHub, 2019, 3 pages, retrieved from https://github.com/dropwizard/dropwizard/tree/59633f0fae56612b0b6d7cefe25423a85c9832ea.

"EMV at the pump", Visa, 4 pages, retrieved from https://web.archive.org/web/20190501204359/https://usa.visa.com/visa-everywhere/security/emv-at-the-pump.html.

"EMV in the U.S.: Putting It Into Perspective for Merchants and Financial Institutions", First Data, 2011, 19 pages, retrieved from https://www.firstdata.com/downloads/thought-leadership/EMV_US.pdf.

"EMV Integrated Circuit Card Specifications for Payment Systems, Book 2, Security and Key Management, Version 4.3", EMVCo, 2011, 174 pages, retrieved from https://www.emvco.com/wp-content/uploads/2017/05/EMV_v4.3_Book_2_Security_and_Key_Management_20120607061923900.pdf.

(56) References Cited

OTHER PUBLICATIONS

"EMV News", Visa, 2017, 3 pages, retrieved from https://usa.visa.com/dam/VCOM/regional/na/us/run-your-business/documents/emv-newsletter-oct2017.pdf.

Fuchsbauer et al., "Adaptively Secure Proxy Re-encryption", 49 pages, retrieved from https://eprint.iacr.org/2018/426.pdf.

Gamal et al., "A Public Key Cryptosystem and a Signature Scheme Based on Discrete Logarithms", Advances in Cryptology, 1985, 9 pages, retrieved from https://link.springer.com/content/pdf/10.1007%2F3-540-39568-7_2.pdf.

Gentry, "Fully Homomorphic Encryption Using Ideal Lattices", 2009, 10 pages, retrieved from http://www.cs.cmu.edu/~odonnell/hits09/gentry-homomorphic-encryption.pdf.

Green et al., "Identity-Based Proxy re-Encryption", in Applied Cryptograph and Network Security, Springer Berlin Heidelberg, Jan. 1, 2007, 21 pages.

"ISO 8583-1 Financial transaction card originated messages—Interchange message specifications—Part 1: Messages, data elements and code values", International Standard, 2003, 204 pages, retrieved from https://www.iso.org/obp/ui/#iso:std:iso:8583:-1:ed-1:v1:en.

"ISO 9564-1 Financial services—Personal Identification Number (PIN) management and security—Part 1: Basic principles and requirements for PINs in card-based systems", International Standard, 2017, 40 pages, retrieved from https://www.iso.org/standard/68669.html.

Jayasinghe et al., "Enhancing EMV Online PIN Verification", 10 pages, retrieved from https://pure.royalholloway.ac.uk/portal/files/26543055/Enhancing_EMV_OPV.pdf.

"leveldb: LevelDB is a fast key-value storage library written at Google that provides an ordered mapping from string keys to string values", GitHub, 2019, 7 pages, retrieved from https://github.com/google/leveldb/tree/95d0ba1cb046bfd76619b8b80e14ee1b2897d219.

Libert et al., "Unidirectional Chosen-Ciphertext Secure Proxy Re-Encryption", 19 pages, retrieved from http://citeseerx.ist.psu.edu/viewdoc/download?doi=10.1.1.626.2726&rep=rep1&type=pdf.

Mannan et al., "Reducing Threats from Flawed Security APIs: The Banking PIN Case", 2009, 13 pages, retrieved from https://people.scs.carleton.ca/~mmannan/publications/saltedpin-cose.pdf.

Mannan et al., "Weighing Down "The Unbearable Lightness of PIN Cracking"", 2008, 5 pages, retrieved from http://citeseerx.ist.psu.edu/viewdoc/download?doi=10.1.1.216.4564&rep=rep1&type=pdf.

Myers et al., "Efficient Hybrid Proxy Re-Encryption for Practical Revocation and Key Rotation", 69 pages, retrieved from https://eprint.iacr.org/2017/833.pdf.

Myers et al., "Practical Revocation and Key Rotation ", Advances in Biometrics: International Conference, Springer International Publishing AG, 2007, pp. 157-178.

"New PCI Software-Based PIN Entry on COTS Standard", PCI Security Standards Council, 2018, 5 pages, retrieved from https://blog.pcisecuritystandards.org/new-pci-software-pin-entry-on-cots-standard.

"Operational Performance Data", Visa, 2018, 5 pages, retrieved from https://s1.q4cdn.com/050606653/files/doc_financials/2018/q4/Visa-Inc.-Q4-2018-Operational-Performance-Data.pdf.

"Payment Card Industry (PCI) Hardware Security Module (HSM) Security Requirements", PCI Security Standards Council, 2009, 26 pages, retrieved from https://www.pcisecuritystandards.org/documents/PCI%20HSM%20Security%20Requirements%20v1.0%20final.pdf.

"Payment Card Industry (PCI) PIN Security Requirements", PCI, 2014, 101 pages, retrieved from https://www.pcisecuritystandards.org/documents/PCI_PIN_Security_Requirements_v2.pdf.

"PCI Security Standards Council Publishes Security Requirements for Software-Based PIN Entry on Cots Devices—New PCI Standard to Drive Development of Secure Software-Based PIN Entry Solutions for EMV Contact and Contactless Transactions on Smartphones and Other Commercial Off-The-Shelf Devices (COTS)—", PCI Security Standards Council, 2018, 2 pages, retrieved from https://www.pcisecuritystandards.org/pdfs/SPOC_Press_Release_24_Jan.pdf.

Sela, "ODA for Transactions: What to Know for U.S. Payment Infrastructures", B2, 2017, 4 pages, retrieved from https://b2ps.com/company/newsroom/article/oda-for-transactions-what-to-know-for-us-payment-infrastructures/.

Steel, "Formal Analysis of PIN Block Attacks", ScienceDirect, 2006, 14 pages, retrieved from https://www.sciencedirect.com/science/article/pii/S0304397506005810.

"Visa Chip Card Update: Jun. 2017", Visa, 2017, 1 page, retrieved from https://usa.visa.com/dam/VCOM/global/visa-everywhere/documents/visa-chip-stats-infographic-jun17.pdf.

"Visa Fact Sheet", Visa, 2018, 1 page, retrieved from https://web.archive.org/web/20181202125512/https://usa.visa.com/dam/VCOM/download/corporate/media/visanet-technology/aboutvisafactsheet.pdf.

"Visa Minimum U.S. Online Only Terminal Configuration", Visa, 2017, 5 pages, retrieved from https://usa.visa.com/dam/VCOM/regional/na/us/run-your-business/documents/visa-minimum-us-online-only-terminal-configuration.pdf.

"Visa Recommended Practices for EMV Chip Implementation in the U.S.", Visa, 2012, 10 pages, retrieved from https://technologypartner.visa.com/Download.aspx?id=153.

Van Den Breekel, et al., "EMV in a nutshell", 2016, 37 pages, retrieved from https://www.cs.ru.nl/~erikpoll/papers/EMVtechreport.pdf.

Biswas et al., "Privacy-Preserving Outsourced Profiling", 12th IEEE International Conference on Commerce and Enterprise Computing, Nov. 2010, pp. 136-143.

* cited by examiner

ISO PIN-BLOCK ENCODINGS (AS DEFINED IN ISO 9564-1)

A PIN-block encoding scheme $ES = $ (encode, decode) take two inputs a PIN and a PAN, and outputs a PIN Block (PB).

The encoded PB is the XOR of two fields, a plaintext PIN field and an account number field.

Plaintext PIN field:

| C | N | P | P | P | P | P/F | P/F | P/F | P/F | P/F | P/F | P/F | P/F | F | F |
|---|---|---|---|---|---|-----|-----|-----|-----|-----|-----|-----|-----|---|---| where each 4-bit field is as follows:

- $C$ – Control field: takes value 0000 (zero) for ISO-0 or 0011 (3) for ISO-3;
- $N$ – PIN length: takes a value from 0100 (4) to 1100 (12);
- $P$ – PIN digit: takes a values from 0000 (zero) to 1001 (9);
- $P/F$ – PIN/Fill digit: designation of these fields is determined by the PIN length field;
- $F$ – Fill digit: takes value 1111 (15) for ISO-0 or a random value between 1010 (10) and 1111 (15) for ISO-3.

Account Number field:

| 0 | 0 | 0 | 0 | $A_1$ | $A_2$ | $A_3$ | $A_4$ | $A_5$ | $A_6$ | $A_7$ | $A_8$ | $A_9$ | $A_{10}$ | $A_{11}$ | $A_{12}$ |
|---|---|---|---|-------|-------|-------|-------|-------|-------|-------|-------|-------|----------|----------|----------| where each 4-bit field is as follows:

- $0$ – Pad digit: takes value 0000 (zero);
- $A_1 ... A_{12}$ – Account number: the 12 rightmost digits of the PAN excluding the check digit (values are from 0000 (0) to 1001 (9)).

PIN-BLOCK ENCRYPTION

1: function SE.KG($1^\lambda$) ▷ Key Generation
2: $K \xleftarrow{\$} \{0,1\}^k$
3: return $K$ 4: function SE.E($K, PAN, PIN$) ▷ Encryption
5: $PB \leftarrow \text{encode}(PAN, PIN)$
6: $EPB \leftarrow F(K, PB)$
7: return $EPB$ 8: function SE.D($K, PAN, EPB$) ▷ Decryption
9: $PB \leftarrow F^{-1}(K, EPB)$
10: $PIN \leftarrow \text{decode}(PAN, PB)$
11: return $PIN$

FIG. 5

PRE HRA-CCA GAME ORACLES

1: function $\mathcal{O}^{\mathsf{UNI}}_{\mathsf{RKG}}(i,j)$ ▷ Unidirectional Re-key
2:    if $i \in H, j \in C$ then return $\perp$
3:    return PRE.RKG($sk_i, pk_i, pk_j$)

4: function $\mathcal{O}^{\mathsf{BI}}_{\mathsf{RKG}}(i,j)$ ▷ Bidirectional Re-key
5:    if $\{i,j\} \not\subseteq H$ or $\{i,j\} \not\subseteq C$ then return $\perp$
6:    return PRE.RKG($sk_i, pk_i, sk_j, pk_j$)

7: function $\mathcal{O}_{\mathsf{Chall}}(i, m_0, m_1)$ ▷ Challenge
8:    if $i \not\in H$ and $|m_0| \neq |m_1|$ then return $\perp$
9:    return PRE.E($pk_i, m_b$)

10: function $\mathcal{O}_{\mathsf{E}}(i, m)$ ▷ Encryption
11:    return PRE.E($pk_i, m$)

12: function $\mathcal{O}_{\mathsf{RE}}(i, j, c)$ ▷ Re-encryption
13:    if $c \not\in D^* \cup D$, or $c \in D^*$ and $j \in C$ then
14:      return $\perp$
15:    return PRE.RE($rk_{i \to j}, c$)

16: function $\mathcal{O}_{\mathsf{D}}(j, c)$ ▷ Decryption
17:    if $c \in D^*$ then return $\perp$
18:    return PRE.D($sk_j, c$)

FIG. 6

PPA-HRCCA GAME ORACLES

1: function $\mathcal{O}^{UNI}_{Enroll}(i, j)$ ▷ Unidirectional Enroll
2:    if $i \in H, j \in C$ then return $\perp$
3:    return PPA.Enroll($sk_i, pk_i, pk_j$)

4: function $\mathcal{O}^{BI}_{Enroll}(i, j)$ ▷ Bidirectional Enroll
5:    if $\{i, j\} \not\subseteq H$ or $\{i, j\} \not\subseteq C$ then return $\perp$
6:    return PPA.Enroll($sk_i, pk_i, sk_j, pk_j$)

7: function $\mathcal{O}_{Chall}(i, a, m_0, m_1)$ ▷ Challenge
8:    if $i \notin H$ and $|m_0| \neq |m_1|$ then return $\perp$
9:    return PPA.Send($pk_i, m_b$)

10: function $\mathcal{O}_{Send}(i, m)$ ▷ Send
11:    return PPA.Send($pk_i, m$)

12: function $\mathcal{O}_{Relay}(i, j, c)$ ▷ Relay
13:    if $c \notin D^* \cup D_i$ or $c \in D^*$ and $j \in C$ then
14:      return $\perp$
15:    return PPA.Relay($rk_{i \to j}, c$)

16: function $\mathcal{O}_{Verify}(j, c)$ ▷ Verify
17:    if $c \in D^*$ then return $\perp$
18:    return PPA.Verify($sk_j, c$)

FIG. 7

PPA CONSTRUCTION

1: function PPA.Setup($1^\lambda$)                    ▷ Setup
2:    $pp \leftarrow$ PRE.Setup($1^\lambda$)
3:    $ak \leftarrow$ Init(A)
4:    return $pp$ 5: function PPA.KG($pp$)                    ▷ Key Generation
6:    $(pk, sk) \leftarrow$ PRE.KG($pp$)
7:    return $(pk, sk)$ 8: function PPA.Enroll($(pk_i, sk_i), (pk_j, sk_j^*)$)
9:                              ▷ Enroll User/Proxy
10:   $rk_{i \to j} \leftarrow$ PRE.RKG($(pk_i, sk_i), (pk_j, sk_j^*)$)
11:   return $rk_{i \to j}$ 12: function PPA.Send($pk, a, m$)        ▷ Send Message
13:   $c \leftarrow$ PRE.E($pk, a, m$)
14:   return $c$ 15: function PPA.Verify[A; $ak$]($sk, a, c$)
16:                         ▷ Receive and Verify Message
17:   $m \leftarrow$ PRE.D($pk, a, c$)
18:   $b \leftarrow A(ak, a, m)$
19:   return $b$ 20: function PPA.Relay($a, c, \mathcal{R}_i$)    ▷ Relay Message
21:   $rk_{i \to j} \leftarrow$ L($a, \mathcal{R}_i$)
22:   $c' \leftarrow$ PRE.RE($rk_{i \to j}, a, c$)
23:   return $c'$

FIG. 8

HYBRID-PRE CONSTRUCTION

1: function PRE.Setup($1^\lambda$)                     ▷ Setup
2:     Choose $\mathbb{G}$ of prime order $q$ with generator $g$
3:     return $pp = (g, q)$ 4: function PRE.KG($pp$)                     ▷ Key Generation
5:     $sk \xleftarrow{\$} \mathbb{Z}_q^*$; $pk \leftarrow g^{sk}$
6:     return $(pk, sk)$ 7: function PRE.RKG($(pk_i, sk_i), (pk_j, sk_j)$)
8:                                         ▷ ReKey Generation
9:     $rk_{i \rightarrow j} \leftarrow sk_i / sk_j$
10:    return $rk_{i \rightarrow j}$ 11: function PRE.E($pk, a, m$)              ▷ Encryption
12:    $r \xleftarrow{\$} \mathbb{Z}_q^*$; $c_1 \leftarrow g^r$
13:    $K = F(pk^r)$; $c_2 \leftarrow$ SE.E($K, a, m$)
14:    return $(c_1, c_2)$ 15: function PRE.D($sk, a, c$)              ▷ Decryption
16:    Parse $c$ as $(c_1, c_2)$
17:    $K = F(c_1^{sk})$; $m \leftarrow$ SE.D($K, a, c$)
18:    return $m$ 19: function PRE.RE($rk_{i \rightarrow j}, a, c$)      ▷ ReEncryption
20:    Parse $c$ as $(c_1, c_2)$
21:    $c_1' \leftarrow c_1^{rk_{i \rightarrow j}}$
22:    return $(c_1', c_2)$

FIG. 9

KREM CCA Game Oracles

1: function $\mathcal{O}_{\mathsf{RKG}}(i,j)$ ▷ ReKey Generation
2:   if $\{i,j\} \not\subseteq H$ or $\{i,j\} \not\subseteq C$ then return $\bot$
3:   return $rk_{i \to j}$ 4: function $\mathcal{O}_{\mathsf{Chall}}(i)$ ▷ Challenge
5:   if $i \notin H$ then return $\bot$
6:   $(c, k_0) \gets \mathsf{KREM.Encaps}(pk_i)$
7:   $k_1 \xleftarrow{\$} \{0,1\}^{|k_0|}$
8:   return $(c, k_b)$ 9: function $\mathcal{O}_{\mathsf{Encaps}}(i)$ ▷ Encapsulation
10:  return $\mathsf{KREM.Encaps}(pk_i)$ 11: function $\mathcal{O}_{\mathsf{ReEncaps}}(i,j,c)$ ▷ Re-encapsulation
12:  if $c \notin D^* \cup D$, or $c \in D^*$ and $j \in C$ then
13:    return $\bot$
14:  return $\mathsf{KREM.ReEncaps}(rk_{i \to j}, c)$ 15: function $\mathcal{O}_{\mathsf{Decaps}}(i,c)$ ▷ Decapsulation
16:  if $c \in D^*$ then return $\bot$
17:  return $\mathsf{KREM.Decaps}(sk_i, c)$

FIG. 12A

```
THE ORACLES SIMULATED BY B

1: function $\mathcal{O}_{\mathsf{RKG}}(i,j)$                    ▷ ReKey Generation
 2:     if $\{i,j\} \not\subseteq H$ or $\{i,j\} \not\subseteq C$ then return $\bot$
 3:     else if $\{i,j\} \subseteq C$ then
 4:         return KREM.RKG$((pk_i, sk_i), (pk_j, sk_j))$
 5:     else if $\{i,j\} \subseteq H$ then return $r_i/r_j$ 6: function $\mathcal{O}_{\mathsf{Chall}}(i)$                    ▷ Challenge
 7:     if $i \notin H$ then return $\bot$
 8:     return $((g^u)^{1/r_i}, W)$ 9: function $\mathcal{O}_{\mathsf{Encaps}}(i)$                   ▷ Encapsulation
10:     $r \stackrel{\$}{\leftarrow} \mathbb{Z}_q^*;\ c \leftarrow g^r;\ R[c] \leftarrow r$
11:     return $(c, F(pk_i^r))$ 12: function $\mathcal{O}_{\mathsf{ReEncaps}}(i,j,c)$             ▷ Re-encapsulation
13:     if $c \notin D^* \cup D$, or $c \in D^*$ and $j \in C$ then
14:         return $\bot$
15:     else if $\{i,j\} \subseteq C$ then
16:         return KREM.ReEncaps$(sk_i/sk_j, c)$
17:     else if $\{i,j\} \subseteq H$ then
18:         return KREM.ReEncaps$(r_i/r_j, c)$
19:     else if $i \in C, j \in H$ then
20:         return $c^{sk_i/r_j}$
21:     else if $i \in H, j \in C$ then
22:         for all $i' \in H$ do
23:             if $R[c^{r_i/r_{i'}}] \neq \bot$ then
24:                 $r \leftarrow R[c^{r_i/r_{i'}}]$
25:                 return $(g^v)^{rr_{i'}/sk_i}$ 26: function $\mathcal{O}_{\mathsf{Decaps}}(i,c)$                 ▷ Decapsulation
27:     if $c \in D^*$ then return $\bot$
28:     else if $i \in H$ then
29:         return $F_v(c^{r_i})$
30:     return KREM.Decaps$(sk_i, c)$
```

FIG. 12B

METHOD, SYSTEM, AND COMPUTER PROGRAM PRODUCT FOR NETWORK BOUND PROXY RE-ENCRYPTION AND PIN TRANSLATION

CROSS REFERENCE TO RELATED APPLICATIONS

This application is a continuation of U.S. patent application Ser. No. 17/421,587, filed on Jul. 8, 2021, which is the United States national phase of International Application No. PCT/US2020/012896, filed Jan. 9, 2020, which claims priority to U.S. Provisional Patent Application Nos. 62/790,163, filed Jan. 9, 2019, and 62/929,344, filed Nov. 1, 2019, the disclosures of which are incorporated by reference herein in their entireties.

BACKGROUND

1. Field

This disclosed subject matter relates generally to methods, systems, and products for communicating pins and other sensitive data and, in some particular embodiments or aspects, to methods, systems, and computer program products for securely transmitting pins and other sensitive data.

2. Technical Considerations

Credit and debit-card payment transactions are processed by a large number of parties, including point-of-sale (POS) terminals, payment gateways, merchant banks, payment networks and consumer banks. To reduce fraudulent transactions, the payments ecosystem commonly deploys personal identification number (PIN) based authentication, where a consumer enters a PIN into a terminal, which is transmitted in an encrypted form—along with other sensitive data, such as a personal account number (PAN)—across the entire network to the consumer's bank, which verifies the PIN before authorizing the transaction. Not surprisingly, payment card industry (PCI) regulations mandate that the PIN is never exposed in the clear to any party. Present deployments achieve compliance by using hardware security modules (HSMs) at each intermediary to decrypt-then-encrypt the PIN before forwarding to the next party.

As a result, HSMs are proliferated across all intermediaries, starting from the payment gateways. This incurs significant costs, in part due to the purchase and maintenance of these HSMs, and in part due to the burden of observing and policing PCI compliance. Moreover, HSMs become a performance bottleneck, as the maximum throughput of payment transactions at any party depends on the number of available HSMs at that party, creating further issues during occasional spikes in traffic, such as during holidays. For example, some payment networks process on average 5,000 transactions per second, and are designed to handle upwards of 60,000 transactions per second; therefore, a large number of HSMs must be deployed to ensure sufficient hardware parallelism to handle this throughput.

SUMMARY

Accordingly, it is an object of the presently disclosed subject matter to provide methods, systems, and computer program products for securely transmitting personal identification numbers (PINs) and other sensitive data.

According to some non-limiting embodiments or aspects, provided are a method, a system, and a computer program product that generate, with a point-of-sale (POS) terminal, a first ciphertext associated with a transaction, the first ciphertext comprising: (i) a first ciphertext value associated with a randomly selected key (r), the first ciphertext value encrypted based on the randomly selected key (r) and a generator value (g); and (ii) a second ciphertext value associated with a first public key ($pk_1$) of a first pair of keys comprising a first public key ($pk_1$) and a first secret key ($sk_1$), the first public key ($pk_1$) generated based on the first secret key ($sk_1$) and the generator value (g), the second ciphertext value encrypted based on transaction data associated with the transaction and a symmetric key (K) generated based on the first public key ($pk_1$) and the randomly selected key (r); communicate, with the POS terminal, the first ciphertext to at least one payment gateway; re-encrypt, with the at least one payment gateway, the first ciphertext value with a first re-encryption key to transform the first ciphertext value encrypted under the first public key ($pk_1$) to a re-encrypted first ciphertext value encrypted under a second public key ($pk_2$) associated with the at least one payment gateway; communicate, with the at least one payment gateway, the re-encrypted first ciphertext value and the second ciphertext value to at least one merchant bank; re-encrypt, with the at least one merchant bank, the re-encrypted first ciphertext value encrypted with a second re-encryption key to transform the re-encrypted first ciphertext value encrypted under the second public key ($pk_2$) of the at least one payment gateway to a second re-encrypted first ciphertext value under a third public key ($pk_3$) of the at least one merchant bank; communicate, with the at least one merchant bank, the second re-encrypted first ciphertext value and the second ciphertext value to a payment network; re-encrypt, with the payment network, the second re-encrypted first ciphertext value encrypted with a third re-encryption key to transform the second re-encrypted first ciphertext value encrypted under the third public key ($pk_3$) of the at least one merchant bank to a third re-encrypted first ciphertext value under a fourth public key ($pk_4$) of the payment network; communicate, with the payment network, the third re-encrypted first ciphertext value and the second ciphertext value to at least one consumer bank; determine, with the at least one consumer bank, the symmetric key (K) based on the third re-encrypted first ciphertext value and a secret key of the consumer bank; and decrypt, with the at least one consumer bank, the second ciphertext value based on the symmetric key (K) to obtain the transaction data.

According to some non-limiting embodiments or aspects, provided are a method, a system, and a computer program product that receive, at a payment gateway, a merchant bank public key corresponding to a merchant bank private key, the merchant bank public key and the merchant bank private key associated with a merchant bank system; communicate, from the payment gateway to a point-of-sale system, the merchant bank public key; receive, from the point-of-sale system, at least one re-encryption key, the at least one re-encryption key based on a private key associated with the point-of-sale system and the merchant bank public key; receive, from the point-of-sale system, encrypted transaction data for a transaction, the encrypted transaction data comprising: (i) an encrypted code comprising an authentication code encrypted with a session key, and (ii) an encrypted session key comprising the session key encrypted with a public key associated with the point-of-sale system and corresponding to the private key associated with the point-of-sale system; determine, with the payment gateway, a re-encryption key from the at least one re-encryption key based on the encrypted transaction data; re-encrypt, with the payment gateway, the encrypted session key with the re-encryption key; and communicate, with the payment gateway, the re-encrypted encrypted session key to a merchant bank system.

According to some non-limiting embodiments or aspects, provided are a method, a system, and a computer program product that generate, with a point-of-sale system, a public key and a private key associated with the point-of-sale system; receive, at the point-of-sale system, a merchant bank public key corresponding to a merchant bank private key, the merchant bank public key and the merchant bank private key associated with a merchant bank system; generate, with a point-of-sale system, at least one re-encryption key based on the private key associated with the point-of-sale system; communicate, from the point-of-sale system to a payment gateway, the at least one re-encryption key; generate, with the point-of-sale system, encrypted transaction data for a transaction, the encrypted transaction data comprising: (i) an encrypted code comprising an authentication code encrypted with a session key, and (ii) an encrypted session key comprising the session key encrypted with the public key associated with the point-of-sale system; and communicate, from the point-of-sale system to the payment gateway, the encrypted transaction data.

According to some non-limiting embodiments or aspects, provided are a method, a system, and a computer program product that generate, with a merchant bank system, a public key and a private key associated with the merchant bank system; communicate, with the merchant bank system to a payment gateway, the public key associated with the merchant bank system; receive, with the merchant bank system from the payment gateway, encrypted transaction data comprising: (i) an encrypted code comprising an authentication code encrypted with a session key, and (ii) a re-encrypted encrypted session key comprising an encrypted session key encrypted with a re-encryption key, the encrypted session key comprising the session key encrypted with a public key associated with the point-of-sale system; and decrypting, with the merchant bank system, the re-encrypted encrypted session key based on the private key associated with the merchant bank system.

According to some non-limiting embodiments or aspects, provided are a method, a system, and a computer program product that receive or generate, with a transaction processing system, an issuer key pair comprising an issuer public key and a corresponding issuer private key, the issuer key pair associated with an issuer system; receive or generate, with the transaction processing system, a merchant bank key pair comprising a merchant bank public key and a corresponding merchant bank private key, the merchant bank key pair associated with a merchant bank system; generate, with the transaction processing system, at least one re-encryption key based at least partially on the issuer key pair and the merchant bank key pair; receive, from the merchant bank system, encrypted transaction data for a transaction, the encrypted transaction data comprising: (i) an encrypted code comprising an authentication code encrypted with a session key, and (ii) an encrypted session key comprising a session key encrypted with the merchant bank public key; re-encrypt the encrypted session key with the at least one re-encryption key; and communicate the re-encrypted encrypted session key and the encrypted code to the issuer system.

According to some non-limiting embodiments or aspects, provided are a method, a system, and a computer program product that generate, with a payment network, a first value (a) and a second value ($g^a$), the second value ($g^a$) generated based on the first value (a) and a generator value (g); generate, with the payment network, a plurality of random merchant numbers ($m_i$) for a respective plurality of merchant banks; determine, with the payment network, a merchant product (M) based on a product of the plurality of random merchant numbers ($m_i$) for the respective plurality of merchant banks; generate, with the payment network, a public key ($pk_i$) based on the second value ($g^a$), the merchant product (M), and the random merchant number ($m_i$) and a random key ($rk_i$) based on the merchant product (M) and the random merchant number ($m_i$) for each respective merchant bank of the plurality of merchant banks; and communicate, with the payment network, the public key ($pk_i$) and the random key ($rk_i$) to at least one respective merchant bank.

Further non-limiting embodiments or aspects are set forth in the following numbered clauses:

Clause 1. A computer-implemented method comprising: generating, with a point-of-sale (POS) terminal, a first ciphertext associated with a transaction, the first ciphertext comprising: (i) a first ciphertext value associated with a randomly selected key (r), the first ciphertext value encrypted based on the randomly selected key (r) and a generator value (g); and (ii) a second ciphertext value associated with a first public key ($pk_1$) of a first pair of keys comprising a first public key ($pk_1$) and a first secret key ($sk_1$), the first public key ($pk_1$) generated based on the first secret key ($sk_1$) and the generator value (g), the second ciphertext value encrypted based on transaction data associated with the transaction and a symmetric key (K) generated based on the first public key ($pk_1$) and the randomly selected key (r); communicating, with the POS terminal, the first ciphertext to at least one payment gateway; re-encrypting, with the at least one payment gateway, the first ciphertext value with a first re-encryption key to transform the first ciphertext value encrypted under the first public key ($pk_1$) to a re-encrypted first ciphertext value encrypted under a second public key ($pk_2$) associated with the at least one payment gateway; communicating, with the at least one payment gateway, the re-encrypted first ciphertext value and the second ciphertext value to at least one merchant bank; re-encrypting, with the at least one merchant bank, the re-encrypted first ciphertext value encrypted with a second re-encryption key to transform the re-encrypted first ciphertext value encrypted under the second public key ($pk_2$) of the at least one payment gateway to a second re-encrypted first ciphertext value under a third public key ($pk_3$) of the at least one merchant bank; communicating, with the at least one merchant bank, the second re-encrypted first ciphertext value and the second ciphertext value to a payment network; re-encrypting, with the payment network, the second re-encrypted first ciphertext value encrypted with a third re-encryption key to transform the second re-encrypted first ciphertext value encrypted under the third public key ($pk_3$) of the at least one merchant bank to a third re-encrypted first ciphertext value under a fourth public key ($pk_4$) of the payment network; communicating, with the payment network, the third re-encrypted first ciphertext value and the second ciphertext value to at least one consumer bank; determining, with the at least one consumer bank, the symmetric key (K) based on the third re-encrypted first ciphertext value and a secret key of the consumer bank; and decrypting, with the at least one consumer bank, the second ciphertext value based on the symmetric key (K) to obtain the transaction data.

Clause 2. The computer-implemented method of clause 1, wherein an intermediary server translates between multiple different parties by decrypting the second ciphertext value and using a portion of the transaction data to determine routing and a corresponding re-encryption key for a subsequent communication.

Clause 3. The computer-implemented method of clauses 1 or 2, wherein the transaction data includes at least one of a mobile personal identification number (PIN), a card verification number, or a card number associated therewith.

Clause 4. The computer-implemented method of any of clauses 1-3, wherein the second ciphertext value is used to encrypt a personal identification number (PIN) under the randomly selected key (r) protected by the first ciphertext value, and wherein a re-encryption generates a new ciphertext value while the second ciphertext value is unchanged.

Clause 5. A system comprising: a point-of-sale (POS) terminal including one or more processors, wherein the POS terminal is programmed and/or configured to: generate a first ciphertext associated with a transaction, the first ciphertext comprising: (i) a first ciphertext value associated with a randomly selected key (r), the first ciphertext value encrypted based on the randomly selected key (r) and a generator value (g); and (ii) a second ciphertext value associated with a first public key ($pk_1$) of a first pair of keys comprising a first public key ($pk_1$) and a first secret key ($sk_1$), the first public key ($pk_1$) generated based on the first secret key ($sk_1$) and the generator value (g), the second ciphertext value encrypted based on transaction data associated with the transaction and a symmetric key (K) generated based on the first public key ($pk_1$) and the randomly selected key (r); and communicate the first ciphertext to at least one payment gateway; the at least one payment gateway including one or more processors, wherein the at least one payment gateway is programmed and/or configured to: re-encrypt the first ciphertext value with a first re-encryption key to transform the first ciphertext value encrypted under the first public key ($pk_1$) to a re-encrypted first ciphertext value encrypted under a second public key ($pk_2$) associated with the at least one payment gateway; and communicate the re-encrypted first ciphertext value and the second ciphertext value to at least one merchant bank; the at least one merchant bank including one or more processors, wherein the at least one merchant bank is programmed and/or configured to: re-encrypt the re-encrypted first ciphertext value encrypted with a second re-encryption key to transform the re-encrypted first ciphertext value encrypted under the second public key ($pk_2$) of the at least one payment gateway to a second re-encrypted first ciphertext value under a third public key ($pk_3$) of the at least one merchant bank; and communicate the second re-encrypted first ciphertext value and the second ciphertext value to a payment network; the payment network including one or more processors, wherein the payment network is programmed and/or configured to: re-encrypt the second re-encrypted first ciphertext value encrypted with a third re-encryption key to transform the second re-encrypted first ciphertext value encrypted under the third public key ($pk_3$) of the at least one merchant bank to a third re-encrypted first ciphertext value under a fourth public key ($pk_4$) of the payment network; and communicate the third re-encrypted first ciphertext value and the second ciphertext value to at least one consumer bank; and the at least one consumer bank including one or more processors, wherein the at least one consumer bank is programmed and/or configured to: determine the symmetric key (K) based on the third re-encrypted first ciphertext value and a secret key of the consumer bank; and decrypt the second ciphertext value based on the symmetric key (K) to obtain the transaction data.

Clause 6. The system of clause 5, further comprising: an intermediary server programmed and/or configured to translate between multiple different parties by decrypting the second ciphertext value and using a portion of the transaction data to determine routing and a corresponding re-encryption key for a subsequent communication.

Clause 7. The system of clauses 5 or and 6, wherein the transaction data includes at least one of a mobile personal identification number (PIN), a card verification number, or a card number associated therewith.

Clause 8. The system of any of clauses 5-7, wherein the second ciphertext value is used to encrypt a personal identification number (PIN) under the randomly selected key (r) protected by the first ciphertext value, and wherein a re-encryption generates a new ciphertext value while the second ciphertext value is unchanged.

Clause 9. A computer program product comprising at least one non-transitory computer-readable medium including program instructions that, when executed by at least one processor, cause the at least one processor to: generate, with a point-of-sale (POS) terminal, a first ciphertext associated with a transaction, the first ciphertext comprising: (i) a first ciphertext value associated with a randomly selected key (r), the first ciphertext value encrypted based on the randomly selected key (r) and a generator value (g); and (ii) a second ciphertext value associated with a first public key ($pk_1$) of a first pair of keys comprising a first public key ($pk_1$) and a first secret key ($sk_1$), the first public key ($pk_1$) generated based on the first secret key ($sk_1$) and the generator value (g), the second ciphertext value encrypted based on transaction data associated with the transaction and a symmetric key (K) generated based on the first public key ($pk_1$) and the randomly selected key (r); communicate, with the POS terminal, the first ciphertext to at least one payment gateway; re-encrypt, with the at least one payment gateway, the first ciphertext value with a first re-encryption key to transform the first ciphertext value encrypted under the first public key ($pk_1$) to a re-encrypted first ciphertext value encrypted under a second public key ($pk_2$) associated with the at least one payment gateway; communicate, with the at least one payment gateway, the re-encrypted first ciphertext value and the second ciphertext value to at least one merchant bank; re-encrypt, with the at least one merchant bank, the re-encrypted first ciphertext value encrypted with a second re-encryption key to transform the re-encrypted first ciphertext value encrypted under the second public key ($pk_2$) of the at least one payment gateway to a second re-encrypted first ciphertext value under a third public key ($pk_3$) of the at least one merchant bank; communicate, with the at least one merchant bank, the second re-encrypted first ciphertext value and the second ciphertext value to a payment network; re-encrypt, with the payment network, the second re-encrypted first ciphertext value encrypted with a third re-encryption key to transform the second re-encrypted first ciphertext value encrypted under the third public key ($pk_3$) of the at least one merchant bank to a third re-encrypted first ciphertext value under a fourth public key ($pk_4$) of the payment network; communicate, with the payment network, the third re-encrypted first ciphertext value and the second ciphertext value to at least one consumer bank; determine, with the at least one consumer bank, the symmetric key (K) based on the third re-encrypted first ciphertext value and a secret key of the consumer bank; and decrypt, with the at least one consumer bank, the second ciphertext value based on the symmetric key (K) to obtain the transaction data.

Clause 10. The computer program product of clause 9, wherein an intermediary server translates between multiple different parties by decrypting the second ciphertext value and using a portion of the transaction data to determine routing and a corresponding re-encryption key for a subsequent communication.

Clause 11. The computer program product of clauses 9 or 10, wherein the transaction data includes at least one of a mobile personal identification number (PIN), a card verification number, or a card number associated therewith.

Clause 12. The computer program product of any of clauses 9-11, wherein the second ciphertext value is used to encrypt a personal identification number (PIN) under the randomly selected key (r) protected by the first ciphertext value, and wherein a re-encryption generates a new ciphertext value while the second ciphertext value is unchanged.

Clause 13. A method for encrypting an authentication code, comprising: receiving, at a payment gateway, a merchant bank public key corresponding to a merchant bank private key, the merchant bank public key and the merchant bank private key associated with a merchant bank system; communicating, from the payment gateway to a point-of-sale system, the merchant bank public key; receiving, from the point-of-sale system, at least one re-encryption key, the at least one re-encryption key based on a private key associated with the point-of-sale system and the merchant bank public key; receiving, from the point-of-sale system, encrypted transaction data for a transaction, the encrypted transaction data comprising: (i) an encrypted code comprising an authentication code encrypted with a session key, and (ii) an encrypted session key comprising the session key encrypted with a public key associated with the point-of-sale system and corresponding to the private key associated with the point-of-sale system; determining, with the payment gateway, a re-encryption key from the at least one re-encryption key based on the encrypted transaction data; re-encrypting, with the payment gateway, the encrypted session key with the re-encryption key; and communicating, with the payment gateway, the re-encrypted encrypted session key to a merchant bank system.

Clause 14. The method of clause 13, wherein the point-of-sale system comprises at least one of the following: a point-of-sale terminal, a server computer associated with a merchant or merchant bank system, a server computer associated with a point-of-sale service provider, or any combination thereof.

Clause 15. The method of clauses 13 or 14, wherein the at least one re-encryption key comprises a plurality of re-encryption keys, and wherein each re-encryption key of the plurality of re-encryption keys corresponds with a public key of a plurality of merchant bank public keys, the plurality of merchant bank public keys including the merchant bank public key.

Clause 16. The method of any of clauses 13-15, wherein the at least one re-encryption key is generated by the point-of-sale system.

Clause 17. The method of any of clauses 13-16, wherein the private key associated with the point-of-sale system corresponds to a public key, and wherein the private key and public key associated with the point-of-sale system are generated by the point-of-sale system.

Clause 18. The method of any of clauses 13-17, further comprising: receiving or generating, at a transaction processing system, an issuer public key corresponding to an issuer private key, the issuer public key and the issuer private key associated with an issuer system; generating, with the transaction processing system, at least one second re-encryption key based on the issuer private key and the merchant bank private key or a second merchant bank private key; re-encrypting the encrypted session key with the at least one second re-encryption key; and communicating the re-encrypted encrypted session key to the issuer system.

Clause 19. The method of any of clauses 13-18, further comprising: generating, by the merchant bank system or the payment gateway, an authorization request message in response to verifying the authentication code; and communicating, by the merchant bank system or the payment gateway, the authorization request message to a transaction processing system.

Clause 20. A method for encrypting an authentication code, comprising: generating, with a point-of-sale system, a public key and a private key associated with the point-of-sale system; receiving, at the point-of-sale system, a merchant bank public key corresponding to a merchant bank private key, the merchant bank public key and the merchant bank private key associated with a merchant bank system; generating, with a point-of-sale system, at least one re-encryption key based on the private key associated with the point-of-sale system; communicating, from the point-of-sale system to a payment gateway, the at least one re-encryption key; generating, with the point-of-sale system, encrypted transaction data for a transaction, the encrypted transaction data comprising: (i) an encrypted code comprising an authentication code encrypted with a session key, and (ii) an encrypted session key comprising the session key encrypted with the public key associated with the point-of-sale system; and communicating, from the point-of-sale system to the payment gateway, the encrypted transaction data.

Clause 21. The method of clause 20, wherein the point-of-sale system comprises at least one of the following: a point-of-sale terminal, a server computer associated with a merchant or merchant bank system, a server computer associated with a point-of-sale service provider, or any combination thereof.

Clause 22. The method of clauses 20 or 21, wherein the at least one re-encryption key comprises a plurality of re-encryption keys, and wherein each re-encryption key of the plurality of re-encryption keys corresponds with a public key of a plurality of merchant bank public keys, the plurality of merchant bank public keys including the merchant bank public key.

Clause 23. A method for encrypting an authentication code, comprising: generating, with a merchant bank system, a public key and a private key associated with the merchant bank system; communicating, with the merchant bank system to a payment gateway, the public key associated with the merchant bank system; receiving, with the merchant bank system from the payment gateway, encrypted transaction data comprising: (i) an encrypted code comprising an authentication code encrypted with a session key, and (ii) a re-encrypted encrypted session key comprising an encrypted session key encrypted with a re-encryption key, the encrypted session key comprising the session key encrypted with a public key associated with the point-of-sale system; and decrypting, with the merchant bank system, the re-encrypted encrypted session key based on the private key associated with the merchant bank system.

Clause 24. The method of clause 23, further comprising: generating, with the merchant bank system, an authorization request message in response to verifying the authentication code; and communicating, with the merchant bank system, the authorization request message to a transaction processing system.

Clause 25. A method for encrypting an authentication code, comprising: receiving or generating, with a transaction processing system, an issuer key pair comprising an issuer public key and a corresponding issuer private key, the issuer key pair associated with an issuer system; receiving or generating, with the transaction processing system, a merchant bank key pair comprising a merchant bank public key and a corresponding merchant bank private key, the merchant bank key pair associated with a merchant bank system; generating, with the transaction processing system, at least one re-encryption key based at least partially on the issuer key pair and the merchant bank key pair; receiving, from the merchant bank system, encrypted transaction data for a transaction, the encrypted transaction data comprising: (i) an encrypted code comprising an authentication code encrypted with a session key, and (ii) an encrypted session key comprising a session key encrypted with the merchant bank public key; re-encrypting the encrypted session key with the at least one re-encryption key; and communicating the re-encrypted encrypted session key and the encrypted code to the issuer system.

Clause 26. The method of clause 25, further comprising: receiving, with the issuer system, the re-encrypted encrypted session key from the transaction processing system; decrypting, with the issuer system, the re-encrypted encrypted session key based at least partially on the issuer private key; and decrypting, with the issuer system, the encrypted code based at least partially on the session key.

Clause 27. A system for encrypting an authentication code, comprising a payment gateway including at least one processor programmed or configured to: receive a merchant bank public key corresponding to a merchant bank private key, the merchant bank public key and the merchant bank private key associated with a merchant bank system; communicate, to a point-of-sale system, the merchant bank public key; receive, from the point-of-sale system, at least one re-encryption key, the at least one re-encryption key based on a private key associated with the point-of-sale system and the merchant bank public key; receive, from the point-of-sale system, encrypted transaction data for a transaction, the encrypted transaction data comprising: (i) an encrypted code comprising an authentication code encrypted with a session key, and (ii) an encrypted session key comprising the session key encrypted with a public key associated with the point-of-sale system and corresponding to the private key associated with the point-of-sale system; determine a re-encryption key from the at least one re-encryption key based on the encrypted transaction data; re-encrypt the encrypted session key with the re-encryption key; and communicate the re-encrypted encrypted session key to a merchant bank system.

Clause 28. The system of clause 27, wherein the point-of-sale system comprises at least one of the following: a point-of-sale terminal, a server computer associated with a merchant or merchant bank system, a server computer associated with a point-of-sale service provider, or any combination thereof.

Clause 29. The system of clauses 27 or 28, wherein the at least one re-encryption key comprises a plurality of re-encryption keys, and wherein each re-encryption key of the plurality of re-encryption keys corresponds with a public key of a plurality of merchant bank public keys, the plurality of merchant bank public keys including the merchant bank public key.

Clause 30. The system of any of clauses 27-29, wherein the at least one re-encryption key is generated by the point-of-sale system.

Clause 31. The system of any of clauses 27-30, wherein the private key associated with the point-of-sale system corresponds to a public key, and wherein the private key and public key associated with the point-of-sale system are generated by the point-of-sale system.

Clause 32. The system of any of clauses 27-31, further comprising a transaction processing system including at least one processor programmed or configured to: receive or generate an issuer public key corresponding to an issuer private key, the issuer public key and the issuer private key associated with an issuer system; generate at least one second re-encryption key based on the issuer private key and the merchant bank private key or a second merchant bank private key; re-encrypt the encrypted session key with the at least one second re-encryption key; and communicate the re-encrypted encrypted session key to the issuer system.

Clause 33. The system of any of clauses 27-32, wherein the at least one processor of the payment gateway or at least one processor of the merchant bank system is programmed or configured to: generate an authorization request message in response to verifying the authentication code; and communicate the authorization request message to a transaction processing system.

Clause 34. A system for encrypting an authentication code, comprising a point-of-sale system including at least one processor programmed or configured to: generate a public key and a private key associated with the point-of-sale system; receive a merchant bank public key corresponding to a merchant bank private key, the merchant bank public key and the merchant bank private key associated with a merchant bank system; generate at least one re-encryption key based on the private key associated with the point-of-sale system; communicate, to a payment gateway, the at least one re-encryption key; generate encrypted transaction data for a transaction, the encrypted transaction data comprising: (i) an encrypted code comprising an authentication code encrypted with a session key, and (ii) an encrypted session key comprising the session key encrypted with the public key associated with the point-of-sale system; and communicate, to the payment gateway, the encrypted transaction data.

Clause 35. The system of clause 34, wherein the point-of-sale system comprises at least one of the following: a point-of-sale terminal, a server computer associated with a merchant or merchant bank system, a server computer associated with a point-of-sale service provider, or any combination thereof.

Clause 36. The system of clauses 34 or 35, wherein the at least one re-encryption key comprises a plurality of re-encryption keys, and wherein each re-encryption key of the plurality of re-encryption keys corresponds with a public key of a plurality of merchant bank public keys, the plurality of merchant bank public keys including the merchant bank public key.

Clause 37. A system for encrypting an authentication code, comprising a merchant bank system including at least one processor, the at least one processor programmed or configured to: generate a public key and a private key associated with the merchant bank system; communicate, to a payment gateway, the public key associated with the merchant bank system; receive, from the payment gateway, encrypted transaction data comprising: (i) an encrypted code comprising an authentication code encrypted with a session key, and (ii) a re-encrypted encrypted session key comprising an encrypted session key encrypted with a re-encryption key, the encrypted session key comprising the session key encrypted with a public key associated with the point-of-sale system; and decrypt the re-encrypted encrypted session key based on the private key associated with the merchant bank system.

Clause 38. The system of clause 37, wherein the at least one processor is further programmed or configured to: generate an authorization request message in response to verifying the authentication code; and communicate the authorization request message to a transaction processing system.

Clause 39. A system for encrypting an authentication code, comprising a transaction processing system including at least one processor programmed or configured to: receive or generate an issuer key pair comprising an issuer public key and a corresponding issuer private key, the issuer key pair associated with an issuer system; receive or generate a merchant bank key pair comprising a merchant bank public key and a corresponding merchant bank private key, the merchant bank key pair associated with a merchant bank system; generate at least one re-encryption key based at least partially on the issuer key pair and the merchant bank key pair; receive, from the merchant bank system, encrypted transaction data for a transaction, the encrypted transaction data comprising: (i) an encrypted code comprising an authentication code encrypted with a session key, and (ii) an encrypted session key comprising a session key encrypted with the merchant bank public key; re-encrypt the encrypted session key with the at least one re-encryption key; and communicate the re-encrypted encrypted session key and the encrypted code to the issuer system.

Clause 40. The system of clause 39, further comprising the issuer system, the issuer system including at least one processor programmed or configured to: receive the re-encrypted encrypted session key from the transaction processing system; decrypt the re-encrypted encrypted session key based at least partially on the issuer private key; and decrypt the encrypted code based at least partially on the session key.

Clause 41. A computer program product comprising at least one non-transitory computer-readable medium including program instructions that, when executed by at least one processor, cause the at least one processor to: receive, at a payment gateway, a merchant bank public key corresponding to a merchant bank private key, the merchant bank public key and the merchant bank private key associated with a merchant bank system; communicate, from the payment gateway to a point-of-sale system, the merchant bank public key; receive, from the point-of-sale system, at least one re-encryption key, the at least one re-encryption key based on a private key associated with the point-of-sale system and the merchant bank public key; receive, from the point-of-sale system, encrypted transaction data for a transaction, the encrypted transaction data comprising: (i) an encrypted code comprising an authentication code encrypted with a session key, and (ii) an encrypted session key comprising the session key encrypted with a public key associated with the point-of-sale system and corresponding to the private key associated with the point-of-sale system; determine, with the payment gateway, a re-encryption key from the at least one re-encryption key based on the encrypted transaction data; re-encrypt the encrypted session key with the re-encryption key; and communicate the re-encrypted encrypted session key to a merchant bank system.

Clause 42. The computer program product of clause 41, wherein the point-of-sale system comprises at least one of the following: a point-of-sale terminal, a server computer associated with a merchant or merchant bank system, a server computer associated with a point-of-sale service provider, or any combination thereof.

Clause 43. The computer program product of clauses 41 or 42, wherein the at least one re-encryption key comprises a plurality of re-encryption keys, and wherein each re-encryption key of the plurality of re-encryption keys corresponds with a public key of a plurality of merchant bank public keys, the plurality of merchant bank public keys including the merchant bank public key.

Clause 44. The computer program product of any of clauses 41-43, wherein the at least one re-encryption key is generated by the point-of-sale system.

Clause 45. The computer program product of any of clauses 41-44, wherein the private key associated with the point-of-sale system corresponds to a public key, and wherein the private key and public key associated with the point-of-sale system are generated by the point-of-sale system.

Clause 46. The computer program product of any of clauses 41-45, wherein the one or more processors are further programmed and/or configured to: receive or generate, at a transaction processing system, an issuer public key corresponding to an issuer private key, the issuer public key and the issuer private key associated with an issuer system; generate, with the transaction processing system, at least one second re-encryption key based on the issuer private key and the merchant bank private key or a second merchant bank private key; re-encrypt the encrypted session key with the at least one second re-encryption key; and communicate the re-encrypted encrypted session key to the issuer system.

Clause 47. The computer program product of any of clauses 41-46, wherein the one or more processors are further programmed and/or configured to: generate, by the merchant bank system or the payment gateway, an authorization request message in response to verifying the authentication code; and communicate, by the merchant bank system or the payment gateway, the authorization request message to a transaction processing system.

Clause 48. A computer program product comprising at least one non-transitory computer-readable medium including program instructions that, when executed by at least one processor, cause the at least one processor to: generate, with a point-of-sale system, a public key and a private key associated with the point-of-sale system; receive, at the point-of-sale system, a merchant bank public key corresponding to a merchant bank private key, the merchant bank public key and the merchant bank private key associated with a merchant bank system; generate, with a point-of-sale system, at least one re-encryption key based on the private key associated with the point-of-sale system; communicate, from the point-of-sale system to a payment gateway, the at least one re-encryption key; generate, with the point-of-sale system, encrypted transaction data for a transaction, the encrypted transaction data comprising: (i) an encrypted code comprising an authentication code encrypted with a session key, and (ii) an encrypted session key comprising the session key encrypted with the public key associated with the point-of-sale system; and communicate, from the point-of-sale system to the payment gateway, the encrypted transaction data.

Clause 49. The computer program product of clause 48, wherein the point-of-sale system comprises at least one of the following: a point-of-sale terminal, a server computer associated with a merchant or merchant bank system, a server computer associated with a point-of-sale service provider, or any combination thereof.

Clause 50. The computer program product of clauses 48 or 49, wherein the at least one re-encryption key comprises a plurality of re-encryption keys, and wherein each re-encryption key of the plurality of re-encryption keys corresponds with a public key of a plurality of merchant bank public keys, the plurality of merchant bank public keys including the merchant bank public key.

Clause 51. A computer program product comprising at least one non-transitory computer-readable medium including program instructions that, when executed by at least one processor, cause the at least one processor to: generate, with a merchant bank system, a public key and a private key associated with the merchant bank system; communicate, with the merchant bank system to a payment gateway, the public key associated with the merchant bank system; receive, with the merchant bank system from the payment gateway, encrypted transaction data comprising: (i) an encrypted code comprising an authentication code encrypted with a session key, and (ii) a re-encrypted encrypted session key comprising an encrypted session key encrypted with a re-encryption key, the encrypted session key comprising the session key encrypted with a public key associated with the point-of-sale system; and decrypt, with the merchant bank system, the re-encrypted encrypted session key based on the private key associated with the merchant bank system.

Clause 52. The computer program product of clause 51, wherein the one or more processors are further programmed and/or configured to: generate, with the merchant bank system, an authorization request message in response to verifying the authentication code; and communicate, with the merchant bank system, the authorization request message to a transaction processing system.

Clause 53. A computer program product comprising at least one non-transitory computer-readable medium including program instructions that, when executed by at least one processor, cause the at least one processor to: receive or generate, with a transaction processing system, an issuer key pair comprising an issuer public key and a corresponding issuer private key, the issuer key pair associated with an issuer system; receive or generate, with the transaction processing system, a merchant bank key pair comprising a merchant bank public key and a corresponding merchant bank private key, the merchant bank key pair associated with a merchant bank system; generate, with the transaction processing system, at least one re-encryption key based at least partially on the issuer key pair and the merchant bank key pair; receive, from the merchant bank system, encrypted transaction data for a transaction, the encrypted transaction data comprising: (i) an encrypted code comprising an authentication code encrypted with a session key, and (ii) an encrypted session key comprising a session key encrypted with the merchant bank public key; re-encrypt the encrypted session key with the at least one re-encryption key; and communicate the re-encrypted encrypted session key and the encrypted code to the issuer system.

Clause 54. The computer program product of clause 53, wherein the instructions further cause the at least one processor to: receive, with the issuer system, the re-encrypted encrypted session key from the transaction processing system; decrypt, with the issuer system, the re-encrypted encrypted session key based at least partially on the issuer private key; and decrypt, with the issuer system, the encrypted code based at least partially on the session key.

Clause 55. A computer-implemented method, comprising: generating, with a payment network, a first value (a) and a second value ($g^a$), the second value ($g^a$) generated based on the first value (a) and a generator value (g); generating, with the payment network, a plurality of random merchant numbers ($m_i$) for a respective plurality of merchant banks; determining, with the payment network, a merchant product (M) based on a product of the plurality of random merchant numbers ($m_i$) for the respective plurality of merchant banks; generating, with the payment network, a public key ($pk_i$) based on the second value ($g^a$), the merchant product (M), and the random merchant number ($m_i$) and a random key ($rk_i$) based on the merchant product (M) and the random merchant number ($m_i$) for each respective merchant bank of the plurality of merchant banks; and communicating, with the payment network, the public key ($pk_i$) and the random key ($rk_i$) to at least one respective merchant bank.

Clause 56. The computer-implemented method of clause 55, further comprising: generating, with the merchant bank, a plurality of random payment gateway numbers ($p_i$) for a respective plurality of payment gateways; and generating, with the merchant bank, a payment gateway public key based on the second value ($g^a$), the merchant product (M), and the random payment gateway number ($p_i$) and a payment gateway random key based on the random payment gateway number ($p_i$) for each respective payment gateway of the plurality of payment gateways.

Clause 57. The computer-implemented method of clauses 55 or 56, further comprising: generating, with the merchant bank, a plurality of terminal numbers ($t_i$) for a respective plurality of point-of-sale (POS) terminals; and generating, with the merchant bank, a terminal public key based on the second value ($g^a$), the merchant product (M), the random payment gateway number ($p_i$), and the terminal number ($t_i$) and a terminal random key based on the random payment gateway number ($p_i$) and the terminal number ($t_i$) for each respective POS terminal of the plurality of POS terminals.

Clause 58. The computer-implemented method of any of clauses 55-57, further comprising: communicating, with the merchant bank, the terminal public key and the terminal random key to at least one payment gateway; and communicating, with the at least one payment gateway, the terminal public key to at least one POS terminal.

Clause 59. The computer-implemented method of any of clauses 55-58, further comprising: generating, with the at least one POS terminal, a random number (r) for a transaction message (m) associated with a transaction; generating, with the at least one POS terminal, a first ciphertext associated with the transaction, the first ciphertext comprising: (i) a first ciphertext value associated with the transaction message (m), the first ciphertext value encrypted based on the random number (r), a generator value (g), and the transaction message (m); and ii) a second ciphertext value associated with the random number (r), the second ciphertext value encrypted based on the random number (r) and the terminal public key; and communicating, with the POS terminal, the first ciphertext to the at least one payment gateway.

Clause 60. The computer-implemented method of any of clauses 55-59, further comprising: re-encrypting, with the at least one payment gateway, the second ciphertext value based on the terminal random key to transform the second ciphertext value to a re-encrypted second ciphertext value based on the second value ($g^a$), the merchant product (M), and the random number (r); and communicating, with the at least one payment gateway, the re-encrypted second ciphertext value and the first ciphertext value to the at least one merchant bank.

Clause 61. The computer-implemented method of any of clauses 55-60, further comprising: re-encrypting, with the at least one merchant bank, the re-encrypted second ciphertext value based on the random key ($rk_i$) to transform the re-encrypted second ciphertext value to a second re-encrypted second ciphertext value based on the second value ($g^a$), the merchant product (M), the merchant random number ($m_i$), and the random number (r); and communicating, with the at least one merchant bank, the second re-encrypted second ciphertext value and the first ciphertext value to the payment network.

Clause 62. The computer-implemented method of any of clauses 55-61, further comprising: decrypting, with the payment network, the first ciphertext value based on the second re-encrypted second ciphertext value, the merchant product (M), the merchant random number ($m_i$), and the first ciphertext value.

Clause 63. A system, comprising: a payment network including one or more processors, wherein the payment network is programmed and/or configured to: generate a first value (a) and a second value ($g^a$), the second value ($g^a$) generated based on the first value (a) and a generator value (g); generate a plurality of random merchant numbers ($m_i$) for a respective plurality of merchant banks; determine a merchant product (M) based on a product of the plurality of random merchant numbers ($m_i$) for the respective plurality of merchant banks; generate a public key ($pk_i$) based on the second value ($g^a$), the merchant product (M), and the random merchant number ($m_i$) and a random key ($rk_i$) based on the merchant product (M) and the random merchant number ($m_i$) for each respective merchant bank of the plurality of merchant banks; and communicate the public key ($pk_i$) and the random key ($rk_i$) to at least one respective merchant bank.

Clause 64. The system of clause 63, wherein the merchant bank includes one or more processors, and wherein the merchant bank is programmed and/or configured to: generate a plurality of random payment gateway numbers ($p_i$) for a respective plurality of payment gateways; generate a payment gateway public key based on the second value ($g^a$), the merchant product (M), and the random payment gateway number ($p_i$) and a payment gateway random key based on the random payment gateway number ($p_i$) for each respective payment gateway of the plurality of payment gateways.

Clause 65. The system of clauses 63 or 64, wherein the merchant bank is further programmed and/or configured to: generate a plurality of terminal numbers ($t_i$) for a respective plurality of point-of-sale (POS) terminals; and generate a terminal public key based on the second value ($g^a$), the merchant product (M), the random payment gateway number ($p_i$), and the terminal number ($t_i$) and a terminal random key based on the random payment gateway number ($p_i$) and the terminal number ($t_i$) for each respective POS terminal of the plurality of POS terminals.

Clause 66. The system of any of clauses 63-65, wherein the merchant bank is further programmed and/or configured to: communicate the terminal public key and the terminal random key to at least one payment gateway, wherein the at least one payment gateway includes one or more processors, and wherein the at least one payment gateway is programmed and/or configured to: communicate the terminal public key to at least one POS terminal.

Clause 67. The system of any of clauses 63-66, wherein the at least one POS terminal includes one or more processors, and wherein the at least one POS terminal is programmed and/or configured to: generate a random number (r) for a transaction message (m) associated with a transaction; generate a first ciphertext associated with the transaction, the first ciphertext comprising: (i) a first ciphertext value associated with the transaction message (m), the first ciphertext value encrypted based on the random number (r), a generator value (g), and the transaction message (m); and ii) a second ciphertext value associated with the random number (r), the second ciphertext value encrypted based on the random number (r) and the terminal public key; and communicate the first ciphertext to the at least one payment gateway.

Clause 68. The system of any of clauses 63-67, wherein the at least one payment gateway is further programmed and/or configured to: re-encrypt the second ciphertext value based on the terminal random key to transform the second ciphertext value to a re-encrypted second ciphertext value based on the second value ($g^a$), the merchant product (M), and the random number (r); and communicate the re-encrypted second ciphertext value and the first ciphertext value to the at least one merchant bank.

Clause 69. The system of any of clauses 63-68, wherein the at least one merchant bank is further programmed and/or configured to: re-encrypt the re-encrypted second ciphertext value based on the random key ($rk_i$) to transform the re-encrypted second ciphertext value to a second re-encrypted second ciphertext value based on the second value ($g^a$), the merchant product (M), the merchant random number ($m_i$), and the random number (r); and communicate the second re-encrypted second ciphertext value and the first ciphertext value to the payment network.

Clause 70. The system of any of clauses 63-69 wherein the payment network is further programmed and/or configured to: decrypt the first ciphertext value based on the second re-encrypted second ciphertext value, the merchant product (M), the merchant random number (mi), and the first ciphertext value.

Clause 71. A computer program product comprising at least one non-transitory computer-readable medium including program instructions that, when executed by at least one processor, cause the at least one processor to: generate, with a payment network, a first value (a) and a second value ($g^a$), the second value ($g^a$) generated based on the first value (a) and a generator value (g); generate, with the payment network, a plurality of random merchant numbers ($m_i$) for a respective plurality of merchant banks; determine, with the payment network, a merchant product (M) based on a product of the plurality of random merchant numbers ($m_i$) for the respective plurality of merchant banks; generate, with the payment network, a public key ($pk_i$) based on the second value ($g^a$), the merchant product (M), and the random merchant number ($m_i$) and a random key ($rk_i$) based on the merchant product (M) and the random merchant number ($m_i$) for each respective merchant bank of the plurality of merchant banks; and communicate, with the payment network, the public key ($pk_i$) and the random key ($rk_i$) to at least one respective merchant bank.

Clause 72. The computer program product of clause 71, wherein the instructions further cause the at least one processor to: generate, with the merchant bank, a plurality of random payment gateway numbers ($p_i$) for a respective plurality of payment gateways; and generate, with the merchant bank, a payment gateway public key based on the second value ($g^a$), the merchant product (M), and the random payment gateway number ($p_i$) and a payment gateway random key based on the random payment gateway number ($p_i$) for each respective payment gateway of the plurality of payment gateways.

Clause 73. The computer program product of clauses 71 or 72, wherein the instructions further cause the at least one processor to: generate, with the merchant bank, a plurality of terminal numbers ($t_i$) for a respective plurality of point-of-sale (POS) terminals; and generate, with the merchant bank, a terminal public key based on the second value ($g^a$), the merchant product (M), the random payment gateway number ($p_i$), and the terminal number ($t_i$) and a terminal random key based on the random payment gateway number ($p_i$) and the terminal number ($t_i$) for each respective POS terminal of the plurality of POS terminals.

Clause 74. The computer program product of any of clauses 71-73, wherein the instructions further cause the at least one processor to: communicate, with the merchant bank, the terminal public key and the terminal random key to at least one payment gateway; and communicate, with the at least one payment gateway, the terminal public key to at least one POS terminal.

Clause 75. The computer program product of any of clauses 71-74, wherein the instructions further cause the at least one processor to: generate, with the at least one POS terminal, a random number (r) for a transaction message (m) associated with a transaction; generate, with the at least one POS terminal, a first ciphertext associated with the transaction, the first ciphertext comprising: (i) a first ciphertext value associated with the transaction message (m), the first ciphertext value encrypted based on the random number (r), a generator value (g), and the transaction message (m); and ii) a second ciphertext value associated with the random number (r), the second ciphertext value encrypted based on the random number (r) and the terminal public key; and communicate, with the POS terminal, the first ciphertext to the at least one payment gateway.

Clause 76. The computer program product of any of clauses 71-75, wherein the instructions further cause the at least one processor to: re-encrypt, with the at least one payment gateway, the second ciphertext value based on the terminal random key to transform the second ciphertext value to a re-encrypted second ciphertext value based on the second value ($g^a$), the merchant product (M), and the random number (r); and communicate, with the at least one payment gateway, the re-encrypted second ciphertext value and the first ciphertext value to the at least one merchant bank.

Clause 77. The computer program product of any of clauses 71-76, wherein the instructions further cause the at least one processor to: re-encrypt, with the at least one merchant bank, the re-encrypted second ciphertext value based on the random key ($rk_i$) to transform the re-encrypted second ciphertext value to a second re-encrypted second ciphertext value based on the second value ($g^a$), the merchant product (M), the merchant random number ($m_i$), and the random number (r); and communicate, with the at least one merchant bank, the second re-encrypted second ciphertext value and the first ciphertext value to the payment network.

Clause 78. The computer program product of any of clauses 71-77, wherein the instructions further cause the at least one processor to: decrypt, with the payment network, the first ciphertext value based on the second re-encrypted second ciphertext value, the merchant product (M), the merchant random number ($m_i$), and the first ciphertext value.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which:

FIG. 4 is a diagram of an example ISO PIN-Block encoding scheme;

FIG. 5 is a diagram of an example PIN-Block encryption scheme;

FIG. 6 is a diagram of example Proxy Re-encryption (PRE) Honest Re-encryption Attack Chosen-ciphertext Attack (HRA-CCA) game oracles;

FIG. 7 is a diagram of example Private Proxy Authentication (PPA)-HRCCA game oracles;

FIG. 8 is a diagram of an example construction of a PPA scheme from a PRE scheme;

FIG. 9 is a diagram of an example construction of a Hybrid-PRE scheme;

FIGS. 12A and 12B are diagrams of example oracles;

DESCRIPTION

Figure 1:
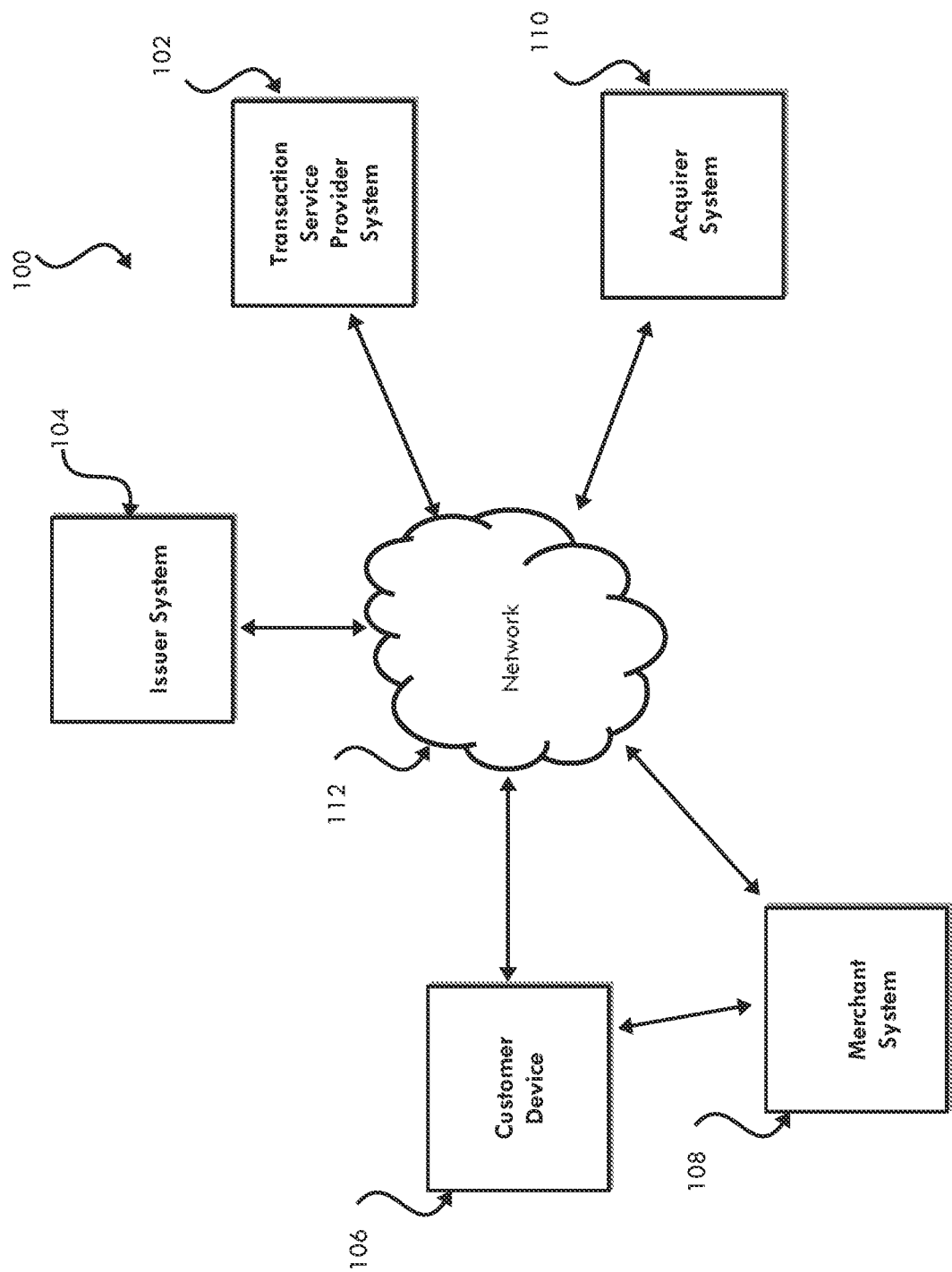
FIG. 1 is a diagram of a non-limiting embodiment of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a token, and/or the like). In some non-limiting embodiments or aspects, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments or aspects, a payment token may be "format preserving" and may have a numeric format that conforms to the account identifiers used in existing payment processing networks (e.g., ISO 8583 financial transaction message format). In some non-limiting embodiments or aspects, a payment token may be used in place of a PAN to initiate, authorize, settle, or resolve a payment transaction or represent the original credential in other systems where the original credential would typically be provided. In some non-limiting embodiments or aspects, a token value may be generated such that the recovery of the original PAN or other account identifier from the token value may not be computationally derived (e.g., with a one-way hash or other cryptographic function). Further, in some non-limiting embodiments or aspects, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments or aspects of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments or aspects, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments or aspects, a requestor may interface with a network token system through any suitable communication network and/or protocol (e.g., using HTTPS, SOAP, and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments or aspects, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments or aspects, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments or aspects, token requestor identifiers may be revoked and/or token requestors may be assigned new token requestor identifiers. In some non-limiting embodiments or aspects, this information may be subject to reporting and audit by the token service provider.

As used herein, the term a "token service provider" may refer to an entity including one or more server computers in a token service system that generates, processes, and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments or aspects, the token service provider may have the ability to set aside licensed BINs as token BINs to issue tokens for the PANs that may be submitted to the token service provider. In some non-limiting embodiments or aspects, various entities of a tokenization ecosystem may assume the roles of the token service provider. For example, payment networks and issuers or their agents may become the token service provider by implementing the token services according to non-limiting embodiments or aspects of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments or aspects, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments or aspects, the token vault may be a part of a token service system. For example, the token vault may be provided as a part of the token service provider. Additionally or alternatively, the token vault may be a remote repository accessible by the token service provider. In some non-limiting embodiments or aspects, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

For the purpose of illustration, in the following description, while the presently disclosed subject matter is described with respect to methods, systems, and computer program products for securely communicating sensitive data, (e.g., PIN authentication), one skilled in the art will recognize that the disclosed subject matter is not limited to the illustrative embodiments. For example, the methods, systems, and computer program products described herein may be used with a wide variety of settings, such as securely communicating sensitive data in any suitable setting, (e.g., social security numbers, personally identifying information, contact information, healthcare information, tax information, confidential information, privileged information, trade secret information, payment transaction information, account identifiers, and/or the like).

Non-limiting embodiments or aspects provide an improved method for PIN authentication based on proxy re-encryption that avoids HSM use at intermediaries during transaction processing. Reasons why simpler mechanisms based on public-key encryption (from a terminal directly to consumer's bank) cannot be used in this setting are discussed in more detail herein in the Section titled "Strawman Solutions". Instead of using HSMs during transaction processing, HSMs are only used for key ceremonies during an initial setup phase. After the key ceremony, the initial public key and subsequent re-encryption keys can be used without the need for trusted hardware. Since PIN translation is the only operation which requires the use of HSMs at the payment gateway and the merchant bank, infrastructure and compliance costs associated with using HSMs and reliance thereon is reduced (although the payment network and consumer banks may use HSMs for other functions (e.g., PIN/CVV verification)).

Deploying upgrades is both time-intensive and expensive. For example, it took nearly a decade to deploy the EMV system in the United States. Due to the large number of parties in the payments ecosystem, the design space of potential solutions is large, and several strawman schemes may be identified but discarded due to limitations such as deployment challenges or significant costs (e.g., reissuing of cards to consumers). Non-limiting embodiments or aspects can be deployed on the existing EMV standard as described by EMVco., "EMV Integrated Circuit Card Specifications for Payment Systems, Book 2—Security and Key Management Version 4.3," August 2011. [Online]. Available: https://www.emvco.com/wpontent/uploads/2017/05/EMV_v4.3_Book_2_Security_and_Key_Management_20120607061923900.pdf, the content of which is hereby incorporated by reference in its entirety, without having to issue new cards to customers or incur significant changes at intermediaries. A key management process, including the key ceremony between the intermediaries, may be backwards compatible with the existing PCI-compliant process. Further, while the threat model is well known to those within the payments industry, it had not been formally modeled from a mathematical perspective. A formal characterization of the actors, the threat model and the security goals of PIN authentication within the framework of provable security is thus provided herein.

Due to the crucial role PINs play in authenticating payments transactions, PINs are a clear target to attackers. Several attacks on PIN processing APIs which permit an attacker (with access to HSMs either at the consumer bank or at an intermediary) to obtain customer PINs have been proposed, and a fix which prevents these attacks called "salted-PIN" has also been proposed, but this fix requires significant changes to the payments infrastructure. Other existing methods focus on how to perform formal analysis of HSM APIs for PIN verification and PIN translation to check for vulnerabilities.

Several solutions which avoid the need for PIN translation and help reduce the trust placed in intermediaries also exist. However, much like the strawman solutions described in more detail herein, these solutions require significant changes to either the payment card or to the payment terminal.

Since its introduction, there has been a large body of work formally defining different security properties for Proxy Re-encryption (PRE) and corresponding constructions which achieve these. Original notions of security for PRE only consider chosen-plaintext attack (CPA) attacks. Chosen-ciphertext attack (CCA) notions were later considered for the unidirectional and bidirectional settings. A flaw in the CPA-based models has been identified and a PRE notion for security under Honest Re-encryption Attack (HRA) is introduced.

Non-limiting embodiments or aspects of the present disclosure provide for (i) a Private Proxy Authentication (PPA) scheme and a definition of security which accurately captures the actors, threat model, and security goals of PIN-based payments, (ii) a PPA scheme that can be generically constructed from any PRE scheme, (iii) a modified key management scheme that uses the same key ceremony, thus ensuring backwards compatibility (secure key management is essential to policing compliance in payments, where, today, keys are provisioned using a key ceremony amongst neighboring parties in the payments ecosystem), (iv) a new PRE construction which follows the Key Encapsulation Mechanism—Proxy Key Re-Encapsulation Mechanism (KEM-DEM) hybrid-encryption paradigm in which the Data Encapsulation Mechanism (DEM) is backwards compatible with existing PIN-block encryption processes, which ensures least friction for deployment, and (v) latency that is roughly equivalent to HSMs, while throughput is more than 5× compared to that of a single HSM.

Non-limiting embodiments or aspects provide an improved method for communicating messages (e.g., PIN authentication and/or the like) based on re-encryption that uses a combination of public keys and random keys for intermediaries in a network. As such, computing resources may be preserved (e.g., the use of such computing resources may be reduced and/or the like) because one or more secret keys need not be generated for each intermediary. Additionally, security may be improved because each intermediary need not protect a respective secret key, thus reducing the amount of secret keys at risk for exposure to attackers. Additionally, the public key and random key for each intermediary may be based at least in part on the public and/or random key(s) of at least one other intermediary and/or entity in the network, so re-encryption of a ciphertext may be achievable based on known operations (e.g., mathematical operations and/or the like) without need for decryption of the ciphertext.

Referring now to FIG. 1, FIG. 1 is a diagram of a non-limiting embodiment of an environment 100 in which systems, products, and/or methods, as described herein, may be implemented. As shown in FIG. 1, environment 100 includes transaction service provider system 102, issuer system 104, customer device 106, merchant system 108, acquirer system 110, and network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to transaction service provider system 102. In some non-limiting embodiments or aspects, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via network 112. Additionally or alternatively, each customer device 106 may include a device capable of receiving information from and/or communicating information to other customer devices 106 via network 112, another network (e.g., an ad hoc network, a local network, a private network, a virtual private network, and/or the like), and/or any other suitable communication technique. For example, customer device 106 may include a client device and/or the like. In some non-limiting embodiments or aspects, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via the network, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments or aspects, acquirer system 110 may be associated with an acquirer as described herein.

Network 112 may include one or more wired and/or wireless networks. For example, network 112 may include a cellular network (e.g., a long-term evolution (LTE®) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
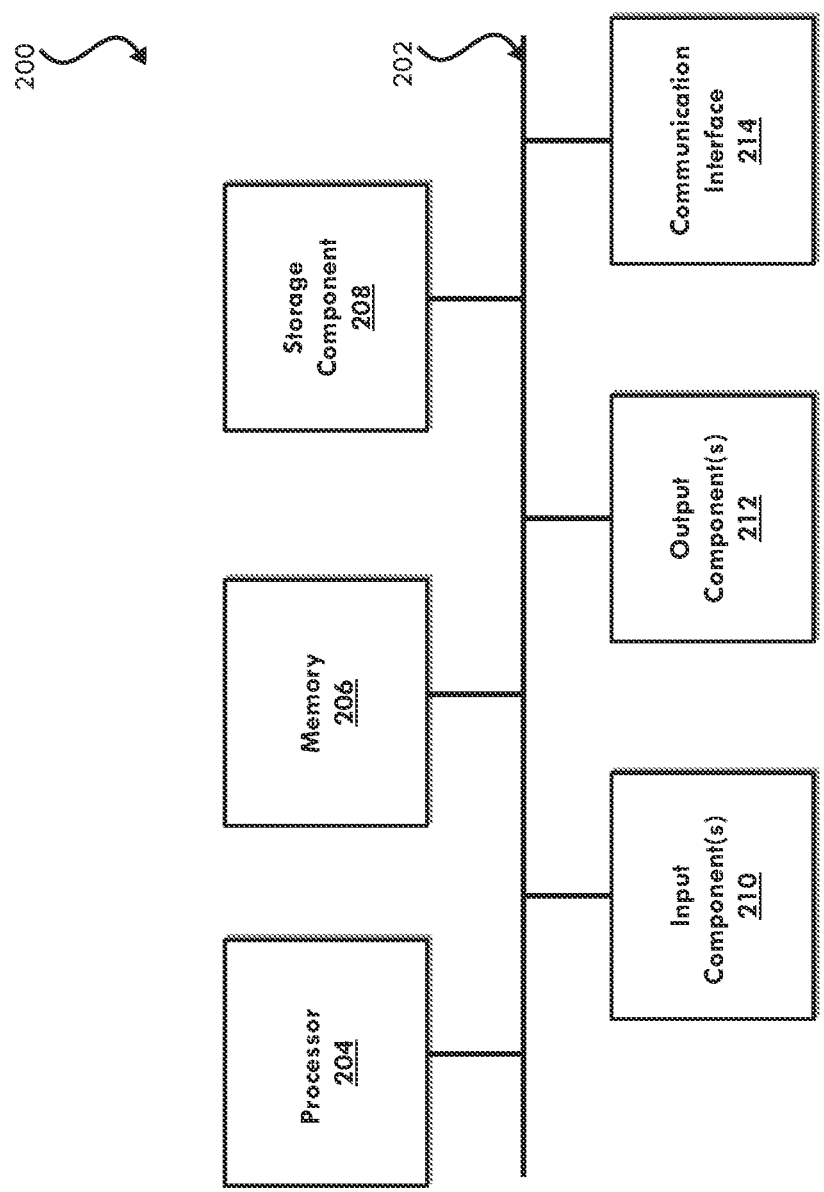
FIG. 2 is a diagram of a non-limiting embodiment of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments or aspects, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Overview of PIN-Based Payments

Traditionally, PIN-based verification is reserved for use at ATMs, but with the adoption of EMV (a.k.a. Chip-and-PIN) PIN-based verification is now widely used for authentication for both ATM and point-of-sale (POS) transactions. When a consumer enters their PIN on a POS device, PIN verification happens in one of two ways: offline or online. If PIN verification occurs offline, the only parties involved are the POS device and the chip card. The consumer-entered PIN is sent directly from the PIN pad to the chip card, where the PIN is authenticated. In contrast, online-PIN verification involves sending the PIN back for verification at the consumer bank that issued that card. In countries with mature payment infrastructures (e.g., USA), nearly all PIN verifications are performed online. Offline PIN verification has not been adopted in the USA due to the added complexities involved in synchronizing the offline PIN held on the chip with the backend PIN used for online verification.

Figure 3:
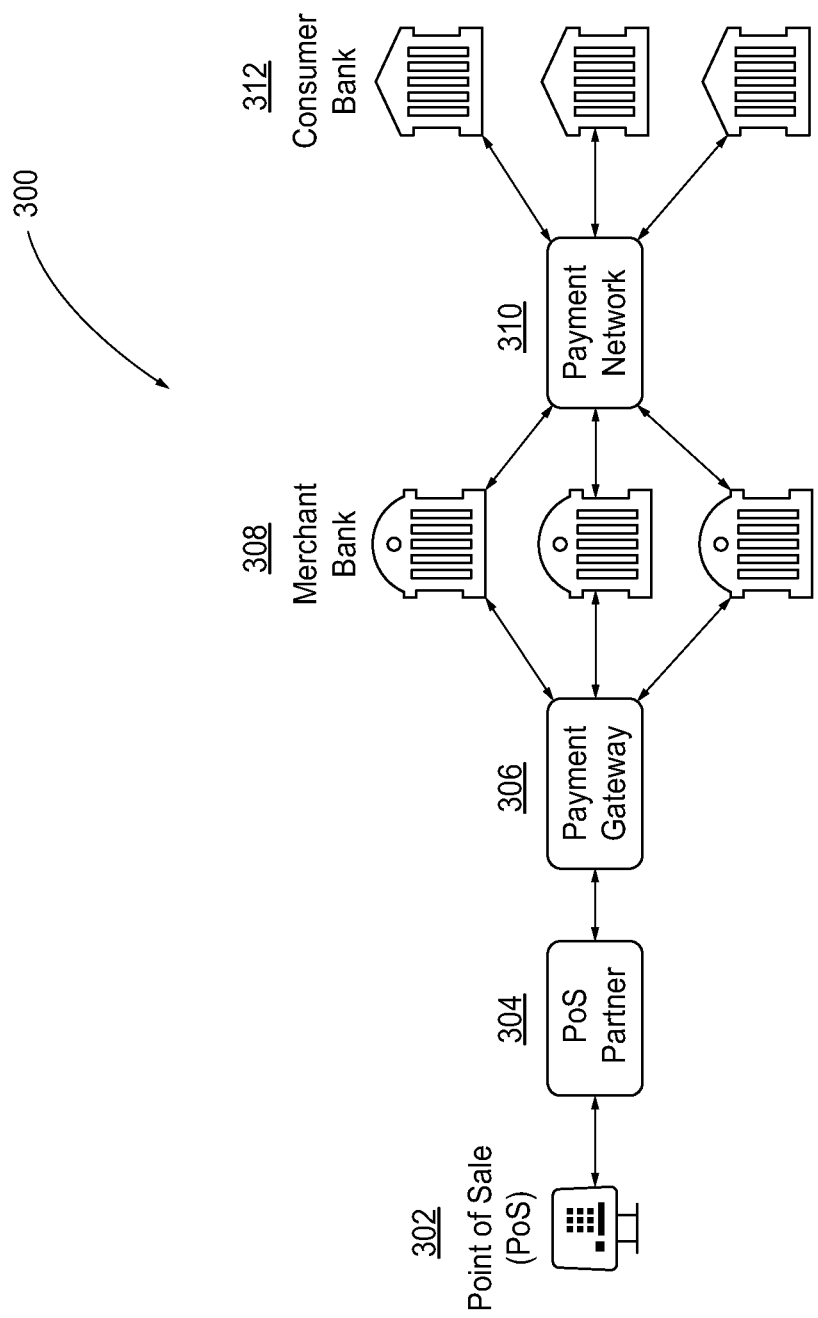
FIG. 3 is a diagram of non-limiting embodiments or aspects of a system for PIN verification.

Referring now to FIG. 3, FIG. 3 is a diagram of a non-limiting embodiment of a system 300 for PIN verification. As shown in FIG. 3, system 300 includes POS device 302, POS terminal/partner 304, payment gateway 306, merchant bank 308 (e.g., acquirer system and/or the like), payment network 310 (e.g., a transaction service provider system, etc.), and consumer bank 312 (e.g., issuer system and/or the like). In online verification, after a PIN is entered on POS device 302, the PIN passes through several intermediaries before the PIN reaches the appropriate consumer bank 312 (e.g., POS terminal/partner 304, payment gateway 306, merchant bank 308, and payment network 310). Merchants employ POS partners and payment gateways to accept payments from cardholders across the globe. POS partner 304 enables a merchant to manage heterogenous POS terminals manufactured by numerous vendors. Payment gateway 306 enables a merchant to accept payments from cardholders by contacting the merchant's bank 308. Merchant bank 308 enables merchants to accept various card types by contacting the appropriate payment network 310 (e.g., Visa, etc.). Payment network 310 performs authorization by contacting consumer bank 312, which performs a final verification of the transaction.

Since a PIN is sensitive, confidentiality of the PIN as it passes through these intermediaries to reach consumer bank 312 should be ensured. Unsurprisingly, PCI regulations mandate that a PIN should never be exposed in the clear to any intermediary party. Naïvely, one may assume that the POS terminal 304 encrypts the PIN under a key shared with the consumer bank 312. However, as the POS partner 304 has no direct relationship with the consumer bank 312, there is no way for such a key to be established. Therefore, each neighboring participant must separately establish a shared key, (e.g., the POS partner 304 shares a key with the Payment gateway 306, which in turn shares a different key with merchant bank 308, which in turn shares a different key with payment network 310, which in turn shares a different key with consumer bank 312).

A further requirement made by PCI is that PINs may only appear in the clear inside secure hardware. This means that each intermediary needs to deploy HSMs to handle the PINs as the pins traverse the network. Keys are generated inside the HSMs and shared with the neighboring party in a key ceremony process as described herein in more detail in the Section titled "Key Management in Practice", ensuring dual control and split knowledge. However, such ceremonies are generally time consuming and require strict processes to be followed. Subsequently, when an encrypted PIN passes through an intermediary, the encrypted PIN is sent to the intermediary's HSM to be decrypted and re-encrypted under the shared key of the next hop. For example, in the first hop (POS device 302 to POS partner 304) PCI requires that a unique key is used for each transaction (e.g., using the Derived Unique Key Per Transaction (DUKPT) method). Following this first hop, in the majority of all subsequent hops, a static key is used.

An Encrypted PIN Block (EPB) is constructed by first encoding the PIN and then encrypting the encoded block. PIN block encoding can be performed in multiple ways as defined in the ISO 9654-1 standard. For example, the ISO 9654-1 standard defines five different formats known as ISO Formats 0, 1, 2, 3 and 4. Non-limiting embodiments or aspects are described primarily with respect to Formats 0 and 3, but are not limited thereto and any ISO Format may be used. ISO Format 4 is the most recently defined, but is yet to see wide deployment. Formats 0 and 3 take as input the PIN and the card number (PAN) and output an encoded block. A main difference between these two formats is that Format 0 uses a fixed padding while Format 3 uses a random padding. A more detailed description of an ISO PIN-block encoding scheme 400 is shown in FIG. 4.

After encoding, the PIN block is encrypted using a block cipher to give the final EPB 500 as depicted in FIG. 5. Formats 0 and 3 both output a 64-bit block which can be encrypted using 3DES. 3DES is the predominant blockcipher in use by the financial industry due to the difficulties presented by migrating large amounts of legacy hardware to new methods. ISO Format 4 defines a 128-bit encoded block which would instead be encrypted by AES. As mentioned previously, this is yet to see wide deployment.

Strawman Solutions

Traditional public-key cryptography based strawman solutions fail to achieve seamless deployment. In the interest of brevity, only a few salient strawman solutions are discussed herein to highlight that strawman solutions incur significant deployment overheads.

A naïve way to achieve PIN confidentiality is by encrypting the PIN against a public key of the consumer bank 312. All parties involved in PIN-based transactions simply forward the encrypted PIN to the consumer bank 312. The consumer bank 312 decrypts the PIN with the associated secret key and verifies the PIN to perform authorization. To realize this paradigm, a POS device 302 must have reliable access to the database of PANs and the corresponding consumer bank's public keys. Storing that database in POS devices 302 is not optimal because it incurs massive deployment overheads. For example, there are 46 million merchants currently accepting Visa cards. However, the POS device 302 can query a remotely hosted database server managed by a payment network to fetch the consumer bank's public key and encrypt the PIN against that public key. This additional remote invocation increases transaction latency and requires various intermediaries to deploy the new changes. Parties, such as, POS partners 304, payment gateways 306, merchant banks 308 and payment networks 310, need to deploy the new changes. Furthermore, the mapping of a PAN number to the corresponding consumer bank's public key is business sensitive to the payment network 310, which may act as hindrance to a successful deployment.

An alternative for a POS device 302 is to read the consumer bank's public key from the chip card during a transaction. Consumer banks 312 today provision chip cards with a public key and a public/private key pair to support offline data authentication and offline PIN verification. Offline PIN verification is discouraged and consumer banks in the USA no longer support this mode. Offline data authentication is currently employed to support transit payments, which improves latency by performing offline authorization. In this mode, the card proves its authenticity by signing a challenge randomly chosen by a POS device 302 during the transaction. The card returns the digital signature, certificate containing the card's public key, and the certificate containing the consumer bank's public key to the POS device 302. The POS device 302 validates the certificate chain and verifies the digital signature to proceed with the payment. To ensure PIN privacy, the POS device 302 can encrypt against the consumer bank's public key obtained in the process of authenticating the card. However, this approach is backward incompatible and incurs large deployment overheads. It requires re-issuance of cards because all chip cards in use are not provisioned with the consumer banks' public keys because offline data authentication is optional. Furthermore, it increases the cost of provisioning chip cards. This approach is backward incompatible because not all US merchants support chip cards. For example, gas stations in the US are yet to support chip cards. Re-issuance of magnetic stripe cards is not an option because they are not designed to store additional public key material.

Another alternative is encrypting the PIN against a payment network's public key. This seemingly simple solution is not deployable due to the following reasons. First, it only eliminates the burden of HSM reliance on all intermediaries other than the payment networks. Second, merchants lose routing flexibility of PIN-based transactions. Merchants today dynamically route PIN-based transactions over their preferred networks to minimize the processing fees. To that end, the above seemingly natural strawman solutions incur significant changes to the payments ecosystem.

Proxy Re-Encryption

Proxy Re-Encryption (PRE) schemes are Public-Key Encryption (PKE) schemes enhanced by a re-encrypt operation. PRE enables parties holding re-encryption keys to transform ciphertexts encrypted under a user A's public key to a ciphertext under a different user B's public key. A bidirectional PRE scheme permits a re-encryption key $rk_{A \to B}$ to be used to re-encrypt in either direction (e.g., from A to B, or from B to A) as described by M. Blaze, G. Bleumer, and M. Strauss, "Divertible protocols and atomic proxy cryptography," in Advances in Cryptology—EURO-CRYPT '98, International Conference on the Theory and Application of Cryptographic Techniques, Espoo, Finland, May 31-Jun. 4, 1998, Proceeding, ser. Lecture Notes in Computer Science, K. Nyberg, Ed., vol. 1403. Springer, 1998, pp. 127-144. [Online]. Available: https://doi.org/10.1007/BFb0054122, (hereinafter Blaze et al.), the entire content of which is hereby incorporated in its entirety by reference. In contrast, re-encryption keys generated by unidirectional PRE schemes can only be used to re-encrypt in one direction (e.g., from A to B, but not from B to A) as described by G. Ateniese, K. Fu, M. Green, and S. Hohenberger, "Improved proxy re-encryption schemes with applications to secure distributed storage," ACM Trans. Inf. Syst. Secur., vol. 9, no. 1, pp. 1-30, 2006. [Online]. Available: https://doi.org/10.1145/1127345.1127346, (hereinafter Ateniese et al.), the entire content of which is hereby incorporated in its entirety by reference.

Some PRE schemes restrict how many re-encryptions can be performed. Schemes which only permit one re-encryption are called single hop, such as the scheme proposed by Ateniese et al. Multihop PRE schemes, such as described by Blaze et al. and R. Canetti and S. Hohenberger, "Chosen-ciphertext secure proxy re-encryption," in Proceedings of the 2007 ACM Conference on Computer and Communications Security, CCS 2007, Alexandria, Va., USA, Oct. 28-31, 2007, P. Ning, S. D. C. di Vimercati, and P. F. Syverson, Eds. ACM, 2007, pp. 185-194. [Online]. Available: https://doi.org/10.1145/1315245.1315269, (hereinafter Canetti et al.), the entire content of which is hereby incorporated in its entirety by reference, do not restrict the number of re-encryptions.

A Public-Key Encryption scheme includes a tuple of algorithms (Setup, KG, E, D) with the following interfaces:

Setup($1^\lambda$)→pp: Setup on input security parameter $\lambda$ outputs public parameters pp.

KG(pp)→(pk, sk): Key generation returns a public and secret key pair (pk, sk).

E(pk, m)→c: Encryption on input public key and message outputs a ciphertext.

D(sk, c)→m or ⊥: Decryption on input a secret key and a ciphertext outputs a plaintext message or error symbol.

A PRE scheme may be defined as a type of public key encryption scheme. PRE schemes satisfy the correctness properties for both a PKE scheme and for re-encryption. A PRE scheme is a public-key encryption scheme with re-key generation (RKG) and re-encryption (RE) functionalities. Re-encryption has the following interface:

RE($rk_{i \to j}$, c)→c' or ⊥: on input a re-encryption key $rk_{i \to j}$ and a ciphertext c, RE outputs a transformed ciphertext c' or error symbol, ⊥.

Furthermore, bidirectional PRE schemes expose the following re-key generation interface:

RKG($sk_i$, $pk_i$, $sk_j$, $pk_j$)→$rk_{i \to j}$: on input a source key pair ($sk_i$, $pk_i$) and destination key pair ($sk_j$, $pk_j$), RKG outputs a re-encryption key $rk_{i \to j}$.

In unidirectional schemes, RKG no longer takes the destination secret key, $sk_j$, as input.

Since a PRE scheme is an extension of a PKE scheme, PRE schemes are correct as PKE schemes. PKE correctness may be defined as follows:

For all possible (pk, sk) generated by KG(pp), for all m, with probability one it must hold that:

$c=E(pk,m)$ $m=D(sk,c)$.

A PRE scheme is $\ell$-hop correct if it is correct as a PKE scheme and for all possible ($pk_i$, $sk_i$) for $1 \le i \le \ell +1$, for all $rk_{i \to i+1}$ for $1 \le i \le \ell$, for all m, with probability one it holds that:

$c_1=E(pk_1,m)$ $c_{i+1}=RE(rk_{i \to i+1},c_i) 1 \le i \le \ell$ $m=D(sk_{\ell+1}, c_{\ell+1})$.

A PRE scheme is multi-hop correct if it is P-hop correct for all $\ell \ge 1$.

A security game has two phases: setup and attack. The setup phase generates key pairs for all participants and splits the key pairs into sets of honest and corrupt participants. The attack phase gives the adversary access to the PRE scheme and a challenge oracle.

Before giving a security definition, the notion of derived ciphertexts, which are used to avoid trivial wins in the security experiment, are introduced herein. A definition of derived ciphertext according to non-limiting embodiments or aspects differs from that of Canetti et al. in that a case in which the re-encryption oracles are deterministic is explicitly targeted.

Derived Ciphertexts may be defined as follows:

Let $O_{RE}(i, j, c)$ and $O_{RKG}(i, j)$ represent the re-encryption and re-key generation oracles exposed to an adversary against a PRE scheme. A ciphertext tuple (i, c) is a derivative of another ciphertext tuple (i*, c*) if one of the following holds:

1) (i, c)=(i*, c*) (self or reflexive derivation),
2) if (i, c) is a derivative of (i', c'), where (i', c') is a derivative of (i*, c*) (transitive derivation),
3) if c=$O_{RE}$(i*, i, c*) (oracle derivation), or
4) if the adversary queries $O_{RKG}$(i*, i) to get a re-encryption key from i* to i, $rk_{i* \to i}$, and c=RE($rk_{i* \to i}$, c*) (external derivation).

Two Re-Key Generation oracles may be defined, one for unidirectional schemes and the other for bidirectional schemes. The unidirectional oracle disallows re-key generation if the adversary attempts to generate a key from an honest to a corrupt party. However, for bidirectional schemes $rk_{i \to j}$ equals $rk_{j \to i}$, hence for those schemes only queries where either both parties are honest or both are corrupt are permitted.

PRE HRA-CCA Security may be defined as follows:

Let $\lambda$ be a security parameter, A an adversary and PRE= (Setup, KG, E, D, RKG, RE) be a PRE scheme. The honest re-encryption attack security game is played in two phases:

Setup: Run PRE.Setup and give the generated public parameters to A. Let n represent the total number of keys decided by A. Generate n keypairs ($pk_i$, $sk_i$) PRE.KG, and divide the indices of the keypairs among the sets H and C, representing the honest and corrupt users, respectively. For all i ∈ H give the adversary $pk_i$, and for all i∈C give the adversary ($pk_i$, $sk_i$).

Attack: For all i, j≤n, i≠j, compute the re-encryption key $rk_{i \to j}$ using PRE.RKG. Let D* denote the set of ciphertexts which are derived from the output of the challenge oracle $O_{Chall}$; D*=∅ before the challenge oracle is queried. Similarly, let D denote the set of ciphertexts which are derived from any encryption oracle output.

The adversary A is given access to the oracles 600 as defined in FIG. 6. At the end of the attack phase the adversary outputs a guess b' and wins if b'=b.

The scheme PRE is (t, $\in$)-secure if for all adversaries A running in time t it holds that $|P[b'=b]-½|\le\in$.

Private Proxy Authentication

A Private Proxy Authentication (PPA) scheme is used to securely send authentication data from a sender to a receiver through a set of proxies. In the context of payments, the authentication data is the cardholder's PIN and related data. The sender is the cardholder/POS terminal 304, which passes encrypted data onto a series of intermediaries (e.g., proxies) spanning the payment network (e.g., payment gateway 304, merchant bank 308, etc.) and eventually the receiver is the cardholder's consumer bank 312.

A PPA scheme includes six algorithms (Setup, KG, Send, Verify[A; ak], Enroll, Relay). The Setup function initializes the parameters of the scheme. Key management is performed through the functions KG and Enroll. The KG function is run by each participant to generate a keypair. Enroll is used to generate the rekeys from one party to another.

Each Proxy maintains a set of rekeys that proxy shares with each of its neighbors. Key management is described herein in further detail in the Section titled "Generic PPA Construction". The Send and Relay functions are run by the sender and proxies respectively to generate the ciphertext for the next hop in the routed payment transaction. A receiver uses the Verify function to check whether the packet (a, c) is authentic. This function utilizes the underlying plaintext authentication predicate A to perform this check. The predicate takes as input the associated data a, plaintext message m and a secret authentication key ak and outputs 0 or 1 depending on whether authentication succeeds or not. In the payments setting A defines the underlying PIN verification method (e.g., IBM3624, etc.). The formal definition for a PPA scheme and its associated correctness is given below.

A PPA scheme for a message space M, associated data space D and underlying authentication predicate A, is a tuple of algorithms PPA[A]=(Setup, KG, Send, Verify[A; ak], Enroll, Relay), and may be defined as follows:

Setup($1^\lambda$)→pp: Setup On input security parameter A outputs the public parameters pp.

KG(pp)→(pk, sk): Key Generation returns a public and secret key pair (pk, sk).

Send(pk, a, m)→c: Send on input public key pk, associated data a and a message m outputs a ciphertext c.

Verify[A; ak](sk, a, c)→0/1 or ⊥ Verify on input a secret key sk, associated data a and ciphertext c outputs a bit 0 or 1, or the error symbol ⊥.

Enroll(($pk_i$, $sk_i$), $pk_j$)→$rk_{i\to j}$: Unidirectional Enroll takes as input source keys ($pk_i$; $sk_i$) and destination public key $pk_j$, and outputs a rekey $rk_{i\to j}$.

Enroll(($pk_i$, $sk_i$), ($pk_j$, $sk_j$))→$rk_{i\to j}$: Bidirectional Enroll takes as input source keys ($pk_i$, $sk_i$) and destination keys ($pk_j$, $sk_j$), and outputs a rekey $rk_{i\to j}$.

Relay(R, a, c)→c': Relay takes as input associated data a, a ciphertext c and a set of rekeys R and outputs a transformed ciphertext c' or error symbol.

A PPA is $\ell$-hop correct with respect to a message space M, associated data space D and underlying plaintext authentication predicate A, if the following properties hold:

1) Correctness of authentication: For all (pk, sk) generated by PPA. KG and for all ak, a, m where A(ak, a, m)=b it holds that:

PPA.Verify[A;ak](sk,PPA.Send(pk,a,m))=b;

2) $\ell$-hop correctness of relay: for all possible ($pk_i$, $sk_i$) for $1\le i\le \ell+1$, for all $R_i$ for $1\le i\le \ell$, for all ak, a, m where A(ak, a, m)=b, it holds that:

$c_1$=PPA.Send($pk_1$,a,m)

$c_{i+1}$=PPA.Relay(a,$c_i$,$R_i$) $1\le i\le \ell$ b=PPA.Verify[A;ak]($sk_{\ell+1}$, a, $c_{\ell+1}$).

A PPA scheme is multi-hop correct if it is f-hop correct for all $\ell \ge 1$.

A primary purpose of a PPA scheme is to perform authentication based on the underlying predicate A in a confidential manner. In practice, attacks against a PPA scheme are either performed by direct injection of plaintext (e.g., through a payment terminal) or by injecting encrypted messages into the network. Within the context of authentication, due to the limited message space of PINs ($10^4$), an attacker's best strategy is simple brute-force, entering each PIN in turn at a POS device 302. Mitigations against this restrict the number of retries permitted. Non-limiting embodiments or aspects are directed to determining whether PPA schemes can maintain confidentiality in the presence of powerful attackers.

A confidentiality notion may be defined as follows. In the security experiment, the adversary is provided with all public keys instead of just those associated with the initial sender (e.g., POS terminal/partner 304). Any participant now has the possibility to be a sender. This makes the model more general than the standard payments setting where only the public keys of the initial sender (e.g., POS terminals 304) are used for encryption and all other keypairs are only relevant for generating rekeys. This choice results in a stronger security model and, therefore, better security guarantees. The security definition also relies on the notion of derived ciphertexts, which can be easily extended from that defined for the PRE setting for Derived Ciphertexts as described herein.

Referring now to FIG. 7, which shows PPA-HRCCA game oracles 700, for PPA Security Against Chosen-Ciphertext Attacks, let $\lambda$ be a security parameter, A an adversary, and PPA[A]=(Setup, KG, Send, Verify[A; ak], Enroll, Relay) a PPA scheme with underlying authentication predicate A. The security game is played in two phases as follows:

Setup: Run PPA.Setup($1^\lambda$) and give public parameters generated to A. n represents the total number of keys decided by the Adversary. Generate n new keypairs ($pk_i$, $sk_i$)←PPA.KG, divide the indices of the keypairs among the sets H and C (honest and corrupt, respectively), for all i∈H give the adversary $pk_i$, and for all i∈C give the adversary ($pk_i$, $sk_i$).

Attack: For all i, j≤n, i≠j, compute the rekeys $rk_{i\to j}$ using PPA.Enroll and populate the rekey sets for each participant $R_i$={$rk_{i\to j}$: $\forall j$}. A is permitted access to the following oracles:

Enroll:

$O_{Enroll}(pk_i, pk_j)$ Unidirectional = $\begin{cases} \perp & \text{if } i \in H, j \in C \\ rk_{i\to j} & \text{otherwise} \end{cases}$.

$O_{Enroll}(pk_i, pk_j)$ Bidirectional = $\begin{cases} \perp & \text{if } \{i, j\} \not\subseteq H \text{ or } \{i, j\} \not\subseteq C \\ rk_{i\to j} & \text{otherwise} \end{cases}$.

Challenge (one-time), $O_{Chall}(pk_i, a, m_0, m_1)$ if i∉H output ⊥, otherwise sample a bit b ←$ {0, 1} uniformly at random, return challenge ciphertext c*=PPA.Send($pk_i$, a, $m_b$).

Relay, ORelay($pk_i$, a, c), if i∈H, a specifies j∈C and ($pk_j$, a, c) is a derivative of the challenge then return ⊥, Else return PPA.Relay($R_i$, a, c)

Verify, OVerify($pk_j$, a, c), if ($pk_j$, a, c) is a derivative of the challenge then return ⊥, Else return PPA.Verify[A, ak]($sk_j$, a, c)

At the end of the challenge phase the adversary A outputs a guess b' and wins if b'=b.

The scheme PPA is (t, ∈)-secure if for all adversaries A running in time t it holds that |P[b'=b]−½|≤∈.

Generic PPA Construction

A PPA scheme $PPA_A$=(Setup, KG, Enroll, Send, Verify, Relay) may be constructed from any multi-hop PRE scheme. In addition to the PRE=(Setup, KG, RKG, E, D, RE) scheme there are two further building blocks. A plaintext authentication predicate A (e.g., PIN verification, such as IBM3624, and/or the like, etc.) takes as input an authentication key ak, some associated data a and a message m, and outputs a bit b which says whether authentication is successful or not. A lookup function L takes as input some associated data a and a set of re-encryption keys $R_i$ and outputs a single re-encryption key rk (the set $R_i$ is defined to be the set of all re-encryption keys output by PPA.Enroll for which the source is i). Note that in practice for payments, each intermediary translates between multiple different parties and, therefore, uses the associated data a to determine the routing (and corresponding re-encryption key) for the next hop.

FIG. 8 shows a formal PPA construction 800 from PRE, which is described in more detail herein with direct relation to how it fits within the payments context based on two phases: a setup phase, which generates keys for all the parties, and an online phase, which uses those keys to protect the PIN on its journey from the POS terminal to the consumer bank.

Initial setup of the PPA scheme is performed by initializing the PRE scheme (PRE.Setup) and the key ak of the authentication predicate $A^3$. Once the system is initialized, the first phase is to perform key setup. Any entity calling PPA.KG runs PRE.KG. Similarly, when generating the re-encryption keys, PRE.Enroll is directly run. Differences in key-management processes between the traditional approach, unidirectional PPA, and bidirectional PPA are further described herein below in this Section titled "Generic PPA Construction".

The online phase includes running the functions PPA-.Send, PPA.Relay, and PPA.Verify. PPA.Send is run by the initial payment terminal 304 capturing the PIN, PPA.Relay is run by each of the intermediaries as the encrypted PIN block is sent through the network, and PPA.Verify is run by the consumer bank 312 performing the final verification. PPA.Send is constructed by simply calling the PRE encryption function PRE.E. The relay call is constructed first by calling the lookup function L to determine the correct reencryption key to use and making the appropriate call to PRE.RE. Finally, PPA.Verify calls the PRE decrypt function PRE.D and provides the output of the PRE decrypt function PRE.D to the authentication predicate A to determine the final output bit b.

An efficient PRE construction, which is used to directly instantiate PPA, is described in more detail herein in the Section titled "An Efficient PPA Construction". This construction uses a hybrid approach which makes the encrypted PIN blocks backward compatible with existing infrastructure.

A security analysis of a PPA scheme may be configured according to the following theorem and proof:

Theorem. Given a (t, ∈)-secure PRE scheme, the construction defined in FIG. 8 is a (t, ∈')-secure PPA scheme, where ∈'≤∈.

Proof. Assume there exists an adversary A attacking the PPA-CCA security of PPA. Use A to construct a new adversary B attacking the PRE-CCA security of PRE. B uses its oracles to provide simulations of A's oracles. The security game is started by the Setup phase. Run the setup procedure for B's PRE-CCA experiment, returning the honest public keys and corrupt key pairs received to A. Additionally, generate the key ak for the plaintext authentication predicate A. Next run the attack/challenge phase. Whenever A makes oracle calls $O_{Enroll}$ or $O_{Chall}$ simulate these by making calls to B's oracles $O_{RKG}$ or $O_{Chall}$, respectively. When A makes a $O_{Relay}(pk_i, a, c)$ call, first examine a to determine $pk_j$ and then call $O_{RE}(pk_i, pk_j, a, c)$. When A makes the oracle call $O_{Verify}$, use B's OD oracle to perform decryption then calculate and return the result of the authentication predicate A using ak.

When A terminates and outputs its guess b, B terminates and outputs the same bit b. It is easy to see that if A wins then B also wins and thus ∈'≤∈.

In a typical key management process for PIN translation keys, each pair of neighboring parties establish a shared symmetric key. For example, when the payment network 310 receives an encrypted PIN from a merchant bank 308, the payment network 310 decrypts the encrypted PIN using the key shared with that merchant bank 308 and encrypts the PIN with a key shared with the consumer bank 312 to which the encrypted PIN is sent. As all keys are held within HSMs, a strict key ceremony process is followed to establish these shared keys. Note that there is no direct online connection between neighboring parties' HSMs which would facilitate an on-line key exchange. Instead, each party designates several employees as key custodians. Two parties that wish to establish a shared key do so in the following way. For the purposes of this description, each party may have two custodians. First, one of the parties (party A) generates a Key-Encryption Key (KEK) in their HSM. The two custodians at party A perform an export operation on the HSM so each custodian receives an XOR-share of the key (k=$k_1$⊕$k_2$). The first custodian seals their XOR share in a tamperproof envelope and sends this to the corresponding custodian at party B via a courier. Similarly, the second custodian sends their XOR-share via a different courier to the corresponding custodian at party B. The custodians at party B engage in an import operation on their HSM. Note that at no time has any one party had knowledge of the full plaintext key. This concept is known as split knowledge. Once both parties have the same KEK loaded in their HSM, all subsequent keys can be shared encrypted under this key (where key generation and encryption under the KEK is performed inside the HSM). This is a strictly audited process and follows closely the requirements mandated by PCI. In particular, the process described above closely follows Control Object 3, Requirement 8 of the PCI PIN Security Requirements.

When considering the reality of key management processes when employing either a bidirectional or unidirectional scheme (note that for either scheme type HSMs are used during the key setup phase as no secret keys should ever be exposed in plaintext), once keys are setup only the final party that performs verification uses an HSM. This greatly reduces HSM counts at the intermediaries who now no longer need to account for the large number of HSM calls for PIN translation previously performed during transactions. A crucial part of key management for PPA is how re-encryption keys are generated. As a bidirectional scheme uses both secret keys in order to compute a re-encryption key, the bidirectional scheme uses a strictly controlled process. In contrast, a unidirectional scheme only uses the source secret key and destination public key. Sharing of the destination public key with the source can be performed in a more relaxed (but still strictly audited) manner.

With respect to the bidirectional PPA case, the final three hops in a basic payment ecosystem: the merchant bank 308, the payment network 310, and the consumer bank 312 may be considered. In the standard setting, the payment network 310 generates all keys and distributes these to the merchant bank 308 and consumer bank 312 using the process described herein previously. In the bidirectional PPA case, whenever a new bank enrolls (whether that be a merchant bank 308 or a consumer bank 312), the trusted payment network key manager (based on an HSM) generates a new key pair. The secret key is shared with the key manager of the enrolling bank. Note that a consumer bank 312 uses the secret key to do the final decryption and a merchant bank 308 uses the secret key to compute earlier re-encryption keys (due to the fact the scheme is bidirectional). The traditional KEK-based approach to securely share these secret keys between parties may be used. In addition to generating and sharing the new key pair at time of enrollment, the key manager computes re-encryption keys. If the new key pair is for a merchant bank 308, the key manager generates a re-encryption key towards each previously enrolled consumer bank 312 (and vice-versa for an enrolling consumer bank 312 from previously enrolled merchant banks 308). The re-encryption keys are given to the "untrusted" payment network application (note the application maintain mn re-encryption keys, where m is the number of merchant banks and n is the number of consumer banks).

In contrast, the uni-directional PPA case is much simpler. Here, when a new participant enrolls, their trusted key manager generates their own key pair. The key manager shares the new public key with their preceding neighbors and additionally requests a public key from each of their succeeding neighbors. Each participant's key manager can generate re-encryption keys based on their own secret key and the public keys of their following neighbors. These re-encryption keys are used by their own application during a transaction. The application holds a re-encryption key associated to each of its succeeding neighbors. In this setting, as only public keys are shared between participants, KEKs or split knowledge during key transfer need not be used, making the key management processes much simpler.

An Efficient PPA Construction

ElGamal encryption, as described by T. E. Gamal, "A public key cryptosystem and a signature scheme based on discrete logarithms," in Advances in Cryptology, Proceedings of CRYPTO '84, Santa Barbara, Calif., USA, Aug. 19-22, 1984, Proceedings, ser. Lecture Notes in Computer Science, G. R. Blakley and D. Chaum, Eds., vol. 196. Springer, 1984, pp. 10-18. [Online]. Available: https://doi.org/10.1007/3-540-39568-7_2, the content of which is hereby incorporated by reference in its entirety, forms the basis for many PRE schemes. It also underlies many well-known hybrid-encryption schemes, such as described by R. Cramer and V. Shoup, "A practical public key cryptosystem provably secure against adaptive chosen ciphertext attack," in Advances in Cryptology—CRYPTO '98, 18th Annual International Cryptology Conference, Santa Barbara, Calif., USA, Aug. 23-27, 1998, Proceedings, ser. Lecture Notes in Computer Science, H. Krawczyk, Ed., vol. 1462. Springer, 1998, pp. 13-25. [Online]. Available: https://doi.org/10.1007/BFb0055717, the content of which is hereby incorporated by reference in its entirety. A hybrid-encryption scheme is a construction which combines both public-key encryption and symmetric key encryption. It is formed of a Key Encapsulation Mechanism (KEM), used to share a randomly chosen key, and a Data Encapsulation Mechanism (DEM), used to encrypt the data under this random key. A PRE construction according to non-limiting embodiments or aspects may include a hybrid encryption scheme. The DEM is used to encrypt the PIN under a random key protected by the KEM. When re-encryption is performed, changes to the KEM may be made, but the DEM may remain unchanged.

S. Myers and A. Shull, "Efficient hybrid proxy re-encryption for practical revocation and key rotation," IACR Cryptology ePrint Archive, vol. 2017, p. 833, 2017. [Online]. Available: http://eprint.iacr.org/2017/833, the content of which is hereby incorporated by reference in its entirety, describe constructions for hybrid proxy re-encryption that focus on use cases related to key rotation for cloud outsourced data storage and access control. In this context key scraping attacks become a major concern. Here, an adversary who previously had access to a file, or for a short time has access to download a large number of KEMs, can decrypt the KEMs to retrieve the random key used by the DEM. Following a key rotation and re-encryption, it is assumed that the adversary should no longer have access to the plaintext. However, in the traditional approach, re-encryption is only performed on the KEM, leaving the DEM the same even after re-encryption. This means that an adversary who previously obtained the random key from the KEM, is always able to decrypt the data. In non-limiting embodiments or aspects, re-encryption may be performed on the KEM, but key scraping attacks are not a concern for two reasons. Firstly, the DEM only encrypts a very short plaintext (PIN blocks are only 64 bits) so an adversary able to compromise a KEM is able to easily compromise the DEM at the same time. In contrast, DEMs in the outsourced data setting are typically several Megabytes or Gigabytes. Secondly, in the payments setting, ciphertexts do not need to be stored long-term as they are only relevant for a single transaction period.

Referring now to FIG. 9, which shows a Hybrid PRE construction 900, a scheme according to non-limiting embodiments or aspects may work over a group of prime order q with generator g and use a symmetric encryption scheme SE=(SE.E, SE.D). Key Generation selects a secret key sk at random from $\mathbb{Z}^*_q$ and calculates the public key pk=$g^{sk}$. The construction may include a bi-directional PRE scheme so the re-encryption key generation PRE.RKG uses both source and destination secret keys ($sk_i$ and $sk_j$). The re-encryption key is $sk_i/sk_j$. Note that since the underlying symmetric encryption schemes takes associated data a as input, the syntax of PRE is adapted to include this input. The encryption algorithm PRE.E takes as input the associated data a and message m. First, the KEM calculation is performed, which choses a random exponent rand calculates $c_1=g^r$. The symmetric key K is calculated as the hash of $pk^r=g^{sk \cdot r}$; which is effectively an ephemeral-static Diffie-Hellman key. Next, the DEM is calculated by running SE.E on inputs a and m with the key K, to obtain $c_2$. The final output of PRE.E is ($c_1$, $c_2$). Decryption follows the reverse procedure. First, decapsulation of $c_1$ is performed to obtain the symmetric key K. Here, the hash of $c_1^{sk}=g^{r \cdot sk}$, is taken, and using K SE.D can be called on a and $c_2$ to retrieve m. As mentioned previously, the re-encryption function PRE.RE only operates on the KEM $c_1$. Re-encryption is performed by raising it to the re-encryption key $c_1^{rki \rightarrow j}$. As shown in FIG. 9, the DEM is simply labelled as a symmetric encryption scheme SE. The actual DEM implemented may be based on standard PIN Block encryption as described in the Section titled "An Overview of PIN-Based Payments" and shown in FIGS. 4 and 5, which encodes the PIN based on ISO 9564-1 and encrypts this PIN Block using 3DES using the random key protected by the KEM, which means the DEM ensures the best possible backwards compatibility with existing PIN verification calls.

Figure 10:
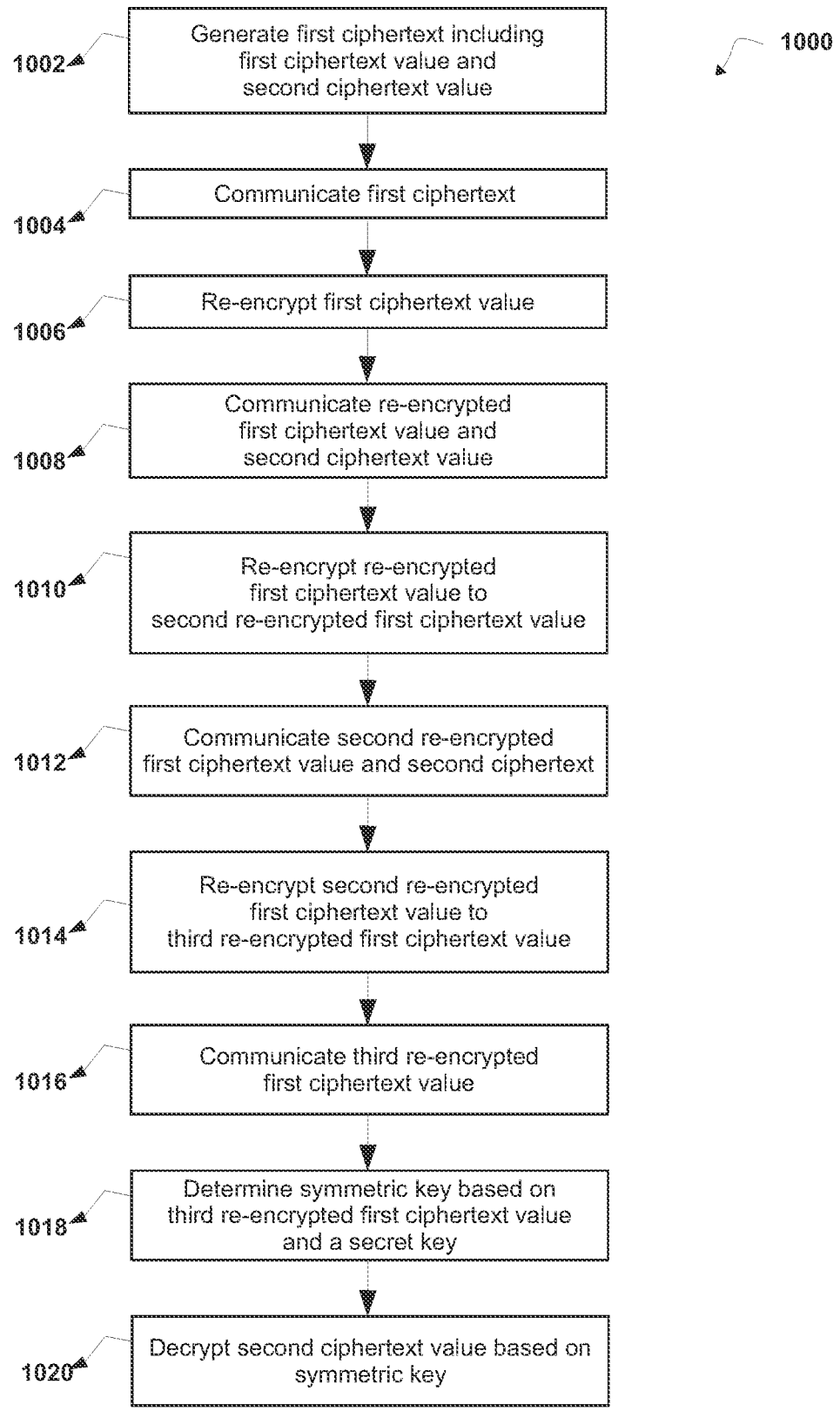
FIG. 10 is a flowchart of non-limiting embodiments or aspects of a process for securely transmitting PINs and other sensitive data.

Referring now to FIG. 10, FIG. 10 is a flowchart of non-limiting embodiments or aspects of a process 1000 for securely transmitting PINs and other sensitive data. In some non-limiting embodiments or aspects, one or more of the steps of process 1000 are performed (e.g., completely, partially, etc.) by payment network 310 (e.g., one or more devices of payment network 310, etc.). In some non-limiting embodiments or aspects, one or more of the steps of process 1000 are performed (e.g., completely, partially, etc.) by another device or a group of devices separate from or including payment network 310, such as POS partner 304 (e.g., one or more devices of POS partner 304, etc.), payment gateway 306 (e.g., one or more devices of payment gateway 306, etc.), merchant bank 308 (e.g., one or more devices of merchant bank 308, etc.), and/or consumer bank 312 (e.g., one or more devices of consumer bank 312, etc.).

As shown in FIG. 10, at step 1002, process 1000 includes generating a first ciphertext including a first ciphertext value and a second ciphertext value. For example, POS terminal/partner 304 may generate a first ciphertext including a first ciphertext value and a second ciphertext value associated with a transaction. As an example, POS terminal/partner 304 may generate a first ciphertext associated with a transaction. In such an example, a first ciphertext may include (i) a first ciphertext value associated with a randomly selected key (r), the first ciphertext value encrypted based on the randomly selected key (r) and a generator value (g); and (ii) a second ciphertext value associated with a first public key ($pk_1$) of a first pair of keys comprising a first public key ($pk_1$) and a first secret key ($sk_1$), the first public key ($pk_1$) generated based on the first secret key ($sk_1$) and the generator value (g), the second ciphertext value encrypted based on transaction data associated with the transaction and a symmetric key (K) generated based on the first public key ($pk_1$) and the randomly selected key (r).

In some non-limiting embodiments or aspects, an intermediary server translates between multiple different parties by decrypting the second ciphertext value and using a portion of the transaction data to determine routing and a corresponding re-encryption key for a subsequent communication.

In some non-limiting embodiments or aspects, transaction data includes at least one of a mobile personal identification number (PIN), a card verification number, or a card number associated therewith.

In some non-limiting embodiments or aspects, the second ciphertext value is used to encrypt a personal identification number (PIN) under the randomly selected key (r) protected by the first ciphertext value, and a re-encryption generates a new ciphertext value while the second ciphertext value is unchanged.

As shown in FIG. 10, at step 1004, process 1000 includes communicating a first ciphertext. For example, POS terminal/partner 304 may communicate a first ciphertext to payment gateway 306. As an example, POS terminal/partner 304 may communicate the first ciphertext to at least one payment gateway 306.

As shown in FIG. 10, at step 1006, process 1000 includes re-encrypting a first ciphertext value. For example, payment gateway 306 may re-encrypt a first ciphertext value. As an example, payment gateway 306 may re-encrypt the first ciphertext value with a first re-encryption key to transform the first ciphertext value encrypted under the first public key ($pk_1$) to a re-encrypted first ciphertext value encrypted under a second public key ($pk_2$) associated with the at least one payment gateway 306.

As shown in FIG. 10, at step 1008, process 1000 includes communicating a re-encrypted first ciphertext value and a second ciphertext value. For example, payment gateway 306 may communicate a re-encrypted first ciphertext value and a second ciphertext value to merchant bank 308. As an example, payment gateway 306 may communicate the re-encrypted first ciphertext value and the second ciphertext to at least one merchant bank 308.

As shown in FIG. 10, at step 1010, process 1000 includes re-encrypting a re-encrypted first ciphertext value to a second re-encrypted first ciphertext value. For example, merchant bank 308 may re-encrypt a re-encrypted first ciphertext value to a second re-encrypted first ciphertext value. As an example, merchant bank 308 may re-encrypt the re-encrypted first ciphertext value encrypted with a second re-encryption key to transform the re-encrypted first ciphertext value encrypted under the second public key ($pk_2$) of the at least one payment gateway 306 to a second re-encrypted first ciphertext value under a third public key ($pk_3$) of the at least one merchant bank 308.

As shown in FIG. 10, at step 1012, process 1000 includes communicating a second re-encrypted first ciphertext value and a second ciphertext. For example, merchant bank 308 may communicate a second re-encrypted first ciphertext value and a second ciphertext to payment network 310. As an example, merchant bank 308 may communicate the second re-encrypted first ciphertext value and the second ciphertext value to a payment network 310.

As shown in FIG. 10, at step 1014, process 1000 includes re-encrypting a second re-encrypted first ciphertext value to a third re-encrypted first ciphertext value. For example, payment network 310 may re-encrypt a second re-encrypted first ciphertext value to a third re-encrypted first ciphertext value. As an example, payment network 310 may re-encrypt the second re-encrypted first ciphertext value encrypted with a third re-encryption key to transform the second re-encrypted first ciphertext value encrypted under the third public key ($pk_3$) of the at least one merchant bank to a third re-encrypted first ciphertext value under a fourth public key ($pk_4$) of the payment network 310.

As shown in FIG. 10, at step 1016, process 1000 includes communicating a third re-encrypted first ciphertext value. For example, payment network 310 may communicate a third re-encrypted first ciphertext value to consumer bank 312. As an example, payment network 310 may communicate the third re-encrypted first ciphertext value and the second ciphertext value to at least one consumer bank 312.

As shown in FIG. 10, at step 1018, process 1000 includes determining a symmetric key based on a third re-encrypted first ciphertext value and a secret key. For example, consumer bank 312 may determine a symmetric key based on a third re-encrypted first ciphertext value and a secret key. As an example, consumer bank 312 may determine the symmetric key (K) based on the third re-encrypted first ciphertext value and a secret key of the consumer bank 312.

As shown in FIG. 10, at step 1020, process 1000 includes decrypting a second ciphertext value based on a symmetric key. For example, consumer bank 312 may decrypt a second ciphertext value based on a symmetric key. As an example, consumer bank 312 may decrypt the second ciphertext value based on the symmetric key (K) to obtain the transaction data.

Figure 11A:
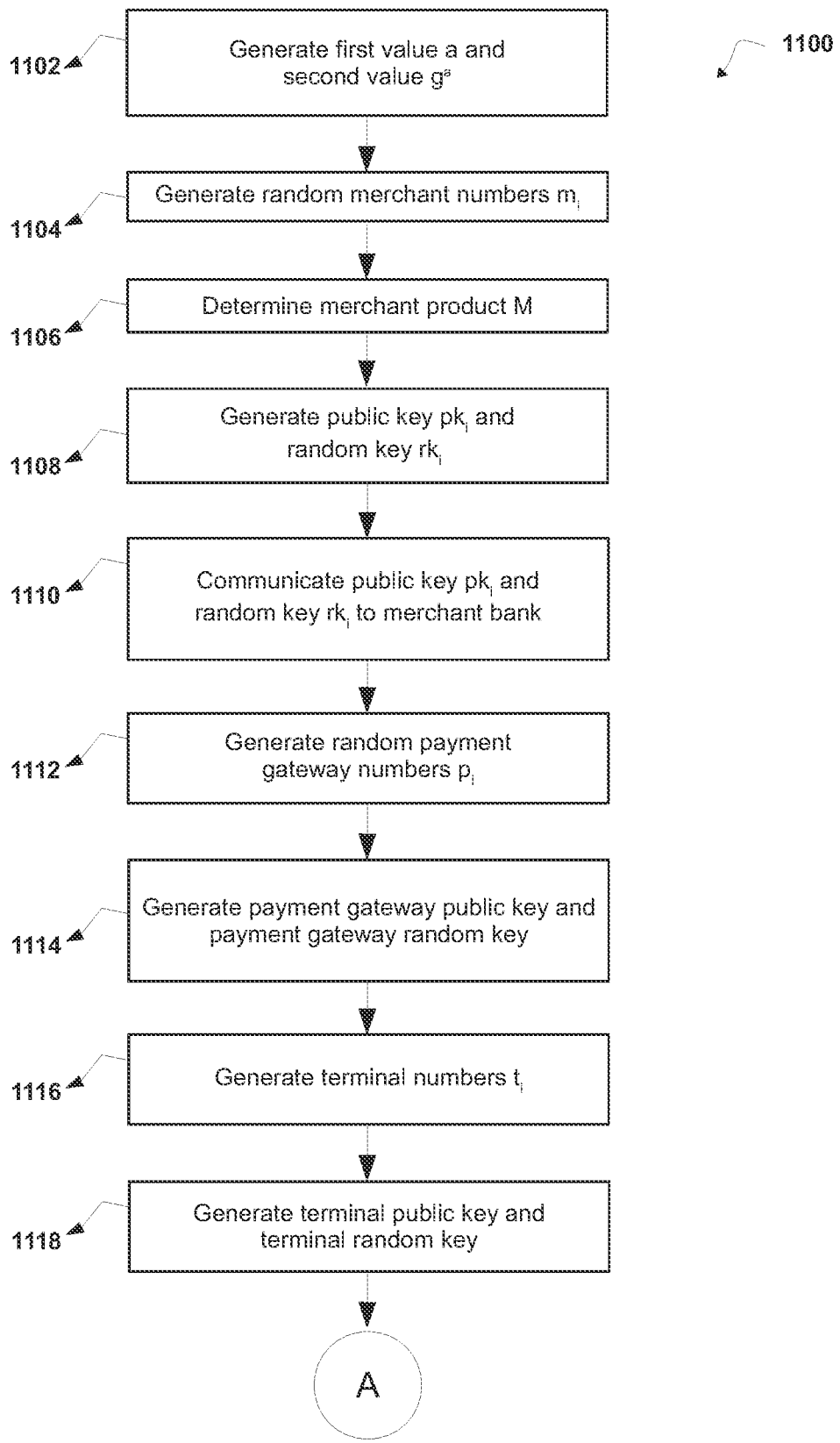
FIGS. 11A-11C are flowcharts of non-limiting embodiments or aspects of a process for securely transmitting PINs and other sensitive data.
Figure 11B:
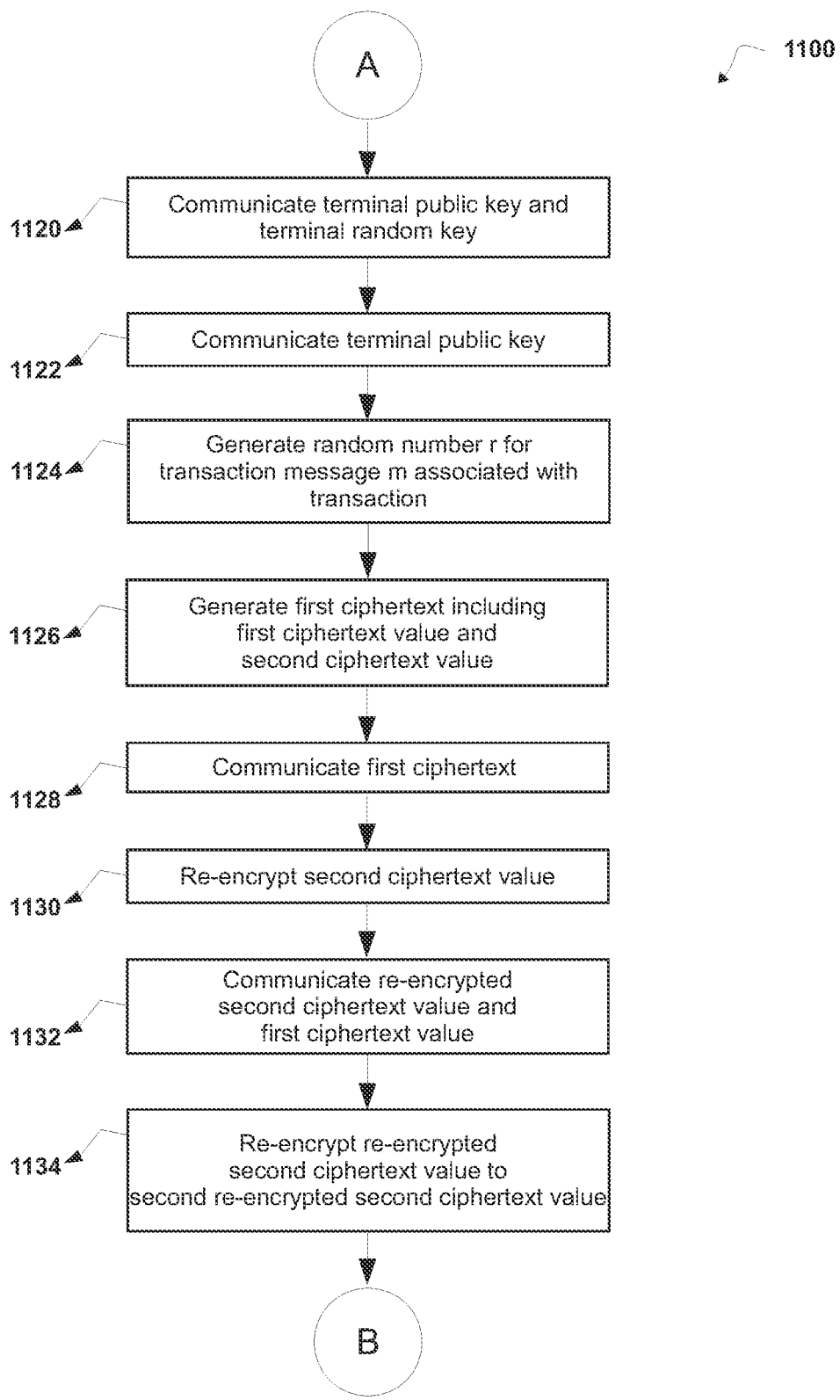
Figure 11C:
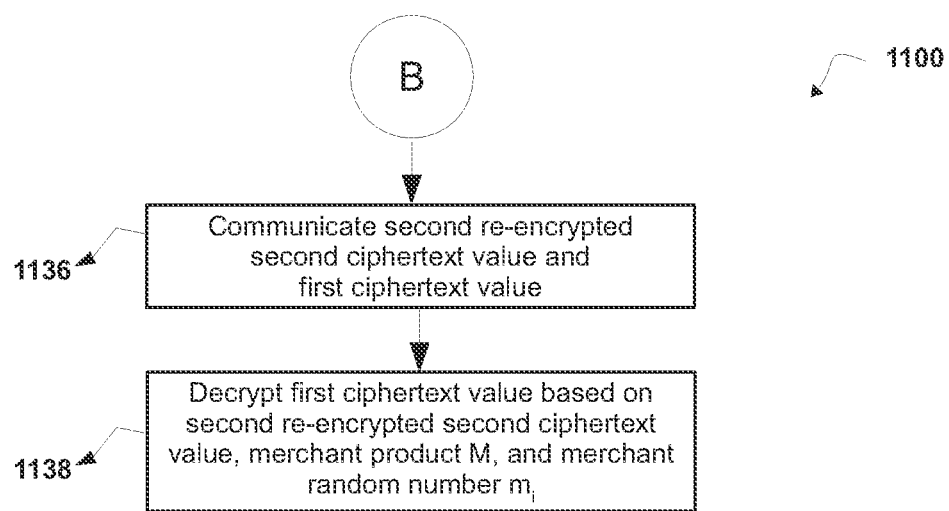

Referring now to FIGS. 11A-11C, FIGS. 11A-11C are flowcharts of non-limiting embodiments or aspects of a process 1100 for securely transmitting PINs and other sensitive data. In some non-limiting embodiments or aspects, one or more of the steps of process 1100 are performed (e.g., completely, partially, etc.) by payment network 310 (e.g., one or more devices of payment network 310, etc.). In some non-limiting embodiments or aspects, one or more of the steps of process 1100 are performed (e.g., completely, partially, etc.) by another device or a group of devices separate from or including payment network 310, such as POS partner 304 (e.g., one or more devices of POS partner 304, etc.), payment gateway 306 (e.g., one or more devices of payment gateway 306, etc.), merchant bank 308 (e.g., one or more devices of merchant bank 308, etc.), and/or consumer bank 312 (e.g., one or more devices of consumer bank 312, etc.).

As shown in FIG. 11A, at step 1102, process 1100 includes generating a first value (a) and a second value ($g^a$). For example, payment network 310 may generate a first value (a) and a second value ($g^a$). As an example, payment network 310 may generate a first value (a) and a second value ($g^a$). In such an example, the second value ($g^a$) may be generated based on the first value (a) and a generator value (g).

In some non-limiting embodiments or aspects, the second value may be generated as the generator value (g) raised to the power of the first value (a). For example, the second value may be generated as follows:

$$\text{second value} = g^a$$

As shown in FIG. 11A, at step 1104, process 1100 includes generating random merchant number ($m_i$). For example, payment network 310 may generate random merchant number ($m_i$). As an example, payment network 310 may generate a random merchant number ($m_i$) for each of a plurality of merchant banks 308. For example, payment network 310 may generate a plurality of random merchant numbers ($m_1, \ldots, m_k \in G$) for a respective plurality of merchant banks 308 (e.g., i=1, ..., k, where k is the number of merchant banks 1308).

As shown in FIG. 11A, at step 1106, process 1100 includes determining a merchant product (M). For example, payment network 310 may determine a merchant product (M). As an example, payment network 310 may determine a merchant product (M) based on a product of the plurality of random merchant numbers ($m_i$) for the respective plurality of merchant banks 308.

In some non-limiting embodiments or aspects, the merchant product (M) may be determined as follows:

$$M = \prod_{i=1}^{k} m_i$$

As shown in FIG. 11A, at step 1108, process 1100 includes generating a public key ($pk_i$) and a random key ($rk_i$). For example, payment network 310 may generate a public key ($pk_i$) and a random key ($rk_i$). As an example, payment network 310 may generate a public key ($pk_i$) based on the second value ($g^a$), the merchant product (M), and the random merchant number ($m_i$) and a random key ($rk_i$) based on the merchant product (M) and the random merchant number ($m_i$) for each respective merchant bank of the plurality of merchant banks 308.

In some non-limiting embodiments or aspects, the public key ($pk_i$) may be generated as follows:

$$pk_i = g^{aMm_i}$$

In some non-limiting embodiments or aspects, the random key ($rk_i$) may be generated as follows:

$$rk_i = \frac{M}{m_i}$$

As shown in FIG. 11A, at step 1110, process 1100 includes communicating a public key ($pk_i$) and a random key ($rk_i$). For example, payment network 310 may communicate a public key ($pk_1$) and a random key ($rk_i$) to merchant bank 308. As an example, payment network 310 may communicate the public key ($pk_i$) and the random key ($rk_i$) to at least one respective merchant bank 308.

As shown in FIG. 11A, at step 1112, process 1100 includes generating random payment gateway numbers ($p_i$). For example, merchant bank 308 may generate random payment gateway numbers ($p_i$). As an example, merchant bank 308 may generate a random payment gateway number ($p_i$) for each of a plurality of payment gateways 306 (e.g., i=1, ..., k, where k is the number of payment gateways 1706).

As shown in FIG. 11A, at step 1114, process 1100 includes generating a payment gateway public key and a payment gateway random key. For example, merchant bank 308 may generate a payment gateway public key and a payment gateway random key. As an example, merchant bank 308 may generate a payment gateway public key based on the second value ($g^a$), the merchant product (M), and the random payment gateway number ($p_i$) and a payment gateway random key based on the random payment gateway number ($p_i$) for each respective payment gateway of the plurality of payment gateways 306.

In some non-limiting embodiments or aspects, the payment gateway public key for each payment gateway 306 may be generated as follows:

$$\text{payment gateway public key} = pk_i^{\frac{Mp_i}{m_i}} = \left(g^{aMm_i}\right)^{\frac{Mp_i}{m_i}} = g^{aM^2 p_i}$$

In some non-limiting embodiments or aspects, the payment gateway random key for each payment gateway 306 may be generated as follows:

$$\text{payment gateway random key} = \frac{1}{p_i}$$

As shown in FIG. 11A, at step 1116, process 1100 includes generating terminal numbers ($t_i$). For example, merchant bank 308 may generate terminal numbers ($t_i$). As an example, merchant bank 308 may generate a plurality of terminal numbers ($t_i$) for a respective plurality of point-of-sale (POS) terminals/partners 304.

As shown in FIG. 11A, at step 1118, process 1100 includes generating a terminal public key and a terminal random key. For example, merchant bank 308 may generate a terminal public key and a terminal random key. As an example, merchant bank 308 may generate a terminal public key based on the second value ($g^a$), the merchant product (M), the random payment gateway number ($p_i$), and the terminal number ($t_i$) and a terminal random key based on the random payment gateway number ($p_i$) and the terminal number ($t_i$) for each respective POS terminal of the plurality of POS terminals/partners 304.

In some non-limiting embodiments or aspects, the terminal public key for each POS terminal/partner 304 may be generated as follows:

$$\text{terminal public key} = (\text{payment gateway public key})^{t_i} = g^{aM^2 p_i t_i}$$

In some non-limiting embodiments or aspects, the terminal random key for each POS terminal/partner 304 may be generated as follows:

$$\text{terminal random key} = \frac{\text{payment gateway random key}}{t_i} = \frac{1}{p_i t_i}$$

As shown in FIG. 11B, at step 1120, process 1100 includes communicating a terminal public key and a terminal random key. For example, merchant bank 308 may communicate a terminal public key and a terminal random key. As an example, merchant bank 308 may communicate the terminal public key and the terminal random key to at least one payment gateway 306.

As shown in FIG. 11B, at step 1122, process 1100 includes communicating a terminal public key. For example, payment gateway 306 may communicate a terminal public key. As an example, payment gateway 306 may communicate the terminal public key to at least one POS terminal/partner 304.

As shown in FIG. 11B, at step 1124, process 1100 includes generating a random number (r) for a transaction message (m) associated with a transaction. For example, POS terminal/partner 304 may generate a random number (r) for a transaction message (m) associated with a transaction.

As shown in FIG. 11B, at step 1126, process 1100 includes generating a first ciphertext including a first ciphertext value and a second ciphertext value. For example, POS terminal/partner 304 may generate a first ciphertext including a first ciphertext value and a second ciphertext value. As an example, POS terminal/partner 304 may generate a first ciphertext associated with the transaction. In such an example, a first ciphertext may include (i) a first ciphertext value associated with the transaction message (m), the first ciphertext value encrypted based on the random number (r), a generator value (g), and the transaction message (m); and ii) a second ciphertext value associated with the random number (r), the second ciphertext value encrypted based on the random number (r) and the terminal public key.

In some non-limiting embodiments or aspects, the first ciphertext value may be generated as follows:

$$\text{first ciphertext value} = m \cdot g^r$$

In some non-limiting embodiments or aspects, the second ciphertext value may be generated as follows:

$$\text{second ciphertext value} = (\text{terminal public key})^r = g^{aM^2 p_i t_i r}$$

As shown in FIG. 11B, at step 1128, process 1100 includes communicating a first ciphertext. For example, POS terminal/partner 304 may communicate a first ciphertext. As an example, POS terminal/partner 304 may communicate the first ciphertext to the at least one payment gateway 306.

As shown in FIG. 11B, at step 1130, process 1100 includes re-encrypting a second ciphertext value. For example, payment gateway 306 may re-encrypt a second ciphertext value. As an example, payment gateway 306 may re-encrypt the second ciphertext value based on the terminal random key to transform the second ciphertext value to a re-encrypted second ciphertext value based on the second value ($g^a$), the merchant product (M), and the random number (r).

In some non-limiting embodiments or aspects, the second ciphertext value may be re-encrypted as follows:

$$\text{reencrypted second ciphertext value} = (\text{second ciphertext value})^{\text{terminal random key}} = \left(g^{aM^2 p_i t_i r}\right)^{\frac{1}{p_i t_i}} = g^{aM^2 r}$$

As shown in FIG. 11B, at step 1132, process 1100 includes communicating a re-encrypted second ciphertext value and a first ciphertext value. For example, payment gateway 306 may communicate a re-encrypted second ciphertext value and a first ciphertext value. As an example, payment gateway 306 may communicate the re-encrypted second ciphertext value and the first ciphertext value to the at least one merchant bank 308.

As shown in FIG. 11B, at step 1134, process 1100 includes re-encrypting a re-encrypted second ciphertext value to a second re-encrypted second ciphertext value. For example, merchant bank 308 may re-encrypt a re-encrypted second ciphertext value to a second re-encrypted second ciphertext value. As an example, merchant bank 308 may re-encrypt the re-encrypted second ciphertext value based on the random key ($rk_i$) to transform the re-encrypted second ciphertext value to a second re-encrypted second ciphertext value based on the second value ($g^a$), the merchant product (M), the merchant random number ($m_i$), and the random number (r).

In some non-limiting embodiments or aspects, the re-encrypted second ciphertext value may be re-encrypted as follows:

$$\text{second reencrypted second ciphertext value} = (\text{reencrypted second ciphertext value})^{rk_i^{-1}} = \left(g^{aM^2 r}\right)^{rk_i^{-1}} = \left(g^{aM^2 r}\right)^{\frac{m_i}{M}} = g^{aMm_i r}$$

As shown in FIG. 11C, at step 1136, process 1100 includes communicating a second re-encrypted second ciphertext value and a first ciphertext value. For example, merchant bank 308 may communicate a second re-encrypted second ciphertext value and a first ciphertext value. As an example, merchant bank 308 may communicate the second re-encrypted second ciphertext value and the first ciphertext value to payment network 310.

As shown in FIG. 11C, at step 1138, process 1100 includes decrypting a first ciphertext value based on a second re-encrypted second ciphertext value, a merchant product (M) and a merchant random number ($m_i$). For example, payment network 310 may decrypt a first ciphertext value based on a second re-encrypted second ciphertext value, a merchant product (M) and a merchant random number ($m_i$). As an example, payment network 310 may decrypt the first ciphertext value based on the second re-encrypted second ciphertext value, the merchant product (M), the merchant random number ($m_i$), and the first ciphertext value.

In some non-limiting embodiments or aspects, payment network 310 may transform the second re-encrypted second ciphertext value as follows:

transformed value =

$$(\text{second reencrypted second ciphertext})^{\frac{1}{Mm_i}} = \left(g^{aMm_i r}\right)^{\frac{1}{Mm_i}} = g^{ar}$$

In some non-limiting embodiments or aspects, payment network 310 may decrypt the first ciphertext value to form the message (m) as follows:

$$m = \frac{\text{first ciphertext value}}{(\text{transformed value})^{\frac{1}{a}}} = \frac{m \cdot g^r}{(g^{ar})^{\frac{1}{a}}} = \frac{m \cdot g^r}{g^r}$$

A security analysis of a hybrid PRE scheme according to non-limiting embodiments or aspects may be configured according to the following definitions, theorems and proofs. The domains of the inputs to all algorithms are not made explicit. It is assumed that if an input is entered into an algorithm, then it is in the correct domain. $f(a, b, c, \ldots)$ and $f_a(b, c \ldots)$ are written interchangeably. Furthermore, for an adversary A, defined is $$\overset{\Delta}{A}(f_1, f_2, \ldots ; g_1, g_2 \ldots) = \left| P\left[A^{f_1, f_2, \ldots} = 1\right] - P\left[A^{g_1, g_2 \ldots}\right] \right|.$$

A Key Encapsulation Mechanism (KEM) includes a tuple of algorithms (KG, Encaps, Decaps) and is defined as follows:
KG→(pk, sk): Key generation returns a public and secret key pair (pk, sk) Encaps(pk)→c: Encryption on input the public key, outputs a ciphertext and a key k
Decaps(sk, c)→m or ⊥: Decryption on input a secret key and a ciphertext outputs a key k or error symbol.
KEM Correctness may be defined as follows:
For all (pk, sk) output by KG, with probability one it holds that $(c,k)=\text{Encaps}(pk)$ $k=\text{Decaps}(sk,c)$.

Bi-directional KREMs may be defined, and the definition can be modified easily to capture uni-directional KREMs as well.

A Proxy Key Re-Encapsulation Mechanism (KREM) is a KEM with the following added functionality:
RKG($sk_i$, $pk_i$, $sk_j$, $pk_j$)→$rk_{i \rightarrow j}$: ReKeyGen takes as input source key pair ($sk_i$, $pk_i$) and destination key pair ($sk_j$, $pk_j$) and outputs a re-encapsulation key $rk_{i \rightarrow j}$.

ReEncaps($rk_{i \rightarrow j}$, c)→c' or ⊥: ReEncapsultion takes as input a re-encapsulation key $rk_{i \rightarrow j}$ and a ciphertext c and outputs a transformed ciphertext c' or error symbol.

A KREM scheme is $\ell$-hop correct if it is correct as a KEM and for all possible ($pk_i$, $sk_i$) for $i \leq i \leq \ell + 1$, for all $rk_{i \rightarrow j+1}$ for $1 \leq i \leq \ell$, with probability one it holds that:

$(c_1, k)=\text{Encaps}(pk_1)$ $c_{i+1}=\text{ReEncaps}(rk_{i \rightarrow i+1}, c_1) 1 \leq i \leq \ell$ $k=\text{Decaps}(sk_{\ell+1}, c_{\ell+1})$.

A KREM scheme is multi-hop correct if it is $\ell$-hop correct for all $\ell \geq 1$.

A DEM is correct if for all k output by KG and all messages m, it holds with probability one that:

$D(k, E(k,m))=m$.

KEM CCA Advantage may be defined as follows:
Consider a KEM (KG, Encaps, Decaps), then the CCA advantage of an adversary A is $$\overset{\Delta}{Adv}(A) := A(pk, c, k, Decaps_{sk}; pk, c, k', Decaps_{sk}),$$

where (pk, sk)←KG, (c, k)←Encaps(pk), k' is chosen uniformly from all strings of length |k|, and A may not input c to its $Decaps_{sk}$ oracle.

A Data Encapsulation Mechanism (DEM) includes a tuple of algorithms (KG, E, D) defined as follows:
KG(pp)→k: Key generation returns a secret key k.
E(k, m)→c: Encryption on input a key and message, outputs a ciphertext.
D(k, c)→m or ⊥: Decryption on input a secret key and a ciphertext outputs a message or error symbol.

A DEM CCA Advantage may be defined by considering a DEM (KG, E, D), then the CCA advantage of an adversary A is $$\overset{\Delta}{Adv}(A) := A(E_k, D_k; \$ \circ E_k, \bot),$$

where k←KG, $(x) returns uniform strings of length |x|, ⊥ always returns ⊥, and A may query its left oracle only once and may not use the output of its left oracle as input to its right oracle.

A KREM CCA Advantage may be defined by considering a key re-encapsulation mechanism KREM:=(KG, Encaps, Decaps, RKG, ReEncaps). Let A be an adversary, and let $A^{Gi}$ denote an execution of the KREM CCA game defined below with b set to i. Then A's KREM CCA advantage is defined as $$\overset{\Delta}{Adv}_{KREM}(A) := A(G_0; G_1).$$

The KREM CCA security game $G_i$ is played in two phases as follows:
Setup: Run the KREM setup and give the public parameters generated to the adversary. The adversary returns n, H, and C, representing the total number of parties, the set of honest parties, and corrupt parties, respectively. Generate n keypairs ($pk_i$, $sk_i$) with KG, and divide the indices among the sets H and C. For all i∈H give the adversary $pk_i$ and for all i∈C give the adversary ($pk_i$, $sk_i$).

Attack: For all i, j≤n, i≠j, compute the re-encryption key $rk_{i \to j}$ using RKG. We let D* denote the set of ciphertexts which are derived from the challenge ciphertext (see below); D*=∅ before the challenge oracle is queried. Similarly, we let D denote the set of ciphertexts which are derived from any encapsulation oracle output. The adversary A is given access to the oracles as specified KREM CCA Game Oracles 1200 shown in FIG. 12A, where A may query $O_{Chall}$ at most once, and b=i.

The following theorem follows from a straightforward hybrid argument:

Theorem. Combining a CCA KREM with a CCA DEM results in a CCA PRE scheme, i.e. we can construct adversaries B and C such that $$Adv_{PRE}(A) \leq Adv_{KREM}(B) + Adv_{DEM}(C).$$

The oracle Diffie-Hellman (ODH) assumption is relied on in the random oracle.

An ODH-RO Advantage, which is an adversary A's advantage in playing the ODH-RO game, is $$\overset{\Delta}{A}(F(\cdot), g^u, g^v, F(g^{uv}), F_v(\cdot); F(\cdot), g^u, g^v, W, F_v(\cdot)),$$

where F is a random oracle, u, v, W are chosen uniformly at random, and $$F_v(X) := F(X^v).$$

Theorem. Let A be a KREM CCA adversary against the Hybrid PRE construction presented in FIG. 9, then we construct an ODH-RO adversary B such that $$Adv_{KREM}(A) \leq Adv_{ODH-RO}(B),$$

Proof. We construct ODH-RO adversary B as follows.

1) B is given $g^u$, $g^v$, W, $F_v$, where W is either $F(g^{uv})$ or chosen uniformly at random.
2) B runs A and the setup procedure for the KREM CCA game as follows. A gives B two disjoint subsets of {1, . . . , n}, H and C, representing the honest and corrupt users, respectively. For i∈C, B generates independent keys ($pk_i$, $sk_i$) using KREM.KG. For i∈H, B generates uniform random values $r_i$. The adversary B gives A $pk_i = g^{vr_i}$ for i∈H, and ($pk_i$, $sk_i$) for i∈C.
3) B initiates A's attack phase, and responds to A oracle queries as specified in simulated oracles 1250 shown in FIG. 12B.

It can be shown that the standard PIN block encryption scheme is a secure DEM. These constructions are very related to the Encode-then-Encipher paradigm formalized by M. Bellare and P. Rogaway, "Encode-then-encipher encryption: How to exploit nonces or redundancy in plaintexts for efficient cryptography," in Advances in Cryptology—ASIACRYPT 2000, 6th International Conference on the Theory and Application of Cryptology and Information Security, Kyoto, Japan, Dec. 3-7, 2000, Proceedings, ser. Lecture Notes in Computer Science, T. Okamoto, Ed., vol. 1976. Springer, 2000, pp. 317-330. [Online]. Available: https://doi.org/10.1007/3-540-44448-3_24, (hereinafter Bellare et al.) the content of which is hereby incorporated by reference in its entirety. Two main differences are that: 1) additional associated data is considered, and 2) due to the use of hybrid encryption, only one-time use of the key/cipher need be considered. An effect of this last point is that the collision resistance of the encoding scheme no longer need be considered since there is only ever be one encrypt call for each DEM key. EPB's SE as defined in FIG. 5 as a secure DEM can be proven by extension of the results of Bellare et al.

A PPA scheme may be implemented using Java. For example, a NIST P-256 curve (a.k.a. secp256r1) with the parameters recommended by the standard may be used. This curve provides approximately 128-bits of security. The Bouncy Castle Crypto APIs may be used for its elliptic curve implementations. In such an example, all parties involved in PIN-based transactions may interact in the following order: POS application invokes PPA.Send method and sends the encrypted PIN to a payment gateway, payment gateway then invokes PPA.Relay method and sends the re-encrypted PIN to the merchant bank, merchant bank forwards the message to a payment network, payment network invokes PPA.Relay method and sends the re-encrypted PIN to the consumer bank for authorization. Finally, the consumer bank invokes PPA.Verify method to authorize the transaction. Each intermediary deploys PPA.Relay method in their own environment and interact with the consumer bank using ISO 8583 messages.

Both intermediary and the consumer bank applications may be run on a single machine. A prototype payment gateway service may be implemented as a web application accessed over HTTPS. All requests from the POS application are first handled by this web application and invoke the merchant bank web application running on a different port in the same machine. The merchant bank web application sends the request to the consumer bank web application via payment network web application. Dropwizard may be used to implement all prototype web applications. All web applications excluding the consumer bank web application may need to efficiently manage re-encryption keys to invoke PPA. Relay method. LevelDb may be used to store all the re-encryption keys and load the stored re-encryption keys in the memory during the web application startup.

Example Key Setup

Figure 13:
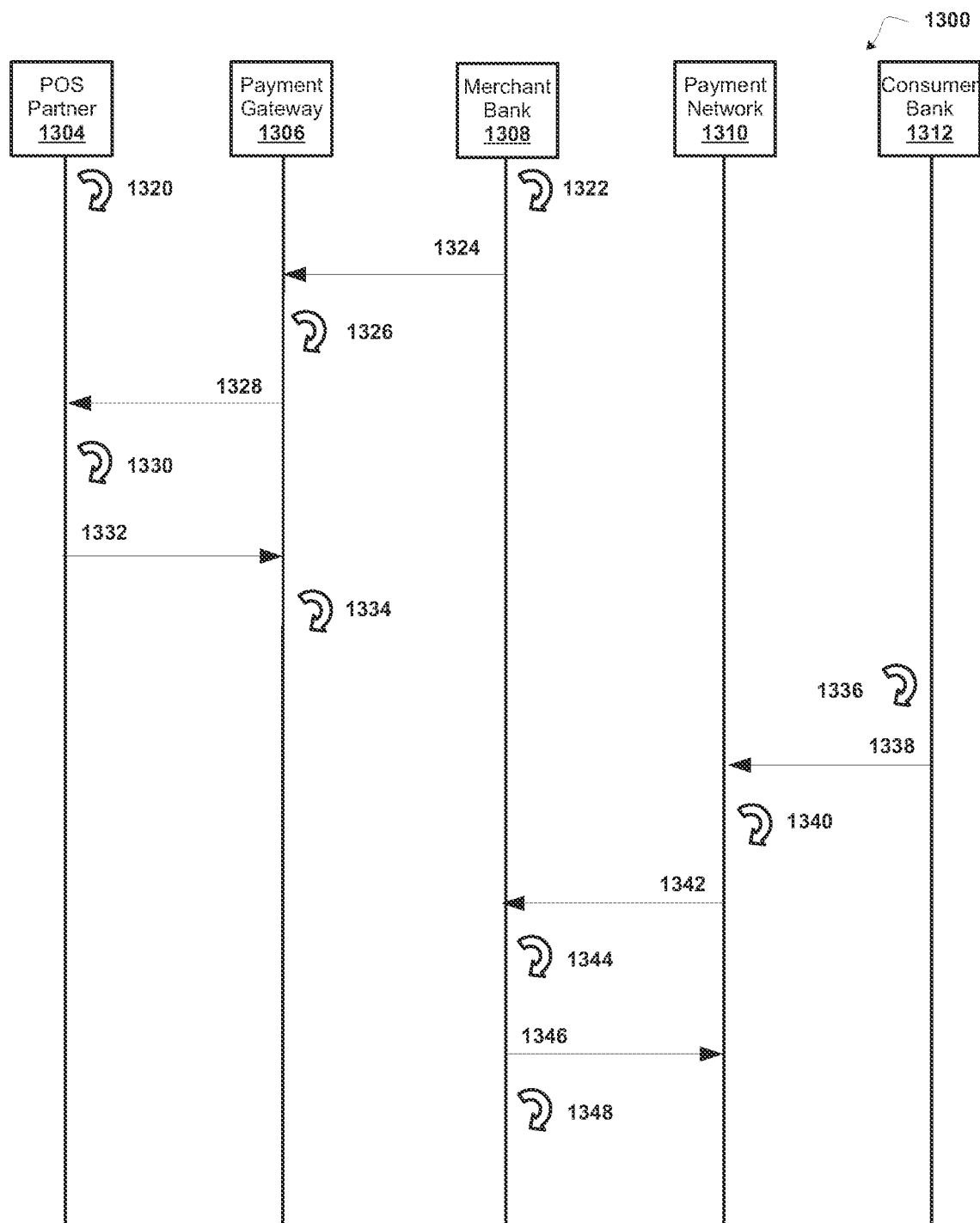
FIG. 13 is a signal flow diagram of an implementation of a non-limiting embodiment or aspect of a process disclosed herein.

Referring now to FIG. 13, FIG. 13 is a diagram of an overview of a non-limiting embodiment or aspect of an implementation 1300 relating to a process for securely transmitting PINs and other sensitive data. As shown in FIG. 13, implementation 1300 includes POS partner/terminal 1304, payment gateway 1306, merchant bank 1308, payment network 1310, and consumer bank 1312. In some non-limiting embodiments or aspects, POS partner/terminal 1304 can be the same or similar to POS partner/terminal 304. In some non-limiting embodiments or aspects, payment gateway 1306 can be the same or similar to payment gateway 306. In some non-limiting embodiments or aspects, merchant bank 1308 can be the same or similar to merchant bank 308. In some non-limiting embodiments or aspects, payment network 1310 can be the same or similar to payment network 310. In some non-limiting embodiments or aspects, consumer bank 1312 can be the same or similar to consumer bank 312.

As shown by reference number 1320 in FIG. 13, POS partner/terminal 1304 may generate a POS partner key pair ($pk_{pos}$, $sk_{pos}$) comprising a POS partner public key ($pk_{pos}$) and a POS partner secret key ($sk_{pos}$) using the key generation function PRE.KG(pp), the POS partner key pair ($pk_{pos}$, $sk_{pos}$) being associated with POS partner 1304. In some non-limiting embodiments or aspects, POS partner/terminal 1304 comprises at least one of the following: a point-of-sale terminal, a server computer associated with a merchant or acquirer system, a server computer associated with a point-of-sale service provider, or any combination thereof.

As shown by reference number 1322 in FIG. 13, merchant bank 1308 generates a merchant bank key pair ($pk_{mb}$, $sk_{mb}$) comprising a merchant bank public key ($pk_{mb}$) and a merchant bank secret key ($sk_{mb}$) using the key generation function PRE.KG(pp), the merchant bank key pair ($pk_{mb}$, $sk_{mb}$) being associated with merchant bank 1308.

As shown by reference number 1324 in FIG. 13, payment gateway 1306 receives the merchant bank public key ($pk_{mb}$) from merchant bank 1308. For example, merchant bank 1308 communicates the merchant bank public key ($pk_{mb}$) to payment gateway 1306.

As shown by reference number 1326 in FIG. 13, payment gateway 1306 stores the merchant bank public keys ($pk_{mb}^1, \ldots, pk_{mb}^n$) from merchant bank 1308.

As shown by reference number 1328 in FIG. 13, POS partner/terminal 1304 receives the merchant bank public key ($pk_{mb}$). For example, POS partner/terminal 1304 retrieves the merchant bank public keys ($pk_{mb}^1, \ldots, pk_{mb}^n$) from payment gateway 1306. As an example, payment gateway 1306 communicates the merchant bank public keys ($pk_{mb}^1, \ldots, pk_{mb}^n$) to POS partner/terminal 1304.

As shown by reference number 1330 in FIG. 13, POS partner/terminal 1304 generates a re-encryption key ($rk_{pos \to mb}$) based on the POS partner secret key ($sk_{pos}$) using the rekey generation function PRE.RKG(($pk_{pos}$, $sk_{pos}$), ($pk_{mb}$)). For example, POS partner/terminal 1304 generates re-encryption keys ($rk_{pos \to mb}^1, \ldots, rk_{pos \to mb}^n$) corresponding to the merchant bank public keys ($pk_{mb}^1, \ldots, pk_{mb}^n$) using the POS partner secret key ($sk_{pos}$). It is noted that for a unidirectional PRE scheme, PRE.RKG does not take the destination secret key (e.g., the merchant bank secret key $sk_{mb}$) as input, but for a bidirectional PRE scheme, PRE.RKG takes the destination secret key as input.

As shown by reference number 1332 in FIG. 13, POS partner/terminal 1304 communicates the re-encryption key ($rk_{pos \to mb}$) to payment gateway 1306. For example, POS partner/terminal 1304 publishes the re-encryption keys ($rk_{pos \to mb}^1, \ldots, rk_{pos \to mb}^n$) to payment gateway 1306. As an example, payment gateway 1306 receives the re-encryption keys ($rk_{pos \to mb}^1, \ldots, rk_{pos \to mb}^n$) from POS partner/terminal 1304.

As shown by reference number 1334 in FIG. 13, payment gateway 1306 stores the re-encryption keys ($rk_{pos \to mb}^1, \ldots, rk_{pos \to mb}^n$).

As shown by reference number 1336 in FIG. 13, consumer bank 1312 generates a consumer bank key pair ($pk_{cb}$, $sk_{cb}$) comprising a consumer bank public key ($pk^{cb}$) and a consumer bank secret key ($sk_{cb}$) using the key generation function PRE.KG(pp), the consumer bank key pair ($pk_{cb}$, $sk_{cb}$) being associated with consumer bank 1312.

As shown by reference number 1338 in FIG. 13, payment network 1310 receives the consumer bank public key ($pk_{cb}$) from consumer bank 1312. For example, consumer bank 1312 communicates the consumer bank public key ($pk_{cb}$) to payment network 1310.

As shown by reference number 1340 in FIG. 13, payment network 1310 stores the consumer bank public keys ($pk_{cb}^1, \ldots, pk_{cb}^n$) from consumer bank 1312.

As shown by reference number 1342 in FIG. 13, merchant bank 1308 receives the consumer bank public key ($pk_{cb}$). For example, merchant bank 1308 retrieves the consumer bank public keys ($pk_{cb}^1, \ldots, pk_{cb}^n$) from payment network 1310. As an example, payment network 1310 communicates the consumer bank public keys ($pk_{cb}^1, \ldots, pk_{cb}^n$) to merchant bank 1308.

As shown by reference number 1344 in FIG. 13, merchant bank 1308 generates a re-encryption key ($rk_{mb \to cb}$) based on the merchant bank secret key ($sk_{mb}$) using the rekey generation function PRE.RKG(($pk_{mb}$, $sk_{mb}$), ($pk_{cb}$)). For example, merchant bank 1308 generates re-encryption keys ($rk_{mb \to cb}^1, \ldots, rk_{mb \to cb}^n$) corresponding to the consumer bank public keys ($pk_{cb}^1, \ldots, pk_{cb}^n$) using the merchant bank secret key ($sk_{mb}$). It is noted that for a unidirectional PRE scheme, PRE.RKG does not take the destination secret key (e.g., the consumer bank secret key $sk_{cb}$) as input, but for a bidirectional PRE scheme, PRE.RKG takes the destination secret key as input.

As shown by reference number 1346 in FIG. 13, merchant bank 1308 communicates the re-encryption key ($rk_{mb \to cb}$) to payment network 1310. For example, merchant bank 1308 publishes the re-encryption keys ($rk_{mb \to cb}^1, \ldots, rk_{mb \to cb}^n$) to payment network 1310. As an example, payment network 1310 receives the re-encryption keys ($rk_{mb \to cb}^1, \ldots, rk_{mb \to cb}^n$) from merchant bank 1308.

As shown by reference number 1348 in FIG. 13, payment network 1310 stores the re-encryption keys ($rk_{mb \to cb}^1, \ldots, rk_{mb \to cb}^n$).

Example Key Setup

Figure 14:
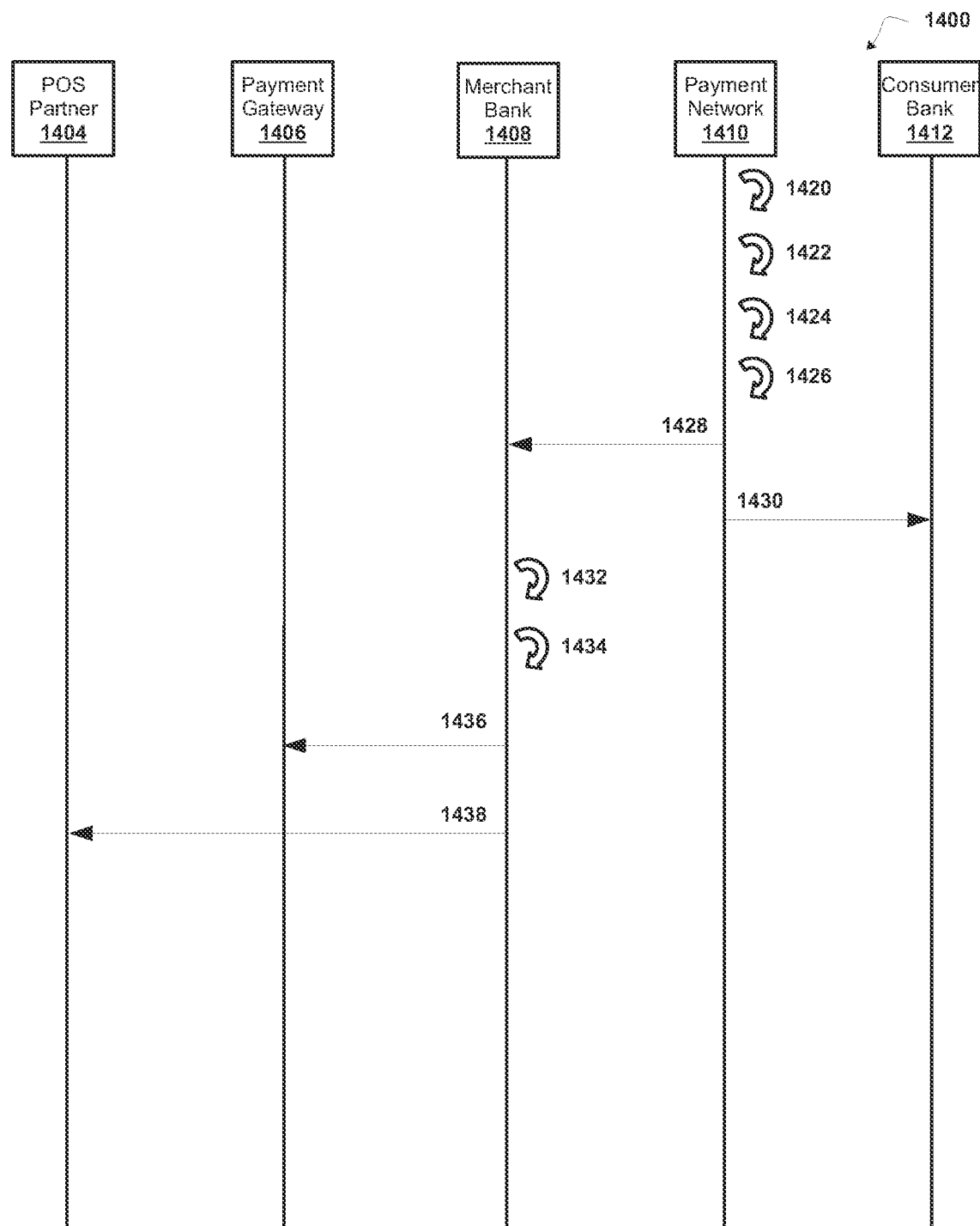
FIG. 14 is a signal flow diagram of an implementation of a non-limiting embodiment or aspect of a process disclosed herein.

Referring now to FIG. 14, FIG. 14 is a diagram of an overview of a non-limiting embodiment or aspect of an implementation 1400 relating to a process for securely transmitting PINs and other sensitive data. As shown in FIG. 14, implementation 1400 includes POS partner/terminal 1404, payment gateway 1406, merchant bank 1408, payment network 1410, and consumer bank 1412. In some non-limiting embodiments or aspects, POS partner/terminal 1404 can be the same or similar to POS partner/terminal 304. In some non-limiting embodiments or aspects, payment gateway 1406 can be the same or similar to payment gateway 306. In some non-limiting embodiments or aspects, merchant bank 1408 can be the same or similar to merchant bank 308. In some non-limiting embodiments or aspects, payment network 1410 can be the same or similar to payment network 310. In some non-limiting embodiments or aspects, consumer bank 1412 can be the same or similar to consumer bank 312.

As shown by reference number 1420 in FIG. 14, payment network 1410 generates a merchant bank key pair ($pk_{mb}$, $sk_{mb}$) comprising a merchant bank public key ($pk_{mb}$) and a merchant bank secret key ($sk_{mb}$) using the key generation function PRE.KG(pp), the merchant bank key pair ($pk_{mb}$, $sk_{mb}$) being associated with merchant bank 1308.

As shown by reference number 1422 in FIG. 14, payment network 1410 generates a consumer bank key pair ($pk_{cb}$, $sk_{cb}$) comprising a consumer bank public key ($pk_{cb}$) and a consumer bank secret key ($sk_{cb}$) using the key generation function PRE.KG(pp), the consumer bank key pair ($pk_{cb}$, $sk_{cb}$) being associated with consumer bank 1312.

As shown by reference number 1424 in FIG. 14, payment network 1410 generates a re-encryption key ($rk_{mb \to cb}$) based on the merchant bank secret key ($sk_{mb}$) and the consumer bank secret key ($sk_{cb}$) using the rekey generation function PRE.RKG(($pk_{mb}$, $sk_{mb}$), ($pk_{cb}$, $sk_{cb}$). For example, payment network 1410 generates re-encryption keys ($rk_{mb \to cb}^1, \ldots, rk_{mb \to cb}^n$) corresponding to the consumer bank public keys ($pk_{cb}^1, \ldots, pk_{cb}^n$) using the merchant bank secret key ($sk_{mb}$) and the consumer bank secret key ($sk_{cb}$). It is noted that for a bidirectional PRE scheme, PRE. RKG takes the destination secret key (e.g., the consumer bank secret key $sk_{cb}$) as input, but for a unidirectional PRE scheme, PRE.RKG does not take the destination secret key as input.

As shown by reference number 1426 in FIG. 14, payment network 1410 stores the re-encryption keys ($rk_{mb \to cb}^{1}, \ldots, rk_{mb \to cb}^{n}$).

As shown by reference number 1428 in FIG. 14, merchant bank 1408 receives the merchant bank key pair ($pk_{mb}$, $sk_{mb}$) from payment network 1410. For example, payment network 1410 communicates the merchant bank key pair ($pk_{mb}$, $sk_{mb}$) to merchant bank 1408.

As shown by reference number 1430 in FIG. 14, consumer bank 1412 receives the consumer bank key pair ($pk_{cb}$, $sk_{cb}$) from payment network 1410. For example, payment network 1410 communicates the consumer bank key pair ($pk_{cb}$, $sk_{cb}$) to consumer bank 1412.

As shown by reference number 1432 in FIG. 14, merchant bank 1408 generates a POS partner key pair ($pk_{pos}$, $sk_{pos}$) comprising a POS partner public key ($pk_{pos}$) and a POS partner secret key ($sk_{pos}$) using the key generation function PRE.KG(pp), the POS partner key pair ($pk_{pos}$, $sk_{pos}$) being associated with POS partner 1404.

As shown by reference number 1434 in FIG. 14, merchant bank 1408 generates a re-encryption key ($rk_{pos \to mb}$) based on the POS partner secret key ($sk_{pos}$) and the merchant bank secret key ($sk_{mb}$) using the rekey generation function PRE.RKG(($pk_{pos}$, $sk_{pos}$), ($pk_{mb}$, $sk_{mb}$)). For example, merchant bank 1408 generates re-encryption keys ($rk_{pos \to mb}^{1}, \ldots, rk_{pos \to mb}^{n}$) corresponding to the merchant bank public keys ($pk_{mb}^{1}, \ldots, pk_{mb}^{n}$) using the POS partner secret key ($sk_{pos}$) and the merchant bank secret key ($sk_{mb}$). It is noted that for a bidirectional PRE scheme, PRE.RKG takes the destination secret key (e.g., the merchant bank secret key $sk_{mb}$) as input, but for a bidirectional PRE scheme, PRE.RKG does not take the destination secret key as input.

As shown by reference number 1436 in FIG. 14, payment gateway 1406 receives the re-encryption keys ($rk_{pos \to mb}^{1}, \ldots, rk_{pos \to mb}^{n}$). For example, merchant bank 1408 communicates each re-encryption key ($rk_{pos \to mb}^{1}, \ldots, rk_{pos \to mb}^{n}$) to payment gateway 1406.

As shown by reference number 1438 in FIG. 14, POS partner/terminal 1404 receives the POS partner public key ($pk_{pos}$). For example, merchant bank 1408 communicates the POS partner public key ($pk_{pos}$) to POS partner/terminal 1404.

Example PIN Translation

Figure 15:
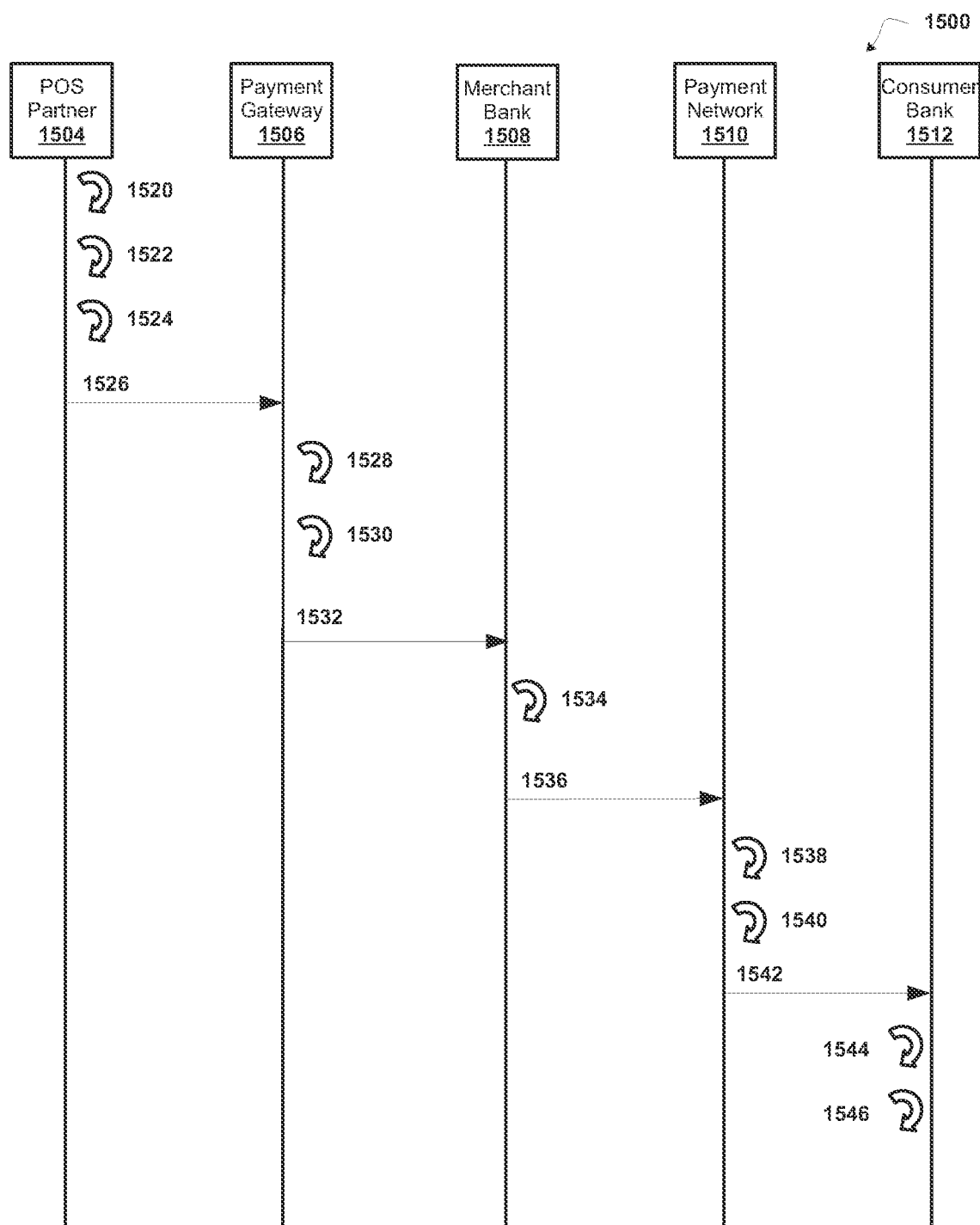
FIG. 15 is a signal flow diagram of an implementation of a non-limiting embodiment or aspect of a process disclosed herein.

Referring now to FIG. 15, FIG. 15 is a diagram of an overview of a non-limiting embodiment or aspect of an implementation 1500 relating to a process for securely transmitting PINs and other sensitive data. As shown in FIG. 15, implementation 1500 includes POS partner/terminal 1504, payment gateway 1506, merchant bank 1508, payment network 1510, and consumer bank 1512. In some non-limiting embodiments or aspects, POS partner/terminal 1504 can be the same or similar to POS partner/terminal 304. In some non-limiting embodiments or aspects, payment gateway 1506 can be the same or similar to payment gateway 306. In some non-limiting embodiments or aspects, merchant bank 1508 can be the same or similar to merchant bank 308. In some non-limiting embodiments or aspects, payment network 1510 can be the same or similar to payment network 310. In some non-limiting embodiments or aspects, consumer bank 1512 can be the same or similar to consumer bank 312.

As shown by reference number 1520 in FIG. 15, POS partner/terminal 1504 generates a session key (DUKPT) (e.g., a session secret key $ss_k$, etc.) using the DUKPT method (e.g., DUKPT=KDF(MSK, Nonce), where KDF is a key derivation function and MSK is a Master Session Key, etc.)

As shown by reference number 1522 in FIG. 15, POS partner/terminal 1504 encrypts an authentication code (e.g., a PIN, etc.) for a transaction using the triple-DES algorithm TDES and the session key (DUKPT) to generate a PIN block (EPB) (e.g., EPB=TDES(PIN, DUKPT), etc.)

As shown by reference number 1524 in FIG. 15, POS partner/terminal 1504 encrypts the session key (DUKPT) based on the POS partner public key ($pk_{pos}$) using the function PRE.E(DUKPT, $pk_{pos}$) (e.g., wraps the session secret key $ss_k$ with the POS partner public key ($pk_{pos}$) to generate DUKPT'). For example, POS partner/terminal 1504 generates encrypted transaction data (e.g., authorization request cryptogram (ARQC), EPB, DUKPT') for a transaction, the encrypted transaction data comprising: (i) an encrypted code (EPB) comprising an authentication code (PIN) encrypted with a session key (DUKPT), and (ii) an encrypted session key (DUKPT') comprising the session key (DUKPT) encrypted with the POS partner public key ($pk_{pos}$) associated with POS partner/terminal 1504.

As shown by reference number 1526 in FIG. 15, POS partner/terminal 1504 communicates the encrypted transaction data (e.g., ARQC, EPB, DUKPT') to payment gateway 1506. For example, payment gateway 1506 receives, from POS partner/terminal 1504, the encrypted transaction data (ARQC, EPB, DUKPT') for the transaction, the encrypted transaction data comprising: (i) the encrypted code (EPB) comprising the authentication code (PIN) encrypted with the session key (DUKPT), and (ii) the encrypted session key (DUKPT') comprising the session key (DUKPT) encrypted with the POS partner public key ($pk_{pos}$) associated with POS partner/terminal 1504.

As shown by reference number 1528 in FIG. 15, payment gateway 1506 determines a re-encryption key ($rk_{pos \to mb}$) from the re-encryption keys ($rk_{pos \to mb}^{1}, \ldots, rk_{pos \to mb}^{n}$) based on the encrypted transaction data. For example, payment gateway 1506 determines the re-encryption key ($rk_{pos \to mb}$) from the re-encryption keys ($rk_{pos \to mb}^{1}, \ldots, rk_{pos \to mb}^{n}$) that corresponds with a merchant bank public key ($pk_{mb}$) of the merchant bank public keys ($pk_{mb}^{1}, \ldots, pk_{mb}^{n}$).

As shown by reference number 1530 in FIG. 15, payment gateway 1506 re-encrypts the encrypted session key (DUKPT') with the re-encryption key ($rk_{pos \to mb}$) using the re-encryption function PRE.RE (e.g., DUKPT"=PRE.RE(DUKPT', $rk_{pos \to mb}$)) to generate a re-encrypted encrypted session key DUKPT".

As shown by reference number 1532 in FIG. 15, payment gateway 1506 communicates the re-encrypted encrypted session key (DUKPT") to merchant bank 1508. For example, merchant bank 1508 may receive, from payment gateway 1506, the encrypted transaction data (e.g., ARQC, EPB, DUKPT") comprising: (i) an encrypted code (EPB) comprising an authentication code (PIN) encrypted with a session key (DUKPT), and (ii) a re-encrypted encrypted session key (DUKPT") comprising an encrypted session key (DUKPT') encrypted with the re-encryption key ($rk_{pos \to mb}$), the encrypted session key (DUKPT') comprising the session key (DUKPT) encrypted with the POS partner public key ($pk_{pos}$) associated with POS partner/terminal 1504.

As shown by reference number 1534 in FIG. 15, merchant bank 1508 may decrypt the re-encrypted encrypted session key (DUKPT") based on the merchant bank secret key ($sk_{mb}$) using the function PRE.D. In some non-limiting embodiments or aspects, merchant bank 1508 generates an authorization request message in response to verifying the authentication code (PIN) and communicates the authorization request message to payment network 1510.

As shown by reference number 1536 in FIG. 15, merchant bank 1508 may generate and forward, to payment network 1510, encrypted transaction data (e.g., ARQC, EPB, DUKPT') for the transaction, the encrypted transaction data comprising: (i) an encrypted code (EPB) comprising an authentication code (PIN) encrypted with a session key (DUKPT), and (ii) an encrypted session key (DUKPT') comprising the session key (DUKPT) encrypted with the merchant bank public key ($pk_{mb}$) associated with merchant bank 1508. For example, payment network 1510 may receive the encrypted transaction data (e.g., ARQC, EPB, DUKPT') for the transaction, the encrypted transaction data comprising: (i) the + encrypted code (EPB) comprising the authentication code (PIN) encrypted with the session key (DUKPT), and (ii) an encrypted session key (DUKPT') comprising the session key (DUKPT) encrypted with the merchant bank public key ($pk_{mb}$) associated with merchant bank 1508.

As shown by reference number 1538 in FIG. 15, payment network 1510 may determine a re-encryption key ($rk_{mb \to cb}$) from the re-encryption keys ($rk_{mb \to cb}^1, \ldots, rk_{mb \to cb}^n$) based on the encrypted transaction data. For example, payment network 1510 determines the re-encryption key ($rk_{mb \to cb}$) from the re-encryption keys ($rk_{mb \to cb}^1, \ldots, rk_{mb \to cb}^n$) that corresponds with a consumer bank public key ($pk_{cb}$) of the consumer bank public keys ($pk_{cb}^1, \ldots, pk_{cb}^n$).

As shown by reference number 1540 in FIG. 15, payment network 1510 re-encrypts the encrypted session key (DUKPT') with the re-encryption key ($rk_{mb \to cb}$) using the re-encryption function PRE.RE (e.g., DUKPT"=PRE.RE (DUKPT', $rk_{mb \to cb}$)).

As shown by reference number 1542 in FIG. 15, payment network 1510 communicates the re-encrypted encrypted session key (DUKPT") to consumer bank 1512. For example, consumer bank 1512 may receive, from payment network 1510, the encrypted transaction data (e.g., ARQC, EPB, DUKPT") comprising: (i) an encrypted code (EPB) comprising an authentication code (PIN) encrypted with a session key (DUKPT), and (ii) a re-encrypted encrypted session key (DUKPT") comprising an encrypted session key (DUKPT') encrypted with the re-encryption key ($rk_{mb \to cb}$), the encrypted session key (DUKPT') comprising the session key (DUKPT) encrypted with the merchant bank public key (e.g., $pk_{mb}$) associated with merchant bank 1508.

As shown by reference number 1544 in FIG. 15, consumer bank 1512 may decrypt the re-encrypted encrypted session key (DUKPT") based on the consumer bank secret key ($sk_{cb}$) using the function PRE.D (e.g., DUKPT=PRE.D (DUKPT", $sk_{cb}$)) to get the session key (DUKPT) and decrypt the encrypted code (EPB) using the session key (DUKPT) (e.g., PIN=TDES(DUKPT, EPB), etc.) to get the authentication code (PIN).

As shown by reference number 1546 in FIG. 15, consumer bank 1512 may authorize (or deny) the transaction based on the authentication code (PIN).

Example Offline Consumer Bank

Figure 16:
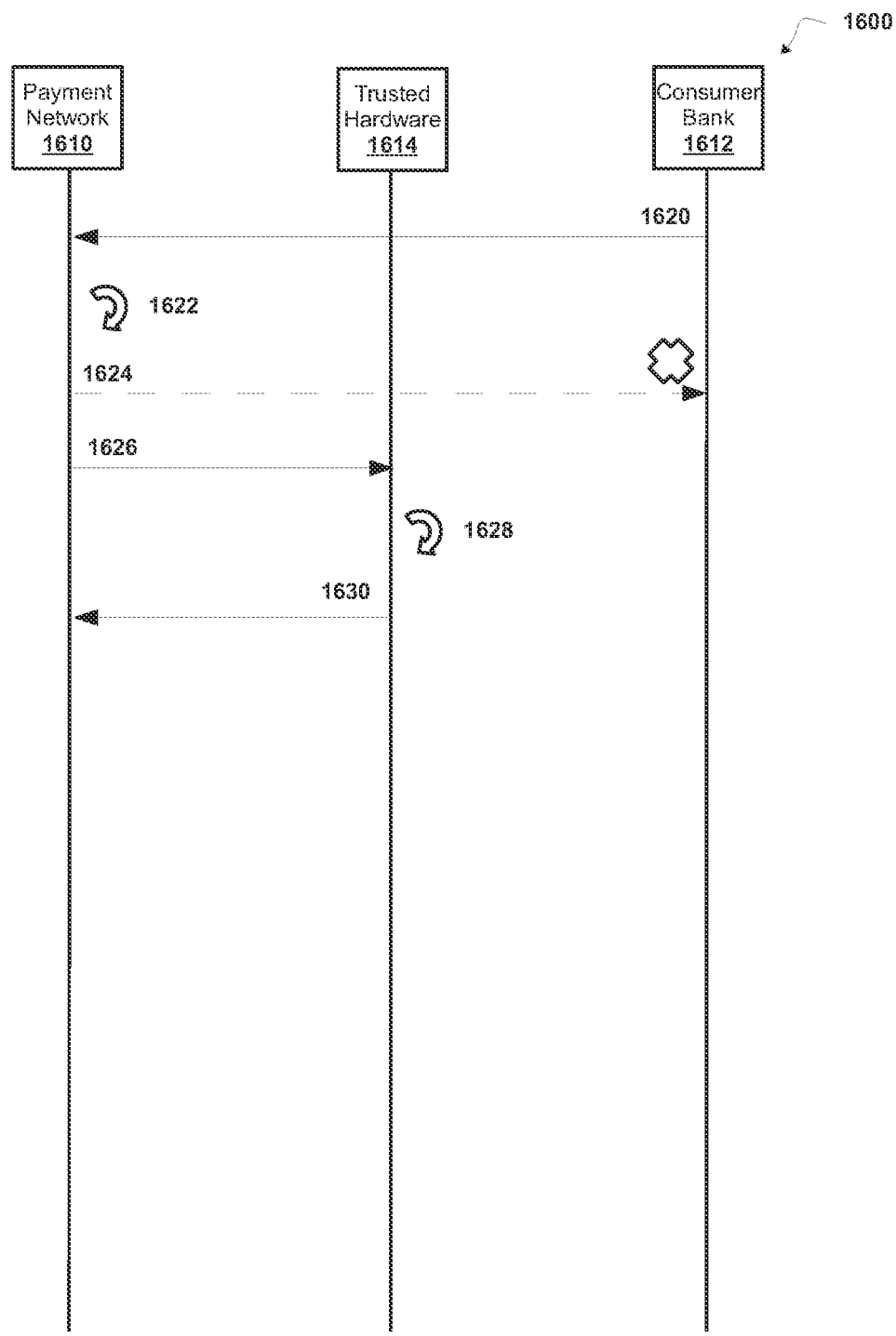
FIG. 16 is a signal flow diagram of an implementation of a non-limiting embodiment or aspect of a process disclosed herein.

Referring now to FIG. 16, FIG. 16 is a diagram of an overview of a non-limiting embodiment or aspect of an implementation 1600 relating to a process for securely transmitting PINs and other sensitive data. As shown in FIG. 16, implementation 1600 includes payment network 1610, consumer bank 1612, and trusted hardware 1614. In some non-limiting embodiments or aspects, payment network 1610 can be the same or similar to payment network 310. In some non-limiting embodiments or aspects, consumer bank 1612 can be the same or similar to consumer bank 312.

As shown by reference number 1620 in FIG. 16, consumer bank 1612 may authorize payment network 1610 to provision the consumer bank secret key ($sk_{cb}$) to trusted hardware 1614 (e.g., Intel SGX hosted extended access point, etc.).

As shown by reference number 1622 in FIG. 16, payment network 1610 re-encrypts the encrypted session key (DUKPT') for a transaction with the re-encryption key ($rk_{mb \to cb}$) using the re-encryption function PRE.RE (e.g., DUKPT"=PRE.RE(DUKPT', $rk_{mb \to cb}$)).

As shown by reference number 1624 in FIG. 16, payment network 1610 attempts to send the encrypted transaction data for the transaction to consumer bank 1612 and detects that consumer bank 1612 is offline.

As shown by reference number 1626 in FIG. 16, payment network 1610 requests trusted hardware 1614 for authorization of the transaction. For example, payment network 1610, in response to determining that the consumer bank 1612 is offline, requests trusted hardware 1614 for authorization of the transaction by providing the encrypted transaction data (e.g., ARQC, EPB, DUKPT") to trusted hardware 1614.

As shown by reference number 1628 in FIG. 16, trusted hardware 1614 may decrypt the re-encrypted encrypted session key (DUKPT") based on the consumer bank secret key ($sk_{cb}$) using the function PRE.D (e.g., DUKPT=PRE.D (DUKPT", $sk_{cb}$)) to get the session key (DUKPT) and decrypt the encrypted code (EPB) using the session key (DUKPT) (e.g., PIN=TDES(DUKPT, EPB), etc.) to get the authentication code (PIN).

As shown by reference number 1630 in FIG. 16, trusted hardware 1614 may authorize (or deny) the transaction based on the authentication code (PIN).

Example Key Setup

Figure 17:
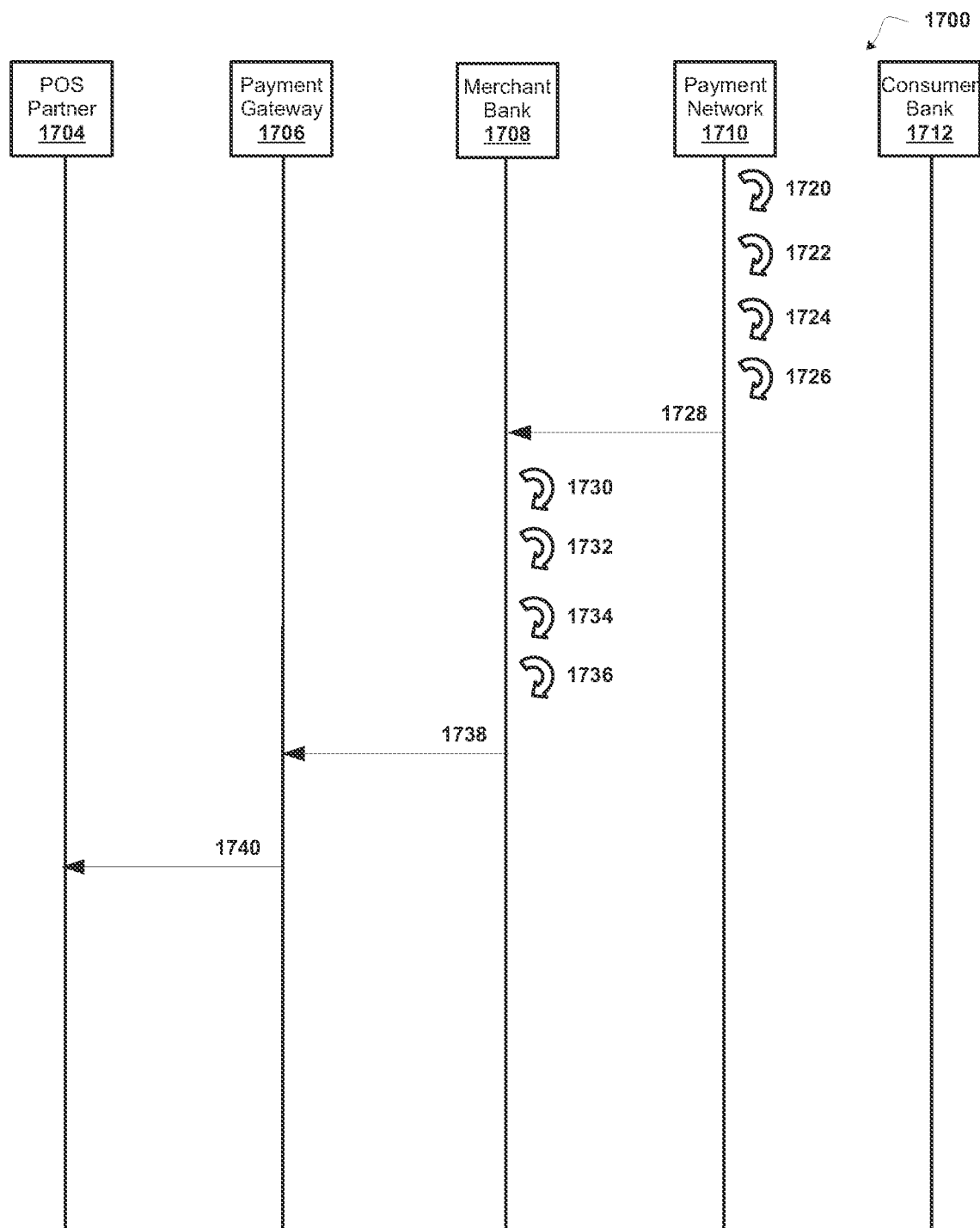
FIG. 17 is a signal flow diagram of an implementation of a non-limiting embodiment or aspect of a process disclosed herein.

Referring now to FIG. 17, FIG. 17 is a diagram of an overview of a non-limiting embodiment or aspect of an implementation 1700 relating to a process for securely transmitting PINs and other sensitive data. As shown in FIG. 17, implementation 1700 includes POS partner/terminal 1704, payment gateway 1706, merchant bank 1708, payment network 1710, and consumer bank 1712. In some non-limiting embodiments or aspects, POS partner/terminal 1704 can be the same or similar to POS partner/terminal 304. In some non-limiting embodiments or aspects, payment gateway 1706 can be the same or similar to payment gateway 306. In some non-limiting embodiments or aspects, merchant bank 1708 can be the same or similar to merchant bank 308. In some non-limiting embodiments or aspects, payment network 1710 can be the same or similar to payment network 310. In some non-limiting embodiments or aspects, consumer bank 1712 can be the same or similar to consumer bank 312.

As shown by reference number 1720 in FIG. 17, payment network 1710 may generate a first value (a) and a second value ($g^a$). For example, the second value ($g^a$) may be generated based on the first value (a) and a generator value (g).

In some non-limiting embodiments or aspects, the second value may be generated as the generator value (g) raised to the power of the first value (a). For example, the second value may be generated as follows:

$$\text{second value} = g^a$$

As shown by reference number 1722 in FIG. 17, payment network 1710 may generate random merchant number ($m_i$). As an example, payment network 1710 may generate a random merchant number ($m_i$) for each of a plurality of merchant banks 1708. For example, payment network 1710 may generate a plurality of random merchant numbers ($m_1, \ldots, m_k \in G$) for a respective plurality of merchant banks 1708 (e.g., $i=1, \ldots, k$, where k is the number of merchant banks).

As shown by reference number 1724 in FIG. 17, payment network 1710 may determine a merchant product (M). For example, payment network 1710 may determine a merchant product (M) based on a product of the plurality of random merchant numbers ($m_i$) for the respective plurality of merchant banks 308.

In some non-limiting embodiments or aspects, the merchant product (M) may be determined as follows:

$$M = \prod_{i=1}^{k} m_i$$

where k is the number of merchant banks.

As shown by reference number 1726 in FIG. 17, payment network 1710 may generate a public key ($pk_i$) and a random key ($rk_i$). As an example, payment network 1710 may generate a public key ($pk_i$) based on the second value ($g^a$), the merchant product (M), and the random merchant number ($m_i$) and a random key ($rk_i$) based on the merchant product (M) and the random merchant number ($m_i$) for each respective merchant bank of the plurality of merchant banks 308.

In some non-limiting embodiments or aspects, the public key ($pk_i$) for each merchant bank 1708 may be generated as follows:

$$pk_i = g^{aMm_i}$$

In some non-limiting embodiments or aspects, the random key ($rk_i$) may be generated as follows:

$$rk_i = \frac{M}{m_i}$$

As shown by reference number 1728 in FIG. 17, payment network 1710 may communicate a public key ($pk_i$) and a random key ($rk_i$) to merchant bank 1708. As an example, payment network 1710 may communicate the public key ($pk_i$) and the random key ($rk_i$) to at least one respective merchant bank 308.

As shown by reference number 1730 in FIG. 17, merchant bank 1708 may generate random payment gateway numbers ($p_i$). As an example, merchant bank 1708 may generate a random payment gateway number ($p_i$) for each of a plurality of payment gateways 1706 (e.g., $i=1, \ldots, k$, where k is the number of payment gateways 1706).

As shown by reference number 1732 in FIG. 17, merchant bank 1708 may generate a payment gateway public key and a payment gateway random key. As an example, merchant bank 1708 may generate a payment gateway public key based on the second value ($g^a$), the merchant product (M), and the random payment gateway number ($p_i$) and a payment gateway random key based on the random payment gateway number ($p_i$) for each respective payment gateway of the plurality of payment gateways 306.

In some non-limiting embodiments or aspects, the payment gateway public key for each payment gateway 1706 may be generated as follows:

$$\text{payment gateway public key} = pk_i^{\frac{Mp_i}{m_i}} = \left(g^{aMm_i}\right)^{\frac{Mp_i}{m_i}} = g^{aM^2 p_i}$$

In some non-limiting embodiments or aspects, the payment gateway random key for each payment gateway 1706 may be generated as follows:

$$\text{payment gateway random key} = \frac{1}{p_i}$$

As shown by reference number 1734 in FIG. 17, merchant bank 1708 may generate terminal numbers ($t_i$). As an example, merchant bank 1708 may generate a terminal number ($t_i$) for each of a plurality of point-of-sale (POS) terminals/partners 1704.

As shown by reference number 1736 in FIG. 17, merchant bank 1708 may generate a terminal public key and a terminal random key. As an example, merchant bank 308 may generate a terminal public key based on the second value ($g^a$), the merchant product (M), the random payment gateway number ($p_i$), and the terminal number ($t_i$) and a terminal random key based on the random payment gateway number ($p_i$) and the terminal number ($t_i$) for each respective POS terminal of the plurality of POS terminals/partners 304.

In some non-limiting embodiments or aspects, the terminal public key for each POS terminal/partner 1704 may be generated as follows:

$$\text{terminal public key} = (\text{payment gateway public key})^{t_i} = g^{aM^2 p_i t_i}$$

In some non-limiting embodiments or aspects, the terminal random key for each POS terminal/partner 1704 may be generated as follows:

$$\text{terminal random key} = \frac{\text{payment gateway random key}}{t_i} = \frac{1}{p_i t_i}$$

As shown by reference number 1738 in FIG. 17, merchant bank 1708 may communicate the terminal public key(s) and/or terminal random key(s). As an example, merchant bank 1708 may communicate the terminal public key(s) and the terminal random key(s) to at least one payment gateway 1706.

As shown by reference number 1740 in FIG. 17, payment gateway 1706 may communicate the terminal public key(s). As an example, payment gateway 1706 may communicate the terminal public key(s) to at least one POS terminal/partner 1704.

Example PIN Translation

Figure 18:
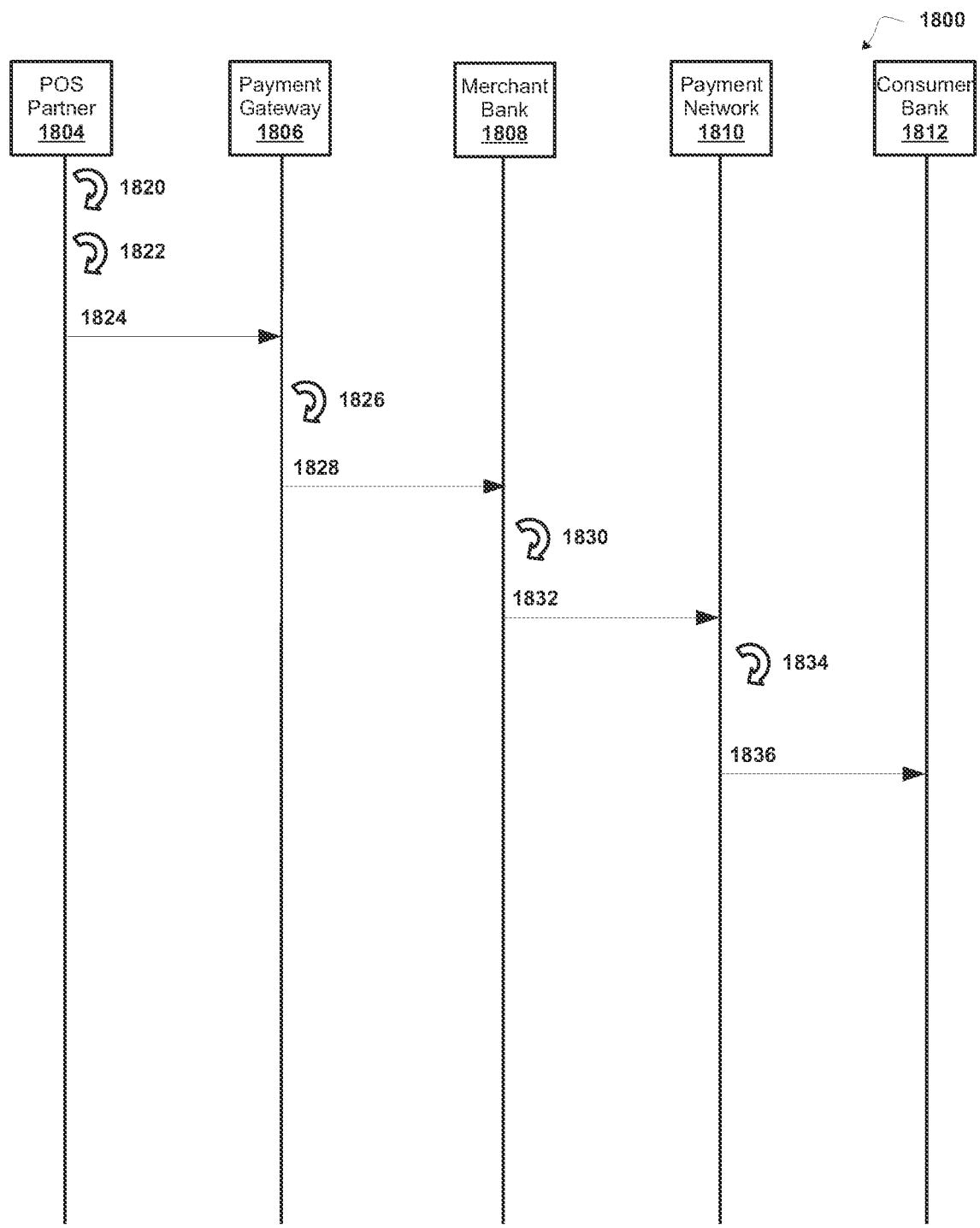
FIG. 18 is a signal flow diagram of an implementation of a non-limiting embodiment or aspect of a process disclosed herein.

Referring now to FIG. 18, FIG. 18 is a diagram of an overview of a non-limiting embodiment or aspect of an implementation 1800 relating to a process for securely transmitting PINs and other sensitive data. As shown in FIG. 18, implementation 1800 includes POS partner/terminal 1804, payment gateway 1806, merchant bank 1808, payment network 1810, and consumer bank 1812. In some non-limiting embodiments or aspects, POS partner/terminal 1804 can be the same or similar to POS partner/terminal 304 and/or POS partner/terminal 1704. In some non-limiting embodiments or aspects, payment gateway 1806 can be the same or similar to payment gateway 306 and/or payment gateway 1706. In some non-limiting embodiments or aspects, merchant bank 1808 can be the same or similar to merchant bank 308 and/or merchant bank 1708. In some non-limiting embodiments or aspects, payment network 1810 can be the same or similar to payment network 310 and/or payment network 1710. In some non-limiting embodiments or aspects, consumer bank 1812 can be the same or similar to consumer bank 312 and/or consumer bank 1712.

As shown by reference number 1820 in FIG. 18, POS terminal/partner 1804 may generate a random number (r) for a transaction message (m) associated with a transaction.

As shown by reference number 1822 in FIG. 18, POS terminal/partner 1804 may generate a first ciphertext including a first ciphertext value and a second ciphertext value. As an example, POS terminal/partner 1804 may generate a first ciphertext associated with the transaction. In such an example, the first ciphertext value may be associated with the transaction message (m), the first ciphertext value encrypted based on the random number (r), a generator value (g), and the transaction message (m). Additionally or alternatively, the second ciphertext value may be associated with the random number (r), the second ciphertext value encrypted based on the random number (r) and the terminal public key.

In some non-limiting embodiments or aspects, the first ciphertext value may be generated as follows:

first ciphertext value=$m \cdot g^r$

In some non-limiting embodiments or aspects, the second ciphertext value may be generated as follows:

second ciphertext value=(terminal public key)$^r = g^{aM^2 p_i t_i r}$

As shown by reference number 1824 in FIG. 18, POS terminal/partner 1804 may communicate a first ciphertext. As an example, POS terminal/partner 1804 may communicate the first ciphertext to the at least one payment gateway 1806.

As shown by reference number 1826 in FIG. 18, payment gateway 1806 may re-encrypt the second ciphertext value. As an example, payment gateway 1806 may re-encrypt the second ciphertext value based on the terminal random key to transform the second ciphertext value to a re-encrypted second ciphertext value based on the second value ($g^a$), the merchant product (M), and the random number (r).

In some non-limiting embodiments or aspects, the second ciphertext value may be re-encrypted as follows:

reencrypted second ciphertext value =

(second ciphertext value)$^{terminal\,random\,key} = \left(g^{aM^2 p_i t_i r}\right)^{\frac{1}{p_i t_i}} = g^{aM^2 r}$ As shown by reference number 1828 in FIG. 18, payment gateway 1806 may communicate a re-encrypted second ciphertext value and a first ciphertext value. As an example, payment gateway 1806 may communicate the re-encrypted second ciphertext value and the first ciphertext value to the at least one merchant bank 1808.

As shown by reference number 1830 in FIG. 18, merchant bank 1808 may re-encrypt a re-encrypted second ciphertext value to a second re-encrypted second ciphertext value. As an example, merchant bank 1808 may re-encrypt the re-encrypted second ciphertext value based on the random key ($rk_j$) to transform the re-encrypted second ciphertext value to a second re-encrypted second ciphertext value based on the second value ($g^a$), the merchant product (M), the merchant random number ($m_j$), and the random number (r).

In some non-limiting embodiments or aspects, the re-encrypted second ciphertext value may be re-encrypted as follows:

second reencrypted second ciphertext value =

(reencrypted second ciphertext value)$^{rk_j^{-1}} =$ $\left(g^{aM^2 r}\right)^{rk_j^{-1}} = \left(g^{aM^2 r}\right)^{\frac{m_j}{M}} = g^{aMm_j r}$ As shown by reference number 1832 in FIG. 18, merchant bank 1808 may communicate a second re-encrypted second ciphertext value and a first ciphertext value. As an example, merchant bank 1808 may communicate the second re-encrypted second ciphertext value and the first ciphertext value to payment network 1810.

As shown by reference number 1834 in FIG. 18, payment network 1810 may decrypt a first ciphertext value based on a second re-encrypted second ciphertext value, a merchant product (M) and a merchant random number ($m_j$). As an example, payment network 1810 may decrypt the first ciphertext value based on the second re-encrypted second ciphertext value, the merchant product (M), the merchant random number ($m_j$), and the first ciphertext value.

In some non-limiting embodiments or aspects, payment network 1810 may transform the second re-encrypted second ciphertext value as follows:

transformed value =

(second reencrypted second ciphertext)$^{\frac{1}{Mm_i}} = \left(g^{aMm_j r}\right)^{\frac{1}{Mm_i}} = g^{ar}$ In some non-limiting embodiments or aspects, payment network 1810 may decrypt the first ciphertext value to form the message (m) as follows:

$$m = \frac{\text{first ciphertext value}}{(\text{transformed value})^{\frac{1}{a}}} = \frac{m \cdot g^r}{(g^{ar})^{\frac{1}{a}}} = \frac{m \cdot g^r}{g^r}$$

As shown by reference number 1836 in FIG. 18, payment network 1810 may communicate the message (m) to consumer bank 1812. In some non-limiting embodiments or aspects, payment network 1810 may encrypt and/or re-encrypt the message (m) before and/or during communication to consumer bank 1812 using any suitable encryption and/or re-encryption technique. For example, payment network 1810 may encrypt and/or re-encrypt the message (m) using any encryption and/or re-encryption technique disclosed herein.

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A method for encrypting an authentication code, comprising:
    receiving, at a payment gateway, a merchant bank public key corresponding to a merchant bank private key, the merchant bank public key and the merchant bank private key associated with a merchant bank system, wherein a plurality of merchant bank public keys includes the merchant bank public key;
    communicating, from the payment gateway to a point-of-sale system, the merchant bank public key;
    receiving, at the payment gateway from the point-of-sale system, a plurality of re-encryption keys, at least one re-encryption key of the plurality of re-encryption keys based on a private key associated with the point-of-sale system and the merchant bank public key, wherein each re-encryption key of the plurality of re-encryption keys corresponds with a public key of the plurality of merchant bank public keys;
    receiving, at the payment gateway from the point-of-sale system, encrypted transaction data for a transaction, the encrypted transaction data comprising: (i) an encrypted code comprising an authentication code encrypted with a session key, and (ii) an encrypted session key comprising the session key encrypted with a public key associated with the point-of-sale system and corresponding to the private key associated with the point-of-sale system;
    determining, by the payment gateway, a re-encryption key from the plurality of re-encryption keys based on the encrypted transaction data and the merchant bank public key, the re-encryption key corresponding to the merchant bank public key;
    re-encrypting, by the payment gateway, the encrypted session key with the re-encryption key;
    communicating, by the payment gateway, the re-encrypted encrypted session key to a merchant bank system, wherein the merchant bank decrypts the re-encrypted encrypted session key based on the merchant bank private key and communicates second encrypted transaction data comprising: (i) a second encrypted code comprising the authentication code encrypted with the session key, and (ii) a second encrypted session key comprising the session key encrypted with the merchant bank public key to a transaction processing system;
    receiving or generating, at the transaction processing system, an issuer public key corresponding to an issuer private key, the issuer public key and the issuer private key associated with an issuer system;
    generating, by the transaction processing system, at least one second re-encryption key based on the issuer private key and the merchant bank private key or a second merchant bank private key;
    re-encrypting, by the transaction processing system, the second encrypted session key with the at least one second re-encryption key; and
    communicating, by the transaction processing system, the re-encrypted second encrypted session key to the issuer system, wherein the issuer system decrypts the re-encrypted second encrypted session key based on the issuer private key and authorizes the transaction based on the authentication code.

2. The method of claim 1, wherein the point-of-sale system comprises at least one of the following: a point-of-sale terminal, a server computer associated with a merchant or merchant bank system, a server computer associated with a point-of-sale service provider, or any combination thereof.

3. The method of claim 1, wherein the at least one re-encryption key is generated by the point-of-sale system.

4. The method of claim 1, wherein the private key associated with the point-of-sale system corresponds to the public key associated with the point-of-sale system, and wherein the private key and public key associated with the point-of-sale system are generated by the point-of-sale system.

5. The method of claim 1, further comprising:
    generating, by the merchant bank system or the payment gateway, an authorization request message in response to verifying the authentication code,
    wherein communicating the second encrypted transaction data comprises communicating, by the merchant bank system or the payment gateway, the authorization request message to the transaction processing system.

6. A system for encrypting an authentication code, comprising:
    a payment gateway; and
    a transaction processing system;
    the payment gateway comprising at least one payment gateway processor in communication with at least one payment gateway memory and programmed to:
        receive a merchant bank public key corresponding to a merchant bank private key, the merchant bank public key and the merchant bank private key associated with a merchant bank system, wherein a plurality of merchant bank public keys includes the merchant bank public key;
        communicate, to a point-of-sale system, the merchant bank public key;
        receive, from the point-of-sale system, a plurality of re-encryption keys, at least one re-encryption key of the plurality of re-encryption keys based on a private key associated with the point-of-sale system and the merchant bank public key, wherein each re-encryption key of the plurality of re-encryption keys corresponds with a public key of the plurality of merchant bank public keys;
        receive, from the point-of-sale system, encrypted transaction data for a transaction, the encrypted transaction data comprising: (i) an encrypted code comprising an authentication code encrypted with a session key, and (ii) an encrypted session key comprising the session key encrypted with a public key associated with the point-of-sale system and corresponding to the private key associated with the point-of-sale system;
        determine a re-encryption key from the plurality of re-encryption keys based on the encrypted transaction data and the merchant bank public key, the re-encryption key corresponding to the merchant bank public key;
        re-encrypt the encrypted session key with the re-encryption key; and
        communicate the re-encrypted encrypted session key to a merchant bank system, wherein the merchant bank decrypts the re-encrypted encrypted session key based on the merchant bank private key and communicates second encrypted transaction data comprising: (i) a second encrypted code comprising the authentication code encrypted with the session key, and (ii) a second encrypted session key comprising the session key encrypted with the merchant bank public key to a transaction processing system; and the transaction processing system comprising at least one transaction processing system processor in communication with at least one transaction processing system memory and programmed to:
- receive or generate an issuer public key corresponding to an issuer private key, the issuer public key and the issuer private key associated with an issuer system;
- generate at least one second re-encryption key based on the issuer private key and the merchant bank private key or a second merchant bank private key;
- re-encrypt the second encrypted session key with the at least one second re-encryption key; and
- communicate the re-encrypted second encrypted session key to the issuer system, wherein the issuer system decrypts the re-encrypted second encrypted session key based on the issuer private key and authorizes the transaction based on the authentication code.

7. The system of claim 6, wherein the point-of-sale system comprises at least one of the following: a point-of-sale terminal, a server computer associated with a merchant or merchant bank system, a server computer associated with a point-of-sale service provider, or any combination thereof.

8. The system of claim 6, wherein the at least one re-encryption key is generated by the point-of-sale system.

9. The system of claim 6, wherein the private key associated with the point-of-sale system corresponds to the public key associated with the point-of-sale system, and wherein the private key and public key associated with the point-of-sale system are generated by the point-of-sale system.

10. The system of claim 6, wherein the payment gateway or the merchant bank system is programmed or configured to:
- generate an authorization request message in response to verifying the authentication code,
- wherein communicating the second encrypted transaction data comprises communicating the authorization request message to the transaction processing system.

11. A computer program product comprising at least one non-transitory computer-readable medium including program instructions that, when executed by at least one processor, cause the at least one processor to:
- receive, at a payment gateway, a merchant bank public key corresponding to a merchant bank private key, the merchant bank public key and the merchant bank private key associated with a merchant bank system, wherein a plurality of merchant bank public keys includes the merchant bank public key;
- communicate, from the payment gateway to a point-of-sale system, the merchant bank public key;
- receive, at the payment gateway from the point-of-sale system, a plurality of re-encryption keys, at least one re-encryption key of the plurality of re-encryption keys based on a private key associated with the point-of-sale system and the merchant bank public key, wherein each re-encryption key of the plurality of re-encryption keys corresponds with a public key of the plurality of merchant bank public keys;
- receive, at the payment gateway from the point-of-sale system, encrypted transaction data for a transaction, the encrypted transaction data comprising: (i) an encrypted code comprising an authentication code encrypted with a session key, and (ii) an encrypted session key comprising the session key encrypted with a public key associated with the point-of-sale system and corresponding to the private key associated with the point-of-sale system;
- determine, by the payment gateway, a re-encryption key from the plurality of re-encryption keys based on the encrypted transaction data and the merchant bank public key, the re-encryption key corresponding to the merchant bank public key;
- re-encrypt, by the payment gateway, the encrypted session key with the re-encryption key;
- communicate, by the payment gateway, the re-encrypted encrypted session key to a merchant bank system, wherein the merchant bank decrypts the re-encrypted encrypted session key based on the merchant bank private key and communicates second encrypted transaction data comprising: (i) a second encrypted code comprising the authentication code encrypted with the session key, and (ii) a second encrypted session key comprising the session key encrypted with the merchant bank public key to a transaction processing system;
- receive or generate, at the transaction processing system, an issuer public key corresponding to an issuer private key, the issuer public key and the issuer private key associated with an issuer system;
- generate, by the transaction processing system, at least one second re-encryption key based on the issuer private key and the merchant bank private key or a second merchant bank private key;
- re-encrypt, by the transaction processing system, the second encrypted session key with the at least one second re-encryption key; and
- communicate, by the transaction processing system, the re-encrypted second encrypted session key to the issuer system, wherein the issuer system decrypts the re-encrypted second encrypted session key based on the issuer private key and authorizes the transaction based on the authentication code.

12. The computer program product of claim 11, wherein the point-of-sale system comprises at least one of the following: a point-of-sale terminal, a server computer associated with a merchant or merchant bank system, a server computer associated with a point-of-sale service provider, or any combination thereof.

13. The computer program product of claim 11, wherein the at least one re-encryption key is generated by the point-of-sale system.

14. The computer program product of claim 11, wherein the private key associated with the point-of-sale system corresponds to the public key associated with the point-of-sale system, and wherein the private key and public key associated with the point-of-sale system are generated by the point-of-sale system.

15. The computer program product of claim 11, wherein the program instructions further cause the at least one processor to:
- generate, by the merchant bank system or the payment gateway, an authorization request message in response to verifying the authentication code,
- wherein communicating the second encrypted transaction data comprises communicating, by the merchant bank system or the payment gateway, the authorization request message to the transaction processing system.

* * * * *